United States Patent
Kouzai et al.

(10) Patent No.: US 7,242,854 B2
(45) Date of Patent: *Jul. 10, 2007

(54) MAGNETIC TAPE RECORDING APPARATUS AND METHOD, MAGNETIC TAPE FORMAT, AND RECORDING MEDIUM THEREFOR

(75) Inventors: Toshinori Kouzai, Kanagawa (JP); Fumiyoshi Abe, Kanagawa (JP); Tomoo Hayakawa, Kanagawa (JP); Tsukasa Hashino, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/268,133

(22) Filed: Nov. 7, 2005

(65) Prior Publication Data

US 2006/0153534 A1    Jul. 13, 2006

Related U.S. Application Data

(63) Continuation of application No. 09/818,402, filed on Mar. 27, 2001, now Pat. No. 6,996,330.

(30) Foreign Application Priority Data

Mar. 30, 2000 (JP) ............................. 2000-094751

(51) Int. Cl.
H04N 5/91 (2006.01)

(52) U.S. Cl. ...................... 386/112; 386/124
(58) Field of Classification Search .............. 386/46, 386/95, 98, 112, 124
See application file for complete search history.

(56) References Cited

U.S. PATENT DOCUMENTS

| 5,913,012 | A | 6/1999 | Nam |
| 5,946,446 | A | 8/1999 | Yanagihara .................. 386/68 |
| 6,658,195 | B1 | 12/2003 | Senshu et al. ................ 386/54 |
| 6,996,330 | B2 * | 2/2006 | Kouzai et al. .............. 386/112 |

FOREIGN PATENT DOCUMENTS

EP    0 768 801    4/1997

* cited by examiner

*Primary Examiner*—Huy Nguyen
(74) *Attorney, Agent, or Firm*—Frommer Lawrence & Haug LLP; William S. Frommer

(57) ABSTRACT

139 sync blocks, each having 111 bytes, are disposed on each track of a magnetic tape. Among the 139 sync blocks, 121 sync blocks each consist of a two-byte detection pattern for detecting the sync block, three-byte identification information for identifying the sync block, 96-byte main data, and 10-byte inner error correcting code added to the identification information and the main data. In the remaining 18 sync blocks, instead of the main data, 96-byte outer error correcting code is included. The outer error correcting code is provided for each group of the 139 sync blocks. Such a group of 139 sync blocks is obtained by dividing 2224 sync blocks contained in sixteen tracks by sixteen planes, 1668 sync blocks contained in twelve tracks by twelve planes, or 1112 sync blocks contained in eight tracks by eight planes. The sync blocks are arranged on the magnetic tape so that the distance between the sync blocks belonging to the identical plane is constant among the planes.

16 Claims, 56 Drawing Sheets

FIG. 9

| ORDER OF RECORDING | CODEWORD MSB LSB | ORDER OF RECORDING | CODEWORD MSB LSB | ORDER OF RECORDING | CODEWORD MSB LSB |
|---|---|---|---|---|---|
| 0 | 10001011110 | 40 | 10001011110 | 80 | 10001011110 |
| 1 | 10001011110 | 41 | 10001011110 | 81 | 10001011110 |
| 2 | 10001011110 | 42 | 10001011110 | 82 | 10001011110 |
| 3 | 10001011110 | 43 | 10001011110 | 83 | 10001011110 |
| 4 | 10001011110 | 44 | 10001011110 | 84 | 10001011110 |
| 5 | 10001011110 | 45 | 10001011110 | 85 | 10001011110 |
| 6 | 10001011110 | 46 | 10001011110 | 86 | 10001011110 |
| 7 | 10001011110 | 47 | 10001011110 | 87 | 10001011110 |
| 8 | 10001011110 | 48 | 10001011110 | 88 | 10001011110 |
| 9 | 10001011110 | 49 | 10001011110 | 89 | 10001011110 |
| 10 | 10001011110 | 50 | 10001011110 | 90 | 10001011110 |
| 11 | 10001011110 | 51 | 10001011110 | 91 | 10001011110 |
| 12 | 10001011110 | 52 | 10001011110 | 92 | 10001011110 |
| 13 | 10001011110 | 53 | 10001011110 | 93 | 10001011110 |
| 14 | 10001011110 | 54 | 10001011110 | 94 | 10001011110 |
| 15 | 10001011110 | 55 | 10001011110 | 95 | 10001011110 |
| 16 | 10001011110 | 56 | 10001011110 | 96 | 10001011110 |
| 17 | 10001011110 | 57 | 10001011110 | 97 | 10001011110 |
| 18 | 10001011110 | 58 | 10001011110 | 98 | 10001011110 |
| 19 | 10001011110 | 59 | 10001011110 | 99 | 10001011110 |
| 20 | 10001011110 | 60 | 10001011110 | 100 | 10001011110 |
| 21 | 10001011110 | 61 | 10001011110 | 101 | 10001011110 |
| 22 | 10001011110 | 62 | 10001011110 | 102 | 10001011110 |
| 23 | 10001011110 | 63 | 10001011110 | 103 | 10001011110 |
| 24 | 10001011110 | 64 | 10001011110 | 104 | 10001011110 |
| 25 | 10001011110 | 65 | 10001011110 | 105 | 10001011110 |
| 26 | 10001011110 | 66 | 10001011110 | 106 | 10001011110 |
| 27 | 10001011110 | 67 | 10001011110 | 107 | 10001011110 |
| 28 | 10001011110 | 68 | 10001011110 | 108 | 10001011110 |
| 29 | 10001011110 | 69 | 10001011110 | 109 | 10001011110 |
| 30 | 10001011110 | 70 | 10001011110 | 110 | 10001011110 |
| 31 | 10001011110 | 71 | 10001011110 | 111 | 10001011110 |
| 32 | 10001011110 | 72 | 10001011110 | 112 | 10001011110 |
| 33 | 10001011110 | 73 | 10001011110 | 113 | 10001011110 |
| 34 | 10001011110 | 74 | 10001011110 | 114 | 10001011110 |
| 35 | 10001011110 | 75 | 10001011110 | 115 | 10001011110 |
| 36 | 10001011110 | 76 | 10001011110 | 116 | 10001011110 |
| 37 | 10001011110 | 77 | 10001011110 | 117 | 10001011111 |
| 38 | 10001011110 | 78 | 10001011110 | 118 | 10001011111 |
| 39 | 10001011110 | 79 | 10001011110 | 119 | 10001011111 |

| ORDER OF RECORDING | CODEWORD MSB LSB |
|---|---|
| 120 | 10001011110 |
| 121 | 10001011110 |
| 122 | 10001011110 |
| 123 | 10001011110 |
| 124 | 10001011110 |
| 125 | 10001011110 |
| 126 | 10001011110 |
| 127 | 10001011110 |
| 128 | 10001011110 |
| 129 | 10001011110 |
| 130 | 10001011110 |
| 131 | 10001011110 |
| 132 | 10001011110 |
| 133 | 10001011110 |
| 134 | 10001011110 |
| 135 | 10001011110 |
| 136 | 10001011110 |
| 137 | 10001011110 |
| 138 | 10001011110 |
| 139 | 10001011110 |

FIG. 10

| ORDER OF RECORDING | CODEWORD MSB LSB | ORDER OF RECORDING | CODEWORD MSB LSB | ORDER OF RECORDING | CODEWORD MSB LSB | ORDER OF RECORDING | CODEWORD MSB LSB |
|---|---|---|---|---|---|---|---|
| 0 | 11011100 01 | 40 | 10001011 10 | 80 | 00100011 10 | 120 | 11011100 01 |
| 1 | 11011100 01 | 41 | 00100001 10 | 81 | 11011100 01 | 121 | 10001011 10 |
| 2 | 11011100 01 | 42 | 00100001 10 | 82 | 11011100 01 | 122 | 00100001 10 |
| 3 | 11011100 01 | 43 | 00100001 10 | 83 | 11011100 01 | 123 | 00100001 10 |
| 4 | 10001011 10 | 44 | 00100001 10 | 84 | 11011100 01 | 124 | 00100001 10 |
| 5 | 00100001 10 | 45 | 11011100 01 | 85 | 10001011 10 | 125 | 00100001 10 |
| 6 | 00100001 10 | 46 | 11011100 01 | 86 | 00100001 10 | 126 | 11011100 01 |
| 7 | 00100001 10 | 47 | 11011100 01 | 87 | 00100001 10 | 127 | 11011100 01 |
| 8 | 11011100 01 | 48 | 10001011 10 | 88 | 00100001 10 | 128 | 11011100 01 |
| 9 | 11011100 01 | 49 | 00100001 10 | 89 | 00100001 10 | 129 | 11011100 01 |
| 10 | 11011100 01 | 50 | 00100001 10 | 90 | 00100011 10 | 130 | 10001011 10 |
| 11 | 11011100 01 | 51 | 00100001 10 | 91 | 11011100 01 | 131 | 00100001 10 |
| 12 | 10001011 10 | 52 | 00100001 10 | 92 | 11011100 01 | 132 | 00100001 10 |
| 13 | 00100001 10 | 53 | 11011100 01 | 93 | 11011100 01 | 133 | 00100001 10 |
| 14 | 00100001 10 | 54 | 11011100 01 | 94 | 11011100 01 | 134 | 00100001 10 |
| 15 | 00100001 10 | 55 | 10001011 10 | 95 | 10001011 10 | 135 | 11011100 01 |
| 16 | 00100001 10 | 56 | 00100001 10 | 96 | 00100001 10 | 136 | 11011100 01 |
| 17 | 11011100 01 | 57 | 00100001 10 | 97 | 00100001 10 | 137 | 11011100 01 |
| 18 | 11011100 01 | 58 | 00100001 10 | 98 | 00100001 10 | 138 | 11011100 01 |
| 19 | 11011100 01 | 59 | 00100001 10 | 99 | 00100001 10 | 139 | 10001011 10 |
| 20 | 10001011 10 | 60 | 11011100 01 | 100 | 00100011 10 | | |
| 21 | 00100001 10 | 61 | 11011100 01 | 101 | 11011100 01 | | |
| 22 | 00100001 10 | 62 | 11011100 01 | 102 | 11011100 01 | | |
| 23 | 00100001 10 | 63 | 10001011 10 | 103 | 11011100 01 | | |
| 24 | 11011100 01 | 64 | 00100001 10 | 104 | 11011100 01 | | |
| 25 | 11011100 01 | 65 | 00100001 10 | 105 | 10001011 10 | | |
| 26 | 11011100 01 | 66 | 00100001 10 | 106 | 00100001 10 | | |
| 27 | 11011100 01 | 67 | 00100001 10 | 107 | 00100001 10 | | |
| 28 | 10001011 10 | 68 | 11011100 01 | 108 | 00100001 10 | | |
| 29 | 00100001 10 | 69 | 11011100 01 | 109 | 00100001 10 | | |
| 30 | 00100001 10 | 70 | 11011100 01 | 110 | 00100011 10 | | |
| 31 | 00100001 10 | 71 | 11011100 01 | 111 | 11011100 01 | | |
| 32 | 11011100 01 | 72 | 10001011 10 | 112 | 11011100 01 | | |
| 33 | 10001011 10 | 73 | 00100001 10 | 113 | 11011100 01 | | |
| 34 | 00100001 10 | 74 | 00100001 10 | 114 | 11011100 01 | | |
| 35 | 00100001 10 | 75 | 00100001 10 | 115 | 10001011 10 | | |
| 36 | 00100001 10 | 76 | 00100001 10 | 116 | 00100001 10 | | |
| 37 | 11011100 01 | 77 | 11011100 01 | 117 | 11011100 01 | | |
| 38 | 11011100 01 | 78 | 11011100 01 | 118 | 11011100 01 | | |
| 39 | 11011100 01 | 79 | 11011100 01 | 119 | 11011100 01 | | |

FIG. 11

| ORDER OF RECORDING | CODEWORD MSB  LSB | ORDER OF RECORDING | CODEWORD MSB  LSB | ORDER OF RECORDING | CODEWORD MSB  LSB | ORDER OF RECORDING | CODEWORD MSB  LSB |
|---|---|---|---|---|---|---|---|
| 0 | 1101110001 | 40 | 0010001110 | 80 | 1101110001 | 120 | 1101110001 |
| 1 | 1101110001 | 41 | 0010001110 | 81 | 0010001110 | 121 | 1101110001 |
| 2 | 1101110001 | 42 | 1101110001 | 82 | 0010001110 | 122 | 1101110001 |
| 3 | 0010001110 | 43 | 1101110001 | 83 | 1101110001 | 123 | 0010001110 |
| 4 | 0010001110 | 44 | 0010001110 | 84 | 1101110001 | 124 | 0010001110 |
| 5 | 1101110001 | 45 | 0010001110 | 85 | 0010001110 | 125 | 1101110001 |
| 6 | 1101110001 | 46 | 1101110001 | 86 | 0010001110 | 126 | 1101110001 |
| 7 | 0010001110 | 47 | 1101110001 | 87 | 1101110001 | 127 | 1101110001 |
| 8 | 0010001110 | 48 | 0010001110 | 88 | 0010001110 | 128 | 0010001110 |
| 9 | 0010001110 | 49 | 0010001110 | 89 | 0010001110 | 129 | 0010001110 |
| 10 | 0010001110 | 50 | 0010001110 | 90 | 1101110001 | 130 | 1101110001 |
| 11 | 1101110001 | 51 | 1101110001 | 91 | 1101110001 | 131 | 1101110001 |
| 12 | 1101110001 | 52 | 1101110001 | 92 | 0010001110 | 132 | 0010001110 |
| 13 | 1101110001 | 53 | 1101110001 | 93 | 0010001110 | 133 | 0010001110 |
| 14 | 0010001110 | 54 | 0010001110 | 94 | 1101110001 | 134 | 1101110001 |
| 15 | 0010001110 | 55 | 0010001110 | 95 | 1101110001 | 135 | 1101110001 |
| 16 | 1101110001 | 56 | 1101110001 | 96 | 0010001110 | 136 | 0010001110 |
| 17 | 1101110001 | 57 | 1101110001 | 97 | 0010001110 | 137 | 0010001110 |
| 18 | 1101110001 | 58 | 1101110001 | 98 | 0010001110 | 138 | 0010001110 |
| 19 | 0010001110 | 59 | 0010001110 | 99 | 1101110001 | 139 | 1101110001 |
| 20 | 0010001110 | 60 | 0010001110 | 100 | 1101110001 | | |
| 21 | 1101110001 | 61 | 1101110001 | 101 | 0010001110 | | |
| 22 | 1101110001 | 62 | 1101110001 | 102 | 0010001110 | | |
| 23 | 0010001110 | 63 | 0010001110 | 103 | 1101110001 | | |
| 24 | 0010001110 | 64 | 0010001110 | 104 | 1101110001 | | |
| 25 | 0010001110 | 65 | 1101110001 | 105 | 0010001110 | | |
| 26 | 1101110001 | 66 | 1101110001 | 106 | 0010001110 | | |
| 27 | 1101110001 | 67 | 1101110001 | 107 | 1101110001 | | |
| 28 | 0010001110 | 68 | 0010001110 | 108 | 0010001110 | | |
| 29 | 0010001110 | 69 | 0010001110 | 109 | 0010001110 | | |
| 30 | 1101110001 | 70 | 1101110001 | 110 | 1101110001 | | |
| 31 | 1101110001 | 71 | 1101110001 | 111 | 1101110001 | | |
| 32 | 0010001110 | 72 | 0010001110 | 112 | 0010001110 | | |
| 33 | 0010001110 | 73 | 0010001110 | 113 | 0010001110 | | |
| 34 | 0010001110 | 74 | 0010001110 | 114 | 1101110001 | | |
| 35 | 1101110001 | 75 | 1101110001 | 115 | 1101110001 | | |
| 36 | 1101110001 | 76 | 1101110001 | 116 | 1101110001 | | |
| 37 | 1101110001 | 77 | 1101110001 | 117 | 0010001110 | | |
| 38 | 1101110001 | 78 | 1101110001 | 118 | 0010001110 | | |
| 39 | 0010001110 | 79 | 0010001110 | 119 | 0010001110 | | |

FIG. 12

| ORDER OF RECORDING | CODEWORD MSB LSB | ORDER OF RECORDING | CODEWORD MSB LSB | ORDER OF RECORDING | CODEWORD MSB LSB | ORDER OF RECORDING | CODEWORD MSB LSB |
|---|---|---|---|---|---|---|---|
| 0 | 0010011101 | 40 | 0101011001 | 80 | 0101101001 | 120 | 0010011101 |
| 1 | 0010101101 | 41 | 0110100101 | 81 | 0010011101 | 121 | 0110100101 |
| 2 | 0010101101 | 42 | 0010011101 | 82 | 0010011101 | 122 | 0101101001 |
| 3 | 0100101101 | 43 | 0010101101 | 83 | 0110010101 | 123 | 0010011101 |
| 4 | 0101010101 | 44 | 0101010101 | 84 | 0010011101 | 124 | 0101101001 |
| 5 | 0101011101 | 45 | 0100101101 | 85 | 0010011101 | 125 | 0110010101 |
| 6 | 0010011101 | 46 | 0010111101 | 86 | 0010101101 | 126 | 0010011101 |
| 7 | 0110010101 | 47 | 0010111101 | 87 | 0010011101 | 127 | 0010011101 |
| 8 | 0101101001 | 48 | 0010111001 | 88 | 0110011101 | 128 | 0010101101 |
| 9 | 0010101101 | 49 | 0010011101 | 89 | 0010111001 | 129 | 0101010101 |
| 10 | 0010101101 | 50 | 0010101101 | 90 | 0101011001 | 130 | 0010011101 |
| 11 | 0010011101 | 51 | 0101010101 | 91 | 0010111101 | 131 | 0110011101 |
| 12 | 0010011101 | 52 | 0101011101 | 92 | 0010011101 | 132 | 0101011001 |
| 13 | 0010011101 | 53 | 0101010101 | 93 | 0101010101 | 133 | 0010011101 |
| 14 | 0101010101 | 54 | 0101010101 | 94 | 0010111101 | 134 | 0101011101 |
| 15 | 0110101001 | 55 | 0110101001 | 95 | 0010101101 | 135 | 0010011101 |
| 16 | 0110100101 | 56 | 0010101001 | 96 | 0101010101 | 136 | 0101010101 |
| 17 | 0010101001 | 57 | 0101101001 | 97 | 0010011101 | 137 | 0010111101 |
| 18 | 0101011101 | 58 | 0010111101 | 98 | 0101011001 | 138 | 0010101101 |
| 19 | 0101011001 | 59 | 0010011101 | 99 | 0110001101 | 139 | 0010111001 |
| 20 | 0010101001 | 60 | 0101011101 | 100 | 0101010101 | 140 | 0010011101 |
| 21 | 0110101001 | 61 | 0010111101 | 101 | 0010011101 | 141 | 0101011101 |
| 22 | 0010011101 | 62 | 0110010101 | 102 | 0010011101 | 142 | 0110010101 |
| 23 | 0010111101 | 63 | 0010101101 | 103 | 0110100101 | 143 | 0010011101 |
| 24 | 0010011001 | 64 | 0110011101 | 104 | 0101010101 | 144 | 0010111101 |
| 25 | 0010101001 | 65 | 0101011001 | 105 | 0110010101 | 145 | 0010111001 |
| 26 | 0010101001 | 66 | 0110011101 | 106 | 0010101101 | 146 | 0010011101 |
| 27 | 0110100101 | 67 | 0010011001 | 107 | 0010111001 | 147 | 0101010101 |
| 28 | 0010011001 | 68 | 0010111101 | 108 | 0010111101 | 148 | 0101100101 |
| 29 | 0110011101 | 69 | 0110011101 | 109 | 0010011101 | 149 | 0010011101 |
| 30 | 0010011101 | 70 | 0101010101 | 110 | 0101010101 | 150 | 0010111101 |
| 31 | 0101011101 | 71 | 0010011101 | 111 | 0110010101 | 151 | 0010101101 |
| 32 | 0010111001 | 72 | 0010011101 | 112 | 0010111101 | 152 | 0010011101 |
| 33 | 0010011101 | 73 | 0110011101 | 113 | 0101010101 | 153 | 0010111001 |
| 34 | 0101001101 | 74 | 0010101101 | 114 | 0010111101 | 154 | 0101101001 |
| 35 | 0010011001 | 75 | 0101011001 | 115 | 0010011101 | 155 | 0101010101 |
| 36 | 0101011101 | 76 | 0010111101 | 116 | 0010111101 | 156 | 0010011101 |
| 37 | 0101010101 | 77 | 0110011001 | 117 | 0110100101 | 157 | 0110100101 |
| 38 | 0010101001 | 78 | 0010101101 | 118 | 0010011101 | 158 | 0101010101 |
| 39 | 0010011101 | 79 | 0101100101 | 119 | 0110011001 | 159 | 0010011101 |

| ORDER OF RECORDING | CODEWORD MSB LSB |
|---|---|
| 160 | 0110010101 |
| 161 | 0110100101 |
| 162 | 0010010101 |
| 163 | 0110010101 |
| 164 | 0110010101 |
| 165 | 0010010101 |
| 166 | 0110011101 |
| 167 | 0010011101 |
| 168 | 0110011101 |
| 169 | 0010011101 |
| 170 | 0101010101 |
| 171 | 0010011101 |
| 172 | 0010011001 |
| 173 | 0010011101 |
| 174 | 0010011101 |
| 175 | 0110011101 |
| 176 | 0010111001 |
| 177 | 0011100101 |
| 178 | 0110010101 |
| 179 | 0101100101 |
| 180 | 0110011101 |
| 181 | 0010011101 |
| 182 | 0110101001 |

FIG. 13

| ORDER OF RECORDING | CODEWORD MSB  LSB | ORDER OF RECORDING | CODEWORD MSB  LSB | ORDER OF RECORDING | CODEWORD MSB  LSB | ORDER OF RECORDING | CODEWORD MSB  LSB | ORDER OF RECORDING | CODEWORD MSB  LSB |
|---|---|---|---|---|---|---|---|---|---|
| 0 | 0111001000 | 40 | 0101011011 | 80 | 0101101001 | 120 | 0111001000 | 160 | 0110010111 |
| 1 | 1010101000 | 41 | 1010100111 | 81 | 0111001000 | 121 | 0111010111 | 161 | 0110100101 |
| 2 | 1010101000 | 42 | 1000101011 | 82 | 1010011000 | 122 | 0101010101 | 162 | 0111001000 |
| 3 | 0111001000 | 43 | 0101011011 | 83 | 1010001000 | 123 | 1000110111 | 163 | 1001101000 |
| 4 | 0101010111 | 44 | 0101010101 | 84 | 0111100111 | 124 | 0101101001 | 164 | 1001101000 |
| 5 | 0101011011 | 45 | 0110010101 | 85 | 0101101011 | 125 | 0101011001 | 165 | 0111001000 |
| 6 | 1000110111 | 46 | 0111001000 | 86 | 0111100111 | 126 | 0111001000 | 166 | 0111001000 |
| 7 | 0101010111 | 47 | 1000110111 | 87 | 1000110111 | 127 | 1010011000 | 167 | 0110010111 |
| 8 | 0101010111 | 48 | 0111101011 | 88 | 0101101011 | 128 | 1010010100 | 168 | 0110001011 |
| 9 | 0111010001 | 49 | 0101010101 | 89 | 0111100111 | 129 | 0111001000 | 169 | 1000110111 |
| 10 | 0101010101 | 50 | 1010010101 | 90 | 0111010101 | 130 | 0111010111 | 170 | 0111010101 |
| 11 | 1010010011 | 51 | 1000110111 | 91 | 1000110111 | 131 | 1010101001 | 171 | 0111001000 |
| 12 | 1000110101 | 52 | 1010010101 | 92 | 0101011001 | 132 | 1000110111 | 172 | 1001100100 |
| 13 | 1010011001 | 53 | 0111010011 | 93 | 0110010111 | 133 | 0111001011 | 173 | 1010001000 |
| 14 | 0101010111 | 54 | 0111100100 | 94 | 1010011001 | 134 | 0111010011 | 174 | 1010011011 |
| 15 | 1000110111 | 55 | 0101011000 | 95 | 0111010111 | 135 | 0101010101 | 175 | 0111001000 |
| 16 | 0111010011 | 56 | 0111001000 | 96 | 0111001000 | 136 | 0111010101 | 176 | 0101010101 |
| 17 | 0111010111 | 57 | 1010010100 | 97 | 1010010101 | 137 | 1000110111 | 177 | 1000110111 |
| 18 | 1010010011 | 58 | 1010010100 | 98 | 1010010111 | 138 | 0111001011 | 178 | 0110100111 |
| 19 | 0111001011 | 59 | 0101011011 | 99 | 0101101001 | 139 | 0111001011 | 179 | 1001101000 |
| 20 | 1010100001 | 60 | 1010101011 | 100 | 1000110111 | 140 | 1000101011 | 180 | 0110001000 |
| 21 | 0111001011 | 61 | 0111011001 | 101 | 0111010101 | 141 | 0111010111 | 181 | 1001100100 |
| 22 | 0111001000 | 62 | 1010100001 | 102 | 0111010101 | 142 | 0111001011 | 182 | 1001101000 |
| 23 | 1000110111 | 63 | 0101010101 | 103 | 0101010111 | 143 | 0111101000 | | |
| 24 | 0101011011 | 64 | 1010010101 | 104 | 1010101000 | 144 | 1001101000 | | |
| 25 | 0111010011 | 65 | 0101011011 | 105 | 0111001011 | 145 | 1010101011 | | |
| 26 | 1010011001 | 66 | 1010011001 | 106 | 1000110100 | 146 | 0111010111 | | |
| 27 | 1000110111 | 67 | 0111010101 | 107 | 0111001001 | 147 | 0111010111 | | |
| 28 | 0101010011 | 68 | 0111010101 | 108 | 0101011001 | 148 | 0110010011 | | |
| 29 | 1000110111 | 69 | 1010010001 | 109 | 0101011011 | 149 | 0111010111 | | |
| 30 | 0111010111 | 70 | 0111010111 | 110 | 0111010101 | 150 | 1000110111 | | |
| 31 | 1010011001 | 71 | 0101010101 | 111 | 0111010111 | 151 | 0111001001 | | |
| 32 | 1010011001 | 72 | 1010011001 | 112 | 1010011001 | 152 | 1010101000 | | |
| 33 | 1000110111 | 73 | 1000110111 | 113 | 0111010100 | 153 | 1001101000 | | |
| 34 | 0111010111 | 74 | 0101010101 | 114 | 0101010100 | 154 | 0111010111 | | |
| 35 | 1010010001 | 75 | 0111010111 | 115 | 0111001000 | 155 | 0110110111 | | |
| 36 | 1010010100 | 76 | 1010101011 | 116 | 0101011011 | 156 | 0111001000 | | |
| 37 | 0101011100 | 77 | 1000110111 | 117 | 0111001011 | 157 | 0111010111 | | |
| 38 | 1010010100 | 78 | 0101011001 | 118 | 1010101001 | 158 | 0110101011 | | |
| 39 | 0111001000 | 79 | 0101011000 | 119 | 1001100100 | 159 | 1000110111 | | |

FIG. 14

| ORDER OF RECORDING | CODEWORD MSB LSB | ORDER OF RECORDING | CODEWORD MSB LSB | ORDER OF RECORDING | CODEWORD MSB LSB | ORDER OF RECORDING | CODEWORD MSB LSB |
|---|---|---|---|---|---|---|---|
| 0  | 1000110111 | 40 | 0101011011 | 80  | 1010010100 | 120 | 1000110111 | 
| 1  | 1010101000 | 41 | 0110100111 | 81  | 0111001000 | 121 | 1001101000 |
| 2  | 1010110000 | 42 | 1000100111 | 82  | 0101101011 | 122 | 1010101000 |
| 3  | 0111001000 | 43 | 1010100100 | 83  | 0101101000 | 123 | 0111001000 |
| 4  | 0101101011 | 44 | 1001101000 | 84  | 1000110111 | 124 | 0101010011 |
| 5  | 0101010111 | 45 | 0111001011 | 85  | 1010011000 | 125 | 1000110111 |
| 6  | 1000110111 | 46 | 0111001000 | 86  | 1001010100 | 126 | 1000110111 |
| 7  | 1010101000 | 47 | 0111011011 | 87  | 1000110111 | 127 | 1010011000 |
| 8  | 0101101000 | 48 | 1000110111 | 88  | 0111001000 | 128 | 1010010100 |
| 9  | 1010010100 | 49 | 1010010100 | 89  | 0111001011 | 129 | 0111001000 |
| 10 | 0111001011 | 50 | 0111010100 | 90  | 1000110111 | 130 | 1010100111 |
| 11 | 0101010111 | 51 | 0101010111 | 91  | 1010101000 | 131 | 0101101011 |
| 12 | 1010010111 | 52 | 0111010111 | 92  | 1001101000 | 132 | 1000110111 |
| 13 | 1010101000 | 53 | 1000110100 | 93  | 1010011000 | 133 | 1001101000 |
| 14 | 0101101000 | 54 | 1000110111 | 94  | 0111001011 | 134 | 1001010100 |
| 15 | 1010010100 | 55 | 1001101010 | 95  | 1010001011 | 135 | 1001010100 |
| 16 | 0101010111 | 56 | 0101010111 | 96  | 1000110111 | 136 | 0111001000 |
| 17 | 0111010111 | 57 | 0111001000 | 97  | 1010010100 | 137 | 0110100111 |
| 18 | 1010101000 | 58 | 1000110111 | 98  | 0101101000 | 138 | 1000110111 |
| 19 | 1010101000 | 59 | 1001010111 | 99  | 0101010111 | 139 | 1001101000 |
| 20 | 1010010100 | 60 | 1010010100 | 100 | 1000110111 | 140 | 0111001011 |
| 21 | 0111001011 | 61 | 0101101011 | 101 | 1010101000 | 141 | 0101010111 |
| 22 | 0101010111 | 62 | 0111001000 | 102 | 1001010100 | 142 | 1000110111 |
| 23 | 1000110111 | 63 | 1000110111 | 103 | 0111001011 | 143 | 1001101000 |
| 24 | 1010101000 | 64 | 0101010011 | 104 | 1001010100 | 144 | 0111001011 |
| 25 | 1010010100 | 65 | 1010010111 | 105 | 0101010111 | 145 | 1010010100 |
| 26 | 0111001011 | 66 | 0111001000 | 106 | 1010010111 | 146 | 1010101000 |
| 27 | 0101010111 | 67 | 0101101000 | 107 | 0101101000 | 147 | 0111011011 |
| 28 | 1010101000 | 68 | 1010010100 | 108 | 0101010100 | 148 | 0111011000 |
| 29 | 0101101000 | 69 | 0111001011 | 109 | 0101010111 | 149 | 0101010111 |
| 30 | 0101010111 | 70 | 0111001000 | 110 | 1000110111 | 150 | 1010010100 |
| 31 | 1010101011 | 71 | 0110100111 | 111 | 1010101000 | 151 | 1000110111 |
| 32 | 1001010111 | 72 | 1001010111 | 112 | 1010010100 | 152 | 1001010111 |
| 33 | 0101010100 | 73 | 1001010011 | 113 | 0111011011 | 153 | 1001010100 |
| 34 | 0101011011 | 74 | 1000110011 | 114 | 0101101000 | 154 | 0111001000 |
| 35 | 0101100111 | 75 | 1000110111 | 115 | 0101011011 | 155 | 0110101011 |
| 36 | 1010100111 | 76 | 0111001011 | 116 | 0111010100 | 156 | 1001010111 |
| 37 | 1010010100 | 77 | 0101010111 | 117 | 0101010111 | 157 | 1001010100 |
| 38 | 1010010100 | 78 | 1000110111 | 118 | 0111001011 | 158 | 1000110111 |
| 39 | 0111001000 | 79 | 1010011000 | 119 | 0100011000 | 159 | 0111001000 |
| | | | | | | 160 | 0110010111 |
| | | | | | | 161 | 0110100111 |
| | | | | | | 162 | 1000110111 |
| | | | | | | 163 | 1000110111 |
| | | | | | | 164 | 1000110111 |
| | | | | | | 165 | 0111001000 |
| | | | | | | 166 | 0110010111 |
| | | | | | | 167 | 0110100111 |
| | | | | | | 168 | 1000110111 |
| | | | | | | 169 | 1000110100 |
| | | | | | | 170 | 1010010100 |
| | | | | | | 171 | 0111001000 |
| | | | | | | 172 | 0110100111 |
| | | | | | | 173 | 0101011011 |
| | | | | | | 174 | 1000110111 |
| | | | | | | 175 | 1010100100 |
| | | | | | | 176 | 1010100100 |
| | | | | | | 177 | 0111010100 |
| | | | | | | 178 | 0111001000 |
| | | | | | | 179 | 0101101011 |
| | | | | | | 180 | 0101101000 |
| | | | | | | 181 | 1000110111 |
| | | | | | | 182 | 1001010100 |

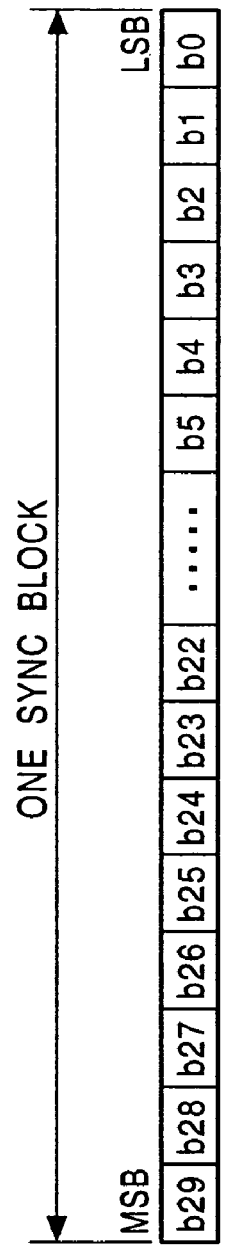

FIG. 17

| $APT_2$ | $APT_1$ | $APT_0$ | MEANING |
|---|---|---|---|
| 0 | 0 | 0 | CONSUMER DIGITAL VCR |
| 0 | 0 | 1 | RESERVED |
| 0 | 1 | 0 | RESERVED |
| 0 | 1 | 1 | RESERVED |
| 1 | 0 | 0 | RESERVED |
| 1 | 0 | 1 | RESERVED |
| 1 | 1 | 0 | RESERVED |
| 1 | 1 | 1 | NO INFORMATION |

FIG. 18

| ORDER OF RECORDING | CODEWORD MSB          LSB |
|---|---|
| 0 | 0010011101 |
| 1 | 0110011001 |
| 2 | 0110010101 |
| 3 | 0010011101 |
| 4 | 0110011001 |
| 5 | 0110010101 |
| 6 | 0010011101 |
| 7 | 0110011001 |
| 8 | 0110010101 |

FIG. 19

| ORDER OF RECORDING | CODEWORD<br>MSB          LSB |
|---|---|
| 0 | 0111001000 |
| 1 | 0110011011 |
| 2 | 0110010111 |
| 3 | 1000110111 |
| 4 | 0110011011 |
| 5 | 0110010101 |
| 6 | 0111001000 |
| 7 | 1001100100 |
| 8 | 1001101000 |

FIG. 20

| ORDER OF RECORDING | CODEWORD<br>MSB          LSB |
|---|---|
| 0 | 0111001000 |
| 1 | 0110011011 |
| 2 | 0110010111 |
| 3 | 1000110111 |
| 4 | 1001100100 |
| 5 | 1001101000 |
| 6 | 0111001000 |
| 7 | 0110011011 |
| 8 | 0110010111 |

FIG. 21

| ORDER OF RECORDING | CODEWORD MSB        LSB | ORDER OF RECORDING | CODEWORD MSB        LSB | ORDER OF RECORDING | CODEWORD MSB        LSB |
|---|---|---|---|---|---|
| 0 | 1000101110 | 10 | 1000101110 | 20 | 1000101110 |
| 1 | 1000101110 | 11 | 1000101110 | 21 | 1000101110 |
| 2 | 1000101110 | 12 | 1000101110 | 22 | 1000101110 |
| 3 | 1000101110 | 13 | 1000101110 | 23 | 1000101110 |
| 4 | 1000101110 | 14 | 1000101110 | 24 | 1000101110 |
| 5 | 1000101110 | 15 | 1000101110 | 25 | 1000101110 |
| 6 | 1000101110 | 16 | 1000101110 | 26 | 1000101110 |
| 7 | 1000101110 | 17 | 1000101110 | 27 | 1000101110 |
| 8 | 1000101110 | 18 | 1000101110 | | |
| 9 | 1000101110 | 19 | 1000101110 | | |

FIG. 22

| ORDER OF RECORDING | CODEWORD MSB　　　LSB | ORDER OF RECORDING | CODEWORD MSB　　　LSB | ORDER OF RECORDING | CODEWORD MSB　　　LSB |
|---|---|---|---|---|---|
| 0 | 0010001110 | 10 | 1101110001 | 20 | 1101110001 |
| 1 | 1101110001 | 11 | 1101110001 | 21 | 1101110001 |
| 2 | 1101110001 | 12 | 1101110001 | 22 | 1101110001 |
| 3 | 1101110001 | 13 | 1101110001 | 23 | 1000101110 |
| 4 | 1101110001 | 14 | 1000101110 | 24 | 0010001110 |
| 5 | 1000101110 | 15 | 0010001110 | 25 | 0010001110 |
| 6 | 0010001110 | 16 | 0010001110 | 26 | 0010001110 |
| 7 | 0010001110 | 17 | 0010001110 | 27 | 0010001110 |
| 8 | 0010001110 | 18 | 0010001110 | | |
| 9 | 0010001110 | 19 | 1101110001 | | |

FIG. 23

| ORDER OF RECORDING | CODEWORD MSB      LSB | ORDER OF RECORDING | CODEWORD MSB      LSB | ORDER OF RECORDING | CODEWORD MSB      LSB |
|---|---|---|---|---|---|
| 0 | 1101110001 | 10 | 1101110001 | 20 | 0010001110 |
| 1 | 0010001110 | 11 | 1101110001 | 21 | 0010001110 |
| 2 | 0010001110 | 12 | 1101110001 | 22 | 1101110001 |
| 3 | 0010001110 | 13 | 0010001110 | 23 | 1101110001 |
| 4 | 1101110001 | 14 | 0010001110 | 24 | 1101110001 |
| 5 | 1101110001 | 15 | 0010001110 | 25 | 0010001110 |
| 6 | 1101110001 | 16 | 1101110001 | 26 | 0010001110 |
| 7 | 0010001110 | 17 | 1101110001 | 27 | 0010001110 |
| 8 | 0010001110 | 18 | 1101110001 | | |
| 9 | 0010001110 | 19 | 0010001110 | | |

| RUN PATTERN | CODEWORD MSB                          LSB |
|---|---|
| PATTERN A | 0001110001110000011100011 |
| PATTERN B | 1110001110001111100011100 |

| | MSB | | | | | | | LSB |
|---|---|---|---|---|---|---|---|---|
| $ID_0$ | $C_{15}$ | $C_{14}$ | $C_{13}$ | $C_{12}$ | $C_{11}$ | $C_{10}$ | $C_9$ | $C_8$ |
| $ID_1$ | $C_7$ | $C_6$ | $C_5$ | $C_4$ | $C_3$ | $C_2$ | $C_1$ | $C_0$ |
| $ID_P$ | $P_7$ | $P_6$ | $P_5$ | $P_4$ | $P_3$ | $P_2$ | $P_1$ | $P_0$ |

$$P_7 = C_{15} + C_{11} + C_7 + C_5$$
$$P_5 = C_{15} + C_{13} + C_9 + C_5 + C_3$$
$$P_3 = C_{15} + C_{13} + C_{11} + C_7 + C_3 + C_1$$
$$P_1 = \phantom{C_{15} + {}} C_{13} + C_9 + C_7 + C_1$$

$$P_6 = C_{14} + C_{10} + C_6 + C_4$$
$$P_4 = C_{14} + C_{12} + C_8 + C_4 + C_2$$
$$P_2 = C_{14} + C_{12} + C_{10} + C_6 + C_2 + C_0$$
$$P_0 = \phantom{C_{14} + {}} C_{12} + C_8 + C_6 + C_0$$

Figure 42:
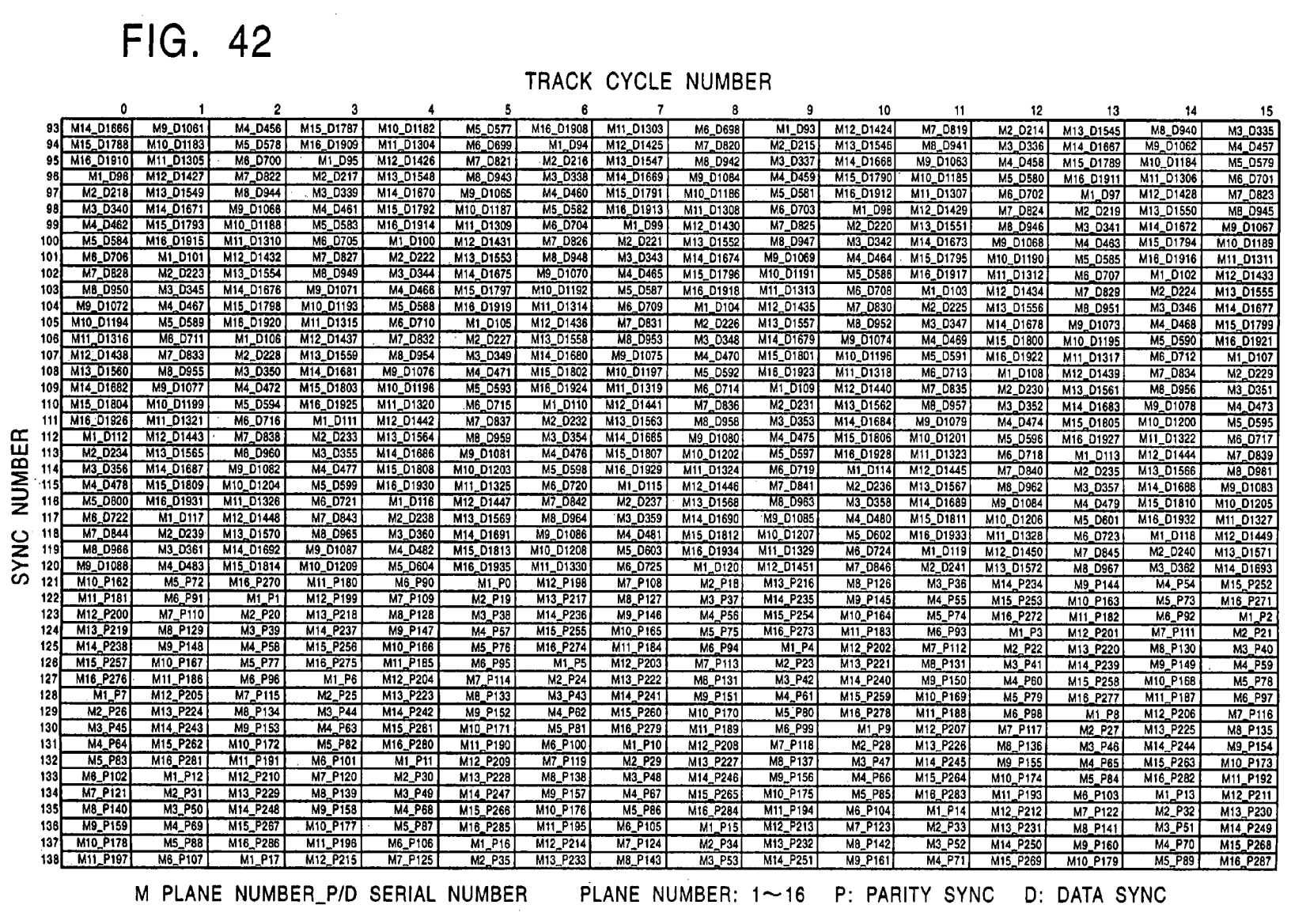

TRACK CYCLE NUMBER

| SYNC NUMBER | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 93 | M14_D1666 | M9_D1061 | M4_D456 | M15_D1787 | M10_D1182 | M5_D577 | M16_D1908 | M11_D1303 | M6_D698 | M1_D93 | M12_D1424 | M7_D819 | M2_D214 | M13_D1545 | M8_D940 | M3_D335 |
| 94 | M15_D1788 | M10_D1183 | M5_D578 | M16_D1909 | M11_D1304 | M6_D699 | M1_D94 | M12_D1425 | M7_D820 | M2_D215 | M13_D1546 | M8_D941 | M3_D336 | M14_D1667 | M9_D1062 | M4_D457 |
| 95 | M16_D1910 | M11_D1305 | M6_D700 | M1_D95 | M12_D1426 | M7_D821 | M2_D216 | M13_D1547 | M8_D942 | M3_D337 | M14_D1668 | M9_D1063 | M4_D458 | M15_D1789 | M10_D1184 | M5_D579 |
| 96 | M1_D96 | M12_D1427 | M7_D822 | M2_D217 | M13_D1548 | M8_D943 | M3_D338 | M14_D1669 | M9_D1064 | M4_D459 | M15_D1790 | M10_D1185 | M5_D580 | M16_D1911 | M11_D1306 | M6_D701 |
| 97 | M2_D218 | M13_D1549 | M8_D944 | M3_D339 | M14_D1670 | M9_D1065 | M4_D460 | M15_D1791 | M10_D1186 | M5_D581 | M16_D1912 | M11_D1307 | M6_D702 | M1_D97 | M12_D1428 | M7_D823 |
| 98 | M3_D340 | M14_D1671 | M9_D1066 | M4_D461 | M15_D1792 | M10_D1187 | M5_D582 | M16_D1913 | M11_D1308 | M6_D703 | M1_D98 | M12_D1429 | M7_D824 | M2_D219 | M13_D1550 | M8_D945 |
| 99 | M4_D462 | M15_D1793 | M10_D1188 | M5_D583 | M16_D1914 | M11_D1309 | M6_D704 | M1_D99 | M12_D1430 | M7_D825 | M2_D220 | M13_D1551 | M8_D946 | M3_D341 | M14_D1672 | M9_D1067 |
| 100 | M5_D584 | M16_D1915 | M11_D1310 | M6_D705 | M1_D100 | M12_D1431 | M7_D826 | M2_D221 | M13_D1552 | M8_D947 | M3_D342 | M14_D1673 | M9_D1068 | M4_D463 | M15_D1794 | M10_D1189 |
| 101 | M6_D706 | M1_D101 | M12_D1432 | M7_D827 | M2_D222 | M13_D1553 | M8_D948 | M3_D343 | M14_D1674 | M9_D1069 | M4_D464 | M15_D1795 | M10_D1190 | M5_D585 | M16_D1916 | M11_D1311 |
| 102 | M7_D828 | M2_D223 | M13_D1554 | M8_D949 | M3_D344 | M14_D1675 | M9_D1070 | M4_D465 | M15_D1796 | M10_D1191 | M5_D586 | M16_D1917 | M11_D1312 | M6_D707 | M1_D102 | M12_D1433 |
| 103 | M8_D950 | M3_D345 | M14_D1676 | M9_D1071 | M4_D466 | M15_D1797 | M10_D1192 | M5_D587 | M16_D1918 | M11_D1313 | M6_D708 | M1_D103 | M12_D1434 | M7_D829 | M2_D224 | M13_D1555 |
| 104 | M9_D1072 | M4_D467 | M15_D1798 | M10_D1193 | M5_D588 | M16_D1919 | M11_D1314 | M6_D709 | M1_D104 | M12_D1435 | M7_D830 | M2_D225 | M13_D1556 | M8_D951 | M3_D346 | M14_D1677 |
| 105 | M10_D1194 | M5_D589 | M16_D1920 | M11_D1315 | M6_D710 | M1_D105 | M12_D1436 | M7_D831 | M2_D226 | M13_D1557 | M8_D952 | M3_D347 | M14_D1678 | M9_D1073 | M4_D468 | M15_D1799 |
| 106 | M11_D1316 | M6_D711 | M1_D106 | M12_D1437 | M7_D832 | M2_D227 | M13_D1558 | M8_D953 | M3_D348 | M14_D1679 | M9_D1074 | M4_D469 | M15_D1800 | M10_D1195 | M5_D590 | M16_D1921 |
| 107 | M12_D1438 | M7_D833 | M2_D228 | M13_D1559 | M8_D954 | M3_D349 | M14_D1680 | M9_D1075 | M4_D470 | M15_D1801 | M10_D1196 | M5_D591 | M16_D1922 | M11_D1317 | M6_D712 | M1_D107 |
| 108 | M13_D1560 | M8_D955 | M3_D350 | M14_D1681 | M9_D1076 | M4_D471 | M15_D1802 | M10_D1197 | M5_D592 | M16_D1923 | M11_D1318 | M6_D713 | M1_D108 | M12_D1439 | M7_D834 | M2_D229 |
| 109 | M14_D1682 | M9_D1077 | M4_D472 | M15_D1803 | M10_D1198 | M5_D593 | M16_D1924 | M11_D1319 | M6_D714 | M1_D109 | M12_D1440 | M7_D835 | M2_D230 | M13_D1561 | M8_D956 | M3_D351 |
| 110 | M15_D1804 | M10_D1199 | M5_D594 | M16_D1925 | M11_D1320 | M6_D715 | M1_D110 | M12_D1441 | M7_D836 | M2_D231 | M13_D1562 | M8_D957 | M3_D352 | M14_D1683 | M9_D1078 | M4_D473 |
| 111 | M16_D1926 | M11_D1321 | M6_D716 | M1_D111 | M12_D1442 | M7_D837 | M2_D232 | M13_D1563 | M8_D958 | M3_D353 | M14_D1684 | M9_D1079 | M4_D474 | M15_D1805 | M10_D1200 | M5_D595 |
| 112 | M1_D112 | M12_D1443 | M7_D838 | M2_D233 | M13_D1564 | M8_D959 | M3_D354 | M14_D1685 | M9_D1080 | M4_D475 | M15_D1806 | M10_D1201 | M5_D596 | M16_D1927 | M11_D1322 | M6_D717 |
| 113 | M2_D234 | M13_D1565 | M8_D960 | M3_D355 | M14_D1686 | M9_D1081 | M4_D476 | M15_D1807 | M10_D1202 | M5_D597 | M16_D1928 | M11_D1323 | M6_D718 | M1_D113 | M12_D1444 | M7_D839 |
| 114 | M3_D356 | M14_D1687 | M9_D1082 | M4_D477 | M15_D1808 | M10_D1203 | M5_D598 | M16_D1929 | M11_D1324 | M6_D719 | M1_D114 | M12_D1445 | M7_D840 | M2_D235 | M13_D1566 | M8_D961 |
| 115 | M4_D478 | M15_D1809 | M10_D1204 | M5_D599 | M16_D1930 | M11_D1325 | M6_D720 | M1_D115 | M12_D1446 | M7_D841 | M2_D236 | M13_D1567 | M8_D962 | M3_D357 | M14_D1688 | M9_D1083 |
| 116 | M5_D600 | M16_D1931 | M11_D1326 | M6_D721 | M1_D116 | M12_D1447 | M7_D842 | M2_D237 | M13_D1568 | M8_D963 | M3_D358 | M14_D1689 | M9_D1084 | M4_D479 | M15_D1810 | M10_D1205 |
| 117 | M6_D722 | M1_D117 | M12_D1448 | M7_D843 | M2_D238 | M13_D1569 | M8_D964 | M3_D359 | M14_D1690 | M9_D1085 | M4_D480 | M15_D1811 | M10_D1206 | M5_D601 | M16_D1932 | M11_D1327 |
| 118 | M7_D844 | M2_D239 | M13_D1570 | M8_D965 | M3_D360 | M14_D1691 | M9_D1086 | M4_D481 | M15_D1812 | M10_D1207 | M5_D602 | M16_D1933 | M11_D1328 | M6_D723 | M1_D118 | M12_D1449 |
| 119 | M8_D966 | M3_D361 | M14_D1692 | M9_D1087 | M4_D482 | M15_D1813 | M10_D1208 | M5_D603 | M16_D1934 | M11_D1329 | M6_D724 | M1_D119 | M12_D1450 | M7_D845 | M2_D240 | M13_D1571 |
| 120 | M9_D1088 | M4_D483 | M15_D1814 | M10_D1209 | M5_D604 | M16_D1935 | M11_D1330 | M6_D725 | M1_D120 | M12_D1451 | M7_D846 | M2_D241 | M13_D1572 | M8_D967 | M3_D362 | M14_D1693 |
| 121 | M10_P162 | M5_P72 | M16_P270 | M11_P180 | M6_P90 | M1_P0 | M12_P198 | M7_P108 | M2_P18 | M13_P216 | M8_P126 | M3_P36 | M14_P234 | M9_P144 | M4_P54 | M15_P252 |
| 122 | M11_P181 | M6_P91 | M1_P1 | M12_P199 | M7_P109 | M2_P19 | M13_P217 | M8_P127 | M3_P37 | M14_P235 | M9_P145 | M4_P55 | M15_P253 | M10_P163 | M5_P73 | M16_P271 |
| 123 | M12_P200 | M7_P110 | M2_P20 | M13_P218 | M8_P128 | M3_P38 | M14_P236 | M9_P146 | M4_P56 | M15_P254 | M10_P164 | M5_P74 | M16_P272 | M11_P182 | M6_P92 | M1_P2 |
| 124 | M13_P219 | M8_P129 | M3_P39 | M14_P237 | M9_P147 | M4_P57 | M15_P255 | M10_P165 | M5_P75 | M16_P273 | M11_P183 | M6_P93 | M1_P3 | M12_P201 | M7_P111 | M2_P21 |
| 125 | M14_P238 | M9_P148 | M4_P58 | M15_P256 | M10_P166 | M5_P76 | M16_P274 | M11_P184 | M6_P94 | M1_P4 | M12_P202 | M7_P112 | M2_P22 | M13_P220 | M8_P130 | M3_P40 |
| 126 | M15_P257 | M10_P167 | M5_P77 | M16_P275 | M11_P185 | M6_P95 | M1_P5 | M12_P203 | M7_P113 | M2_P23 | M13_P221 | M8_P131 | M3_P41 | M14_P239 | M9_P149 | M4_P59 |
| 127 | M16_P276 | M11_P186 | M6_P96 | M1_P6 | M12_P204 | M7_P114 | M2_P24 | M13_P222 | M8_P131 | M3_P42 | M14_P240 | M9_P150 | M4_P60 | M15_P258 | M10_P168 | M5_P78 |
| 128 | M1_P7 | M12_P205 | M7_P115 | M2_P25 | M13_P223 | M8_P133 | M3_P43 | M14_P241 | M9_P151 | M4_P61 | M15_P259 | M10_P169 | M5_P79 | M16_P277 | M11_P187 | M6_P97 |
| 129 | M2_P26 | M13_P224 | M8_P134 | M3_P44 | M14_P242 | M9_P152 | M4_P62 | M15_P260 | M10_P170 | M5_P80 | M16_P278 | M11_P188 | M6_P98 | M1_P8 | M12_P206 | M7_P116 |
| 130 | M3_P45 | M14_P243 | M9_P153 | M4_P63 | M15_P261 | M10_P171 | M5_P81 | M16_P279 | M11_P189 | M6_P99 | M1_P9 | M12_P207 | M7_P117 | M2_P27 | M13_P225 | M8_P135 |
| 131 | M4_P64 | M15_P262 | M10_P172 | M5_P82 | M16_P280 | M11_P190 | M6_P100 | M1_P10 | M12_P208 | M7_P118 | M2_P28 | M13_P226 | M8_P136 | M3_P46 | M14_P244 | M9_P154 |
| 132 | M5_P83 | M16_P281 | M11_P191 | M6_P101 | M1_P11 | M12_P209 | M7_P119 | M2_P29 | M13_P227 | M8_P137 | M3_P47 | M14_P245 | M9_P155 | M4_P65 | M15_P263 | M10_P173 |
| 133 | M6_P102 | M1_P12 | M12_P210 | M7_P120 | M2_P30 | M13_P228 | M8_P138 | M3_P48 | M14_P246 | M9_P156 | M4_P66 | M15_P264 | M10_P174 | M5_P84 | M16_P282 | M11_P192 |
| 134 | M7_P121 | M2_P31 | M13_P229 | M8_P139 | M3_P49 | M14_P247 | M9_P157 | M4_P67 | M15_P265 | M10_P175 | M5_P85 | M16_P283 | M11_P193 | M6_P103 | M1_P13 | M12_P211 |
| 135 | M8_P140 | M3_P50 | M14_P248 | M9_P158 | M4_P68 | M15_P266 | M10_P176 | M5_P86 | M16_P284 | M11_P194 | M6_P104 | M1_P14 | M12_P212 | M7_P122 | M2_P32 | M13_P230 |
| 136 | M9_P159 | M4_P69 | M15_P267 | M10_P177 | M5_P87 | M16_P285 | M11_P195 | M6_P105 | M1_P15 | M12_P213 | M7_P123 | M2_P33 | M13_P231 | M8_P141 | M3_P51 | M14_P249 |
| 137 | M10_P178 | M5_P88 | M16_P286 | M11_P196 | M6_P106 | M1_P16 | M12_P214 | M7_P124 | M2_P34 | M13_P232 | M8_P142 | M3_P52 | M14_P250 | M9_P160 | M4_P70 | M15_P268 |
| 138 | M11_P197 | M6_P107 | M1_P17 | M12_P215 | M7_P125 | M2_P35 | M13_P233 | M8_P143 | M3_P53 | M14_P251 | M9_P161 | M4_P71 | M15_P269 | M10_P179 | M5_P89 | M16_P287 |

M PLANE NUMBER_P/D SERIAL NUMBER PLANE NUMBER: 1~16 P: PARITY SYNC D: DATA SYNC

FIG. 45

M PLANE NUMBER_P/
D SERIAL NUMBER

PLANE NUMBER: 1~12
P: PARITY SYNC
D: DATA SYNC

FIG. 46

M PLANE NUMBER_P/
D SERIAL NUMBER
PLANE NUMBER: 1~12
P: PARITY SYNC
D: DATA SYNC

FIG. 47

TRACK CYCLE NUMBER

| SYNC NUMBER | 0 | 1 | 2 | 3 | 4 | 5 | 6 | 7 |
|---|---|---|---|---|---|---|---|---|
| 0 | M1_D0 | M4_D121 | M7_D242 | M2_D363 | M5_D484 | M8_D605 | M3_D726 | M6_D847 |
| 1 | M2_D1 | M5_D122 | M8_D243 | M3_D364 | M6_D485 | M1_D606 | M4_D727 | M7_D848 |
| 2 | M3_D2 | M6_D123 | M1_D244 | M4_D365 | M7_D486 | M2_D607 | M5_D728 | M8_D849 |
| 3 | M4_D3 | M7_D124 | M2_D245 | M5_D366 | M8_D487 | M3_D608 | M6_D729 | M1_D850 |
| 4 | M5_D4 | M8_D125 | M3_D246 | M6_D367 | M1_D488 | M4_D609 | M7_D730 | M2_D851 |
| 5 | M6_D5 | M1_D126 | M4_D247 | M7_D368 | M2_D489 | M5_D610 | M8_D731 | M3_D852 |
| 6 | M7_D6 | M2_D127 | M5_D248 | M8_D369 | M3_D490 | M6_D611 | M1_D732 | M4_D853 |
| 7 | M8_D7 | M3_D128 | M6_D249 | M1_D370 | M4_D491 | M7_D612 | M2_D733 | M5_D854 |
| 8 | M1_D8 | M4_D129 | M7_D250 | M2_D371 | M5_D492 | M8_D613 | M3_D734 | M6_D855 |
| 9 | M2_D9 | M5_D130 | M8_D251 | M3_D372 | M6_D493 | M1_D614 | M4_D735 | M7_D856 |
| 10 | M3_D10 | M6_D131 | M1_D252 | M4_D373 | M7_D494 | M2_D615 | M5_D736 | M8_D857 |
| 11 | M4_D11 | M7_D132 | M2_D253 | M5_D374 | M8_D495 | M3_D616 | M6_D737 | M1_D858 |
| 12 | M5_D12 | M8_D133 | M3_D254 | M6_D375 | M1_D496 | M4_D617 | M7_D738 | M2_D859 |
| 13 | M6_D13 | M1_D134 | M4_D255 | M7_D376 | M2_D497 | M5_D618 | M8_D739 | M3_D860 |
| 14 | M7_D14 | M2_D135 | M5_D256 | M8_D377 | M3_D498 | M6_D619 | M1_D740 | M4_D861 |
| 15 | M8_D15 | M3_D136 | M6_D257 | M1_D378 | M4_D499 | M7_D620 | M2_D741 | M5_D862 |
| 16 | M1_D16 | M4_D137 | M7_D258 | M2_D379 | M5_D500 | M8_D621 | M3_D742 | M6_D863 |
| 17 | M2_D17 | M5_D138 | M8_D259 | M3_D380 | M6_D501 | M1_D622 | M4_D743 | M7_D864 |
| 18 | M3_D18 | M6_D139 | M1_D260 | M4_D381 | M7_D502 | M2_D623 | M5_D744 | M8_D865 |
| 19 | M4_D19 | M7_D140 | M2_D261 | M5_D382 | M8_D503 | M3_D624 | M6_D745 | M1_D866 |
| 20 | M5_D20 | M8_D141 | M3_D262 | M6_D383 | M1_D504 | M4_D625 | M7_D746 | M2_D867 |
| 21 | M6_D21 | M1_D142 | M4_D263 | M7_D384 | M2_D505 | M5_D626 | M8_D747 | M3_D868 |
| 22 | M7_D22 | M2_D143 | M5_D264 | M8_D385 | M3_D506 | M6_D627 | M1_D748 | M4_D869 |
| 23 | M8_D23 | M3_D144 | M6_D265 | M1_D386 | M4_D507 | M7_D628 | M2_D749 | M5_D870 |
| 24 | M1_D24 | M4_D145 | M7_D266 | M2_D387 | M5_D508 | M8_D629 | M3_D750 | M6_D871 |
| 25 | M2_D25 | M5_D146 | M8_D267 | M3_D388 | M6_D509 | M1_D630 | M4_D751 | M7_D872 |
| 26 | M3_D26 | M6_D147 | M1_D268 | M4_D389 | M7_D510 | M2_D631 | M5_D752 | M8_D873 |
| 27 | M4_D27 | M7_D148 | M2_D269 | M5_D390 | M8_D511 | M3_D632 | M6_D753 | M1_D874 |
| ⋮ | ⋮ | ⋮ | ⋮ | ⋮ | ⋮ | ⋮ | ⋮ | ⋮ |
| 116 | M5_D116 | M8_D237 | M3_D358 | M6_D479 | M1_D600 | M4_D721 | M7_D842 | M2_D963 |
| 117 | M6_D117 | M1_D238 | M4_D359 | M7_D480 | M2_D601 | M5_D722 | M8_D843 | M3_D964 |
| 118 | M7_D118 | M2_D239 | M5_D360 | M8_D481 | M3_D602 | M6_D723 | M1_D844 | M4_D965 |
| 119 | M8_D119 | M3_D240 | M6_D361 | M1_D482 | M4_D603 | M7_D724 | M2_D845 | M5_D966 |
| 120 | M1_D120 | M4_D241 | M7_D362 | M2_D483 | M5_D604 | M8_D725 | M3_D846 | M6_D967 |
| 121 | M2_P0 | M5_P18 | M8_P36 | M3_P54 | M6_P72 | M1_P90 | M4_P108 | M7_P126 |
| 122 | M3_P1 | M6_P19 | M1_P37 | M4_P55 | M7_P73 | M2_P91 | M5_P109 | M8_P127 |
| 123 | M4_P2 | M7_P20 | M2_P38 | M5_P56 | M8_P74 | M3_P92 | M6_P110 | M1_P128 |
| 124 | M5_P3 | M8_P21 | M3_P39 | M6_P57 | M1_P75 | M4_P93 | M7_P111 | M2_P129 |
| 125 | M6_P4 | M1_P22 | M4_P40 | M7_P58 | M2_P76 | M5_P94 | M8_P112 | M3_P130 |
| 126 | M7_P5 | M2_P23 | M5_P41 | M8_P59 | M3_P77 | M6_P95 | M1_P113 | M4_P131 |
| 127 | M8_P6 | M3_P24 | M6_P42 | M1_P60 | M4_P78 | M7_P96 | M2_P114 | M5_P132 |
| 128 | M1_P7 | M4_P25 | M7_P43 | M2_P61 | M5_P79 | M8_P97 | M3_P115 | M6_P133 |
| 129 | M2_P8 | M5_P26 | M8_P44 | M3_P62 | M6_P80 | M1_P98 | M4_P116 | M7_P134 |
| 130 | M3_P9 | M6_P27 | M1_P45 | M4_P63 | M7_P81 | M2_P99 | M5_P117 | M8_P135 |
| 131 | M4_P10 | M7_P28 | M2_P46 | M5_P64 | M8_P82 | M3_P100 | M6_P118 | M1_P136 |
| 132 | M5_P11 | M8_P29 | M3_P47 | M6_P65 | M1_P83 | M4_P101 | M7_P119 | M2_P137 |
| 133 | M6_P12 | M1_P30 | M4_P48 | M7_P66 | M2_P84 | M5_P102 | M8_P120 | M3_P138 |
| 134 | M7_P13 | M2_P31 | M5_P49 | M8_P67 | M3_P85 | M6_P103 | M1_P121 | M4_P139 |
| 135 | M8_P14 | M3_P32 | M6_P50 | M1_P68 | M4_P86 | M7_P104 | M2_P122 | M5_P140 |
| 136 | M1_P15 | M4_P33 | M7_P51 | M2_P69 | M5_P87 | M8_P105 | M3_P123 | M6_P141 |
| 137 | M2_P16 | M5_P34 | M8_P52 | M3_P70 | M6_P88 | M1_P106 | M4_P124 | M7_P142 |
| 138 | M3_P17 | M6_P35 | M1_P53 | M4_P71 | M7_P89 | M2_P107 | M5_P125 | M8_P143 |

M PLANE NUMBER_P/
D SERIAL NUMBER

PLANE NUMBER: 1~8
P: PARITY SYNC
D: DATA SYNC

FIG. 48

TRACK CYCLE NUMBER

| SYNC NUMBER | 0 | 1 | 2 | 3 | 4 | 5 | 6 | 7 |
|---|---|---|---|---|---|---|---|---|
| 0 | M1_D0 | M4_D363 | M7_D726 | M2_D121 | M5_D484 | M8_D847 | M3_D242 | M6_D605 |
| 1 | M2_D122 | M5_D485 | M8_D848 | M3_D243 | M6_D606 | M1_D1 | M4_D364 | M7_D727 |
| 2 | M3_D244 | M6_D607 | M1_D2 | M4_D365 | M7_D728 | M2_D123 | M5_D486 | M8_D849 |
| 3 | M4_D366 | M7_D729 | M2_D124 | M5_D487 | M8_D850 | M3_D245 | M6_D608 | M1_D3 |
| 4 | M5_D488 | M8_D851 | M3_D246 | M6_D609 | M1_D4 | M4_D367 | M7_D730 | M2_D125 |
| 5 | M6_D610 | M1_D5 | M4_D368 | M7_D731 | M2_D126 | M5_D489 | M8_D852 | M3_D247 |
| 6 | M7_D732 | M2_D127 | M5_D490 | M8_D853 | M3_D248 | M6_D611 | M1_D6 | M4_D369 |
| 7 | M8_D854 | M3_D249 | M6_D612 | M1_D7 | M4_D370 | M7_D733 | M2_D128 | M5_D491 |
| 8 | M1_D8 | M4_D371 | M7_D734 | M2_D129 | M5_D492 | M8_D855 | M3_D250 | M6_D613 |
| 9 | M2_D130 | M5_D493 | M8_D856 | M3_D251 | M6_D614 | M1_D9 | M4_D372 | M7_D735 |
| 10 | M3_D252 | M6_D615 | M1_D10 | M4_D373 | M7_D736 | M2_D131 | M5_D494 | M8_D857 |
| 11 | M4_D374 | M7_D737 | M2_D132 | M5_D495 | M8_D858 | M3_D253 | M6_D616 | M1_D11 |
| 12 | M5_D496 | M8_D859 | M3_D254 | M6_D617 | M1_D12 | M4_D375 | M7_D738 | M2_D133 |
| 13 | M6_D618 | M1_D13 | M4_D376 | M7_D739 | M2_D134 | M5_D497 | M8_D860 | M3_D255 |
| 14 | M7_D740 | M2_D135 | M5_D498 | M8_D861 | M3_D256 | M6_D619 | M1_D14 | M4_D377 |
| 15 | M8_D862 | M3_D257 | M6_D620 | M1_D15 | M4_D378 | M7_D741 | M2_D136 | M5_D499 |
| 16 | M1_D16 | M4_D379 | M7_D742 | M2_D137 | M5_D500 | M8_D863 | M3_D258 | M6_D621 |
| 17 | M2_D138 | M5_D501 | M8_D864 | M3_D259 | M6_D622 | M1_D17 | M4_D380 | M7_D743 |
| 18 | M3_D260 | M6_D623 | M1_D18 | M4_D381 | M7_D744 | M2_D139 | M5_D502 | M8_D865 |
| 19 | M4_D382 | M7_D745 | M2_D140 | M5_D503 | M8_D866 | M3_D261 | M6_D624 | M1_D19 |
| 20 | M5_D504 | M8_D867 | M3_D262 | M6_D625 | M1_D20 | M4_D383 | M7_D746 | M2_D141 |
| 21 | M6_D626 | M1_D21 | M4_D384 | M7_D747 | M2_D142 | M5_D505 | M8_D868 | M3_D263 |
| 22 | M7_D748 | M2_D143 | M5_D506 | M8_D869 | M3_D264 | M6_D627 | M1_D22 | M4_D385 |
| 23 | M8_D870 | M3_D265 | M6_D628 | M1_D23 | M4_D386 | M7_D749 | M2_D144 | M5_D507 |
| 24 | M1_D24 | M4_D387 | M7_D750 | M2_D145 | M5_D508 | M8_D871 | M3_D266 | M6_D629 |
| 25 | M2_D146 | M5_D509 | M8_D872 | M3_D267 | M6_D630 | M1_D25 | M4_D388 | M7_D751 |
| 26 | M3_D268 | M6_D631 | M1_D26 | M4_D389 | M7_D752 | M2_147 | M5_D510 | M8_D873 |
| 27 | M4_D390 | M7_D753 | M2_D148 | M5_D511 | M8_D874 | M3_D269 | M6_D632 | M1_D27 |
| ⋮ | ⋮ | ⋮ | ⋮ | ⋮ | ⋮ | ⋮ | ⋮ | ⋮ |
| 116 | M5_D600 | M8_D963 | M3_D358 | M6_D721 | M1_D116 | M4_D479 | M7_D842 | M2_D237 |
| 117 | M6_D722 | M1_D117 | M4_D480 | M7_D843 | M2_D238 | M5_D601 | M8_D964 | M3_D359 |
| 118 | M7_D844 | M2_D239 | M5_D602 | M8_D965 | M3_D360 | M6_D723 | M1_D118 | M4_D481 |
| 119 | M8_D966 | M3_D361 | M6_D724 | M1_D119 | M4_D4828 | M7_D845 | M2_D240 | M5_D603 |
| 120 | M1_D120 | M4_D483 | M7_D846 | M2_D241 | M5_D604 | M8_D967 | M3_D362 | M6_D725 |
| 121 | M2_P18 | M5_P72 | M8_P126 | M3_P36 | M6_P90 | M1_P0 | M4_P54 | M7_P108 |
| 122 | M3_P37 | M6_P91 | M1_P1 | M4_P55 | M7_P109 | M2_P19 | M5_P73 | M8_P127 |
| 123 | M4_P56 | M7_P110 | M2_P20 | M5_P74 | M8_P128 | M3_P38 | M6_P92 | M1_P2 |
| 124 | M5_P75 | M8_P129 | M3_P39 | M6_P93 | M1_P3 | M4_P57 | M7_P111 | M2_P21 |
| 125 | M6_P94 | M1_P4 | M4_P58 | M7_P112 | M2_P22 | M5_P76 | M8_P130 | M3_P40 |
| 126 | M7_P113 | M2_P23 | M5_P77 | M8_P131 | M3_P41 | M6_P95 | M1_P5 | M4_P59 |
| 127 | M8_P132 | M3_P42 | M6_P96 | M1_P6 | M4_P60 | M7_P114 | M2_P24 | M5_P78 |
| 128 | M1_P7 | M4_P61 | M7_P115 | M2_P25 | M5_P79 | M8_P133 | M3_P43 | M6_P97 |
| 129 | M2_P26 | M5_P80 | M8_P134 | M3_P44 | M6_P98 | M1_P8 | M4_P62 | M7_P116 |
| 130 | M3_P45 | M6_P99 | M1_P9 | M4_P63 | M7_P117 | M2_P27 | M5_P81 | M8_P135 |
| 131 | M4_P64 | M7_P118 | M2_P28 | M5_P82 | M8_P136 | M3_P46 | M6_P100 | M1_P10 |
| 132 | M5_P83 | M8_P137 | M3_P47 | M6_P101 | M1_P11 | M4_P65 | M7_P119 | M2_P29 |
| 133 | M6_P102 | M1_P12 | M4_P66 | M7_P120 | M2_P30 | M5_P84 | M8_P138 | M3_P48 |
| 134 | M7_P121 | M2_P31 | M5_P85 | M8_P139 | M3_P49 | M6_P103 | M1_P13 | M4_P67 |
| 135 | M8_P140 | M3_P50 | M6_PP104 | M1_P14 | M4_P68 | M7_P122 | M2_P32 | M5_P86 |
| 136 | M1_P15 | M4_P69 | M7_P123 | M2_P33 | M5_P87 | M8_P141 | M3_P51 | M6_P105 |
| 137 | M2_P34 | M5_P88 | M8_P142 | M3_P52 | M6_P106 | M1_P16 | M4_P70 | M7_P124 |
| 138 | M3_P53 | M6_P107 | M1_P17 | M4_P71 | M7_P125 | M2_P35 | M5_P89 | M8_P143 |

M PLANE NUMBER_P/
D SERIAL NUMBER

PLANE NUMBER: 1~8
P: PARITY SYNC
D: DATA SYNC

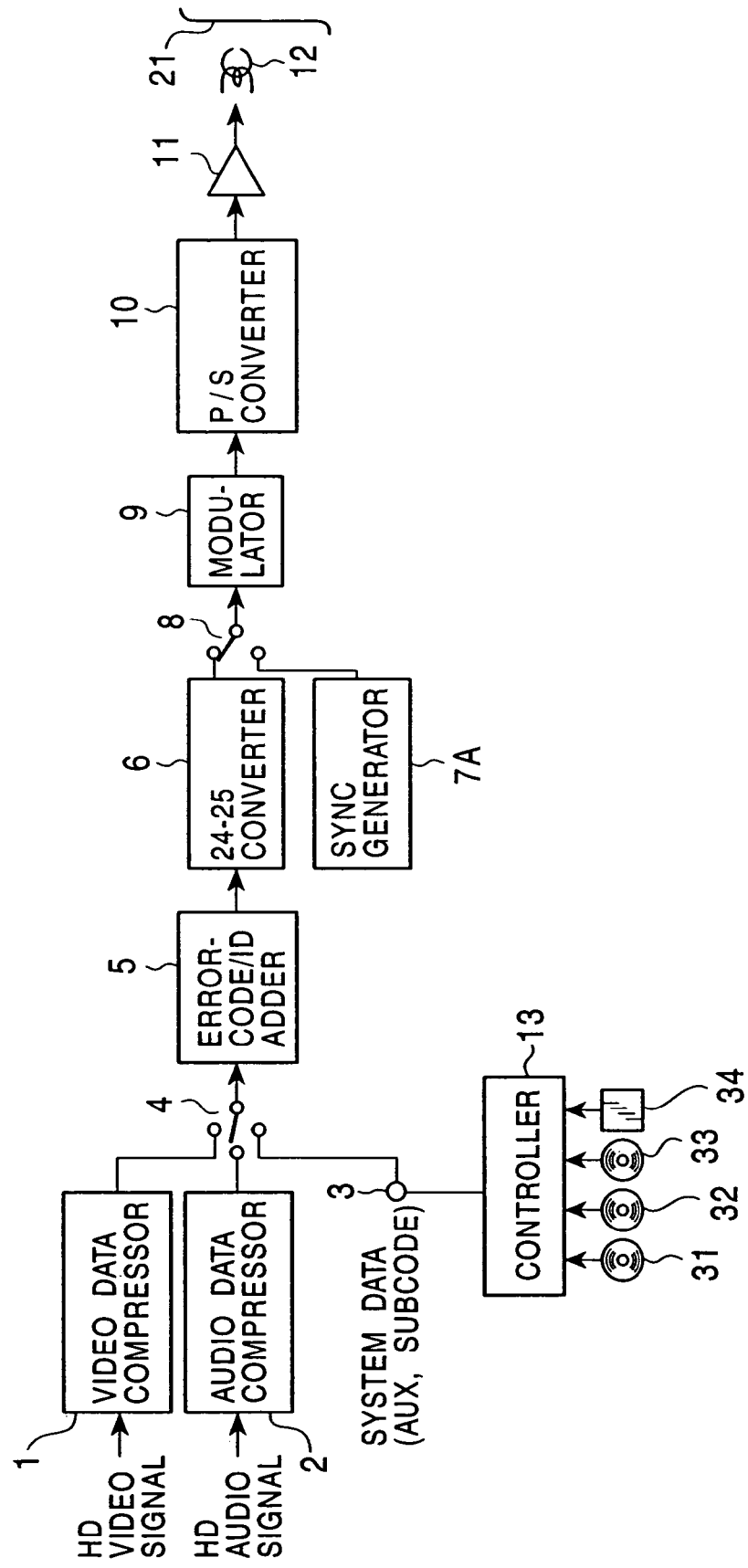

MAGNETIC TAPE RECORDING APPARATUS AND METHOD, MAGNETIC TAPE FORMAT, AND RECORDING MEDIUM THEREFOR

This application is a continuation of U.S. Application Ser. No. 09/818,402, filed Mar. 27, 2001 now U.S. Pat. No. 6,996,330, which is hereby incorporated by reference in its entirety herein.

BACKGROUND OF THE INVENTION

1. Field of the Invention

The present invention generally relates to magnetic tape recording apparatuses and methods and magnetic tape formats, and to recording media therefor. More specifically, the invention relates to a magnetic tape recording apparatus and method for recording or reading high-quality video data on or from magnetic tape. The invention also relates to a magnetic tape format for use in the above-described magnetic tape recording apparatus and method and to a recording medium for storing a program implementing the above-described method.

2. Description of the Related Art

Along with advanced compression techniques, video data can be compressed and recorded on magnetic tape according to the digital video (DV) system. The format for use in the DV system is defined as a DV format of consumer digital video cassette recorders.

FIG. 1 illustrates the configuration of one track of a related DV format. In the DV format, video data is recorded after being subjected to 24-25 conversion. The numbers of bits shown in FIG. 1 represent numbers after 24-25 conversion has been performed on the video data.

The length of one track is substantially equal to a portion of magnetic tape up to a winding angle of 174 degrees. Outside the one-track portion, a 1250-bit overwrite margin is formed for preventing data from remaining recorded.

The length of one track is 134975 bits when a rotary head is rotated in synchronization with a frequency of 60×1000/1001 Hz, and is 134850 bits when the rotary head is rotated in synchronization with a frequency of 60 Hz.

In the one-track portion, an insert and track information (ITI) sector, an audio sector, a video sector, and a subcode sector are sequentially disposed in the tracing direction of the rotary head (from the left to right in FIG. 1). A gap G1 is formed between the ITI sector and the audio sector, a gap G2 is formed between the audio sector and the video sector, and a gap G3 is formed between the video sector and the subcode sector.

The length of the ITI sector is 3600 bits. In the ITI sector, a 1400-bit preamble for generating a clock, a start sync area (SSA), and a track information area (TIA) (1920 bits in total are assigned to the SSA and the TIA) are sequentially disposed. In the SSA, the bit string (sync number) required for detecting the position of the TIA is indicated. In the TIA, information indicating whether the format is a consumer DV format and whether the format is an SP mode or an LP mode, and information concerning the pattern of a one-frame pilot signal is recorded. After the TIA, a 280-bit postamble is disposed. The length of the gap G1 is 625 bits.

The length of the audio sector is 11550 bits. The first 400 bits and the last 500 bits serve as a preamble and a postamble, respectively, and the remaining 10650 bits between the preamble and the postamble is used as audio data. The length of the gap G2 is 700 bits.

The length of the video sector is 113225 bits. The first 400 bits and the last 925 bits serve as a preamble and a postamble, respectively, and the remaining 111900 bits between the preamble and the postamble are used as video data. The length of the gap G3 is 1550 bits.

The length of the subcode sector is 3725 bits when the rotary head is rotated at a frequency of 60×1000/1001 Hz, and is 3600 bits when the rotary head is rotated at a frequency of 60 Hz. The first 1200 bits and the last 1325 bits or 1200 bits (depending on the frequency of the rotary head as discussed above) serve as a preamble and a postamble, respectively, and the remaining 1200 bits between the preamble and the postamble are used as subcode data.

FIG. 2 illustrates the configuration of the video sector shown in FIG. 1. The video sector is formed of 149 90-byte sync blocks, as shown in FIG. 2. Among the 149 sync blocks, 138 sync blocks are formed of a two-byte sync, a three-byte ID, 77-byte video data, and parity C1 (inner error correcting code). In the remaining 11 sync blocks, 77-byte parity C2 (outer error correcting code) is substituted for the video data.

In the DV format, not only the provision of the gaps G1, G2, and G3, but also a preamble and a postamble are formed for each sector. That is, the so-called "overhead" is large, and a sufficient recording rate cannot be obtained for the real data.

About 25 Mbps are required for recording high-quality video data (hereinafter referred to as "high definition (HD) video data"). In the above-described recording format, however, only 24 Mbps are ensured for the data compressed by the main profile/high level (MP@HL) method in the MPEG system, except for search image data. As a result, although standard-quality video data (hereinafter referred to as the "standard definition (SD) video data") can be recorded, HD video data cannot be recorded after being compressed with the MP@HL or MP@H-14 method.

Additionally, the MPEG method is becoming mainstream for compressing video data. The unit of transport stream (TS) packets of the MPEG-compressed video data is 188 bytes. To dispose such a transport packet in the synch blocks of the video sector shown in FIG. 2, three sync blocks are required, since each sync block is 77 bytes, (231 bytes (=77 bytes×three sync blocks)), thereby causing a redundancy of 43 bytes. Thus, each sync block has about 14 redundancy bytes.

In this manner, according to the DV format, transport packets cannot be efficiently recorded.

SUMMARY OF THE INVENTION

Accordingly, in view of the above background, it is an object of the present invention to efficiently record transport packets.

In order to achieve the above object, according to one aspect of the present invention, there is provided a magnetic tape recording apparatus for recording digital data on tracks of a magnetic tape by using a rotary head. The magnetic tape recording apparatus includes a formatting unit for adding error correcting code to each of first group data including video data, audio data, or search data, and second group data including subcode data related to the first group data, and for formatting the first group data and the second group data so that they are continuously disposed on the tracks of the magnetic tape. A supply unit supplies the data formatted by the formatting unit to the rotary head so as to record the data on the magnetic tape. The formatting unit continuously disposes 139 sync blocks on each of the tracks, each of the 139 sync blocks having 111 bytes. Among the 139 sync blocks, 121 sync blocks each consist of a two-byte detection pattern for detecting the sync block, three-byte identification information for identifying the sync block, 96-byte main data, and 10-byte inner error correcting code added to the identification information and the main data, and the remaining 18 sync blocks each consist of the two-byte detection pattern, the three-byte identification information, 96-byte outer error correcting code, and the 10-byte inner error correcting code. The outer error correcting code is provided for each group of the 139 sync blocks obtained by dividing 2224 sync blocks contained in sixteen tracks by sixteen planes, 1668 sync blocks contained in twelve tracks by twelve planes, or 1112 sync blocks contained in eight tracks by eight planes. The sync blocks are arranged on the magnetic tape so that the distance between the sync blocks belonging to the identical plane is constant among the planes.

According to another aspect of the present invention, there is provided a magnetic tape recording method for use in a magnetic tape recording apparatus for recording digital data on tracks of a magnetic tape by using a rotary head. The magnetic tape recording method includes: a formatting step of adding error correcting code to each of first group data including video data, audio data, or search data, and second group data including subcode data related to the first group data, and formatting the first group data and the second group data so that they are continuously disposed on the tracks of the magnetic tape; and a supply step of supplying the data formatted in the formatting step to the rotary head so as to record the data on the magnetic tape. The formatting step continuously disposes 139 sync blocks on each of the tracks, each of the 139 sync blocks having 111 bytes. Among the 139 sync blocks, 121 sync blocks each consist of a two-byte detection pattern for detecting the sync block, three-byte identification information for identifying the sync block, 96-byte main data, and 10-byte inner error correcting code added to the identification information and the main data, and the remaining 18 sync blocks each consist of the two-byte detection pattern, the three-byte identification information, 96-byte outer error correcting code, and the 10-byte inner error correcting code. The outer error correcting code is provided for each group of the 139 sync blocks obtained by dividing 2224 sync blocks contained in sixteen tracks by sixteen planes, 1668 sync blocks contained in twelve tracks by twelve planes, or 1112 sync blocks contained in eight tracks by eight planes. The sync blocks are arranged on the magnetic tape so that the distance between the sync blocks belonging to the identical plane is constant among the planes.

According to still another aspect of the present invention, there is provided a recording medium for storing a computer readable program for allowing a magnetic tape recording apparatus to record digital data on tracks of a magnetic tape by using a rotary head. The computer readable program includes: a formatting step of adding error correcting code to each of first group data including video data, audio data, or search data, and second group data including subcode data related to the first group data, and formatting the first group data and the second group data so that they are continuously disposed on the tracks of the magnetic tape; and a supply step of supplying the data formatted in the formatting step to the rotary head so as to record the data on the magnetic tape. The formatting step continuously disposes 139 sync blocks on each of the tracks, each of the 139 sync blocks having 111 bytes. Among the 139 sync blocks, 121 sync blocks each consist of a two-byte detection pattern for detecting the sync block, three-byte identification information for identifying the sync block, 96-byte main data, and 10-byte inner error correcting code added to the identification information and the main data, and the remaining 18 sync blocks each consist of the two-byte detection pattern, the three-byte identification information, 96-byte outer error correcting code, and the 10-byte inner error correcting code. The outer error correcting code is provided for each group of the 139 sync blocks obtained by dividing 2224 sync blocks contained in sixteen tracks by sixteen planes, 1668 sync blocks contained in twelve tracks by twelve planes, or 1112 sync blocks contained in eight tracks by eight planes. The sync blocks are arranged on the magnetic tape so that the distance between the sync blocks belonging to the identical plane is constant among the planes.

According to a further aspect of the present invention, there is provided a format of a magnetic tape having tracks on which digital data is recorded by using a rotary head. The format includes error correcting code added to each of first group data including video data, audio data, or search data, and second group data including subcode data related to the first group data. The first group data and the second group data are formatted so that they are continuously disposed on the tracks of the magnetic tape. 139 sync blocks, each of the 139 sync blocks having 111 bytes, are disposed on each of the tracks. Among the 139 sync blocks, 121 sync blocks each consist of a two-byte detection pattern for detecting the sync block, three-byte identification information for identifying the sync block, 96-byte main data, and 10-byte inner error correcting code added to the identification information and the main data, and the remaining 18 sync blocks each consist of the two-byte detection pattern, the three-byte identification information, 96-byte outer error correcting code, and the 10-byte inner error correcting code. The outer error correcting code is provided for each group of the 139 sync blocks obtained by dividing 2224 sync blocks contained in sixteen tracks by sixteen planes, 1668 sync blocks contained in twelve tracks by twelve planes, or 1112 sync blocks contained in eight tracks by eight planes. The sync blocks are arranged on the magnetic tape so that the distance between the sync blocks belonging to the identical plane is constant among the planes.

According to a yet further aspect of the present invention, there is provided a magnetic tape recording apparatus for recording digital data on tracks of a magnetic tape by using a rotary head. The magnetic tape recording apparatus includes a formatting unit for adding error correcting code to each of first group data including video data, audio data, or search data, and second group data including subcode data related to the first group data, and for formatting the first group data and the second group data so that they are continuously disposed on the tracks of the magnetic tape. A supply unit supplies the data formatted by the formatting unit to the rotary head so as to record the data on the magnetic tape. The formatting unit continuously disposes 141 sync blocks on each of the tracks, each of the 141 sync blocks having 111 bytes. Among the 141 sync blocks, 123 sync blocks each consist of a two-byte detection pattern for detecting the sync block, three-byte identification information for identifying the sync block, 96-byte main data, and 10-byte inner error correcting code added to the identification information and the main data, and the remaining 18 sync blocks each consist of the two-byte detection pattern, the three-byte identification information, 96-byte outer error correcting code, and the 10-byte inner error correcting code. The outer error correcting code is provided for each group of the 141 sync blocks obtained by dividing 2256 sync blocks contained in sixteen tracks by sixteen planes, 1692 sync blocks contained in twelve tracks by twelve planes, or 1128 sync blocks contained in eight tracks by eight planes. The sync blocks are arranged on the magnetic tape so that the distance between the sync blocks belonging to the identical plane is constant among the planes.

According to a further aspect of the present invention, there is provided a magnetic tape recording method for use in a magnetic tape recording apparatus for recording digital data on tracks of a magnetic tape by using a rotary head. The magnetic tape recording method includes: a formatting step of adding error correcting code to each of first group data including video data, audio data, or search data, and second group data including subcode data related to the first group data, and formatting the first group data and the second group data so that they are continuously disposed on the tracks of the magnetic tape; and a supply step of supplying the data formatted in the formatting step to the rotary head so as to record the data on the magnetic tape. The formatting step continuously disposes 141 sync blocks on each of the tracks, each of the 141 sync blocks having 111 bytes. Among the 141 sync blocks, 123 sync blocks each consist of a two-byte detection pattern for detecting the sync block, three-byte identification information for identifying the sync block, 96-byte main data, and 10-byte inner error correcting code added to the identification information and the main data, and the remaining 18 sync blocks each consist of the two-byte detection pattern, the three-byte identification information, 96-byte outer error correcting code, and the 10-byte inner error correcting code. The outer error correcting code is provided for each group of the 141 sync blocks obtained by dividing 2256 sync blocks contained in sixteen tracks by sixteen planes, 1692 sync blocks contained in twelve tracks by twelve planes, or 1128 sync blocks contained in eight tracks by eight planes. The sync blocks are arranged on the magnetic tape so that the distance between the sync blocks belonging to the identical plane is constant among the planes.

According to a further aspect of the present invention, there is provided a recording medium for storing a computer readable program which allows a magnetic tape recording apparatus to record digital data on tracks of a magnetic tape by using a rotary head. The computer readable program includes: a formatting step of adding error correcting code to each of first group data including video data, audio data, or search data, and second group data including subcode data related to the first group data, and formatting the first group data and the second group data so that they are continuously disposed on the tracks of the magnetic tape; and a supply step of supplying the data formatted in the formatting step to the rotary head so as to record the data on the magnetic tape. The formatting step continuously disposes 141 sync blocks on each of the tracks, each of the 141 sync blocks having 111 bytes. Among the 141 sync blocks, 123 sync blocks each consist of a two-byte detection pattern for detecting the sync block, three-byte identification information for identifying the sync block, 96-byte main data, and 10-byte inner error correcting code added to the identification information and the main data, and the remaining 18 sync blocks each consist of the two-byte detection pattern, the three-byte identification information, 96-byte outer error correcting code, and the 10-byte inner error correcting code. The outer error correcting code is provided for each group of the 141 sync blocks obtained by dividing 2256 sync blocks contained in sixteen tracks by sixteen planes, 1692 sync blocks contained in twelve tracks by twelve planes, or 1128 sync blocks contained in eight tracks by eight planes. The sync blocks are arranged on the magnetic tape so that the distance between the sync blocks belonging to the identical plane is constant among the planes.

According to a further aspect of the present invention, there is provided a format of a magnetic tape having tracks on which digital data is recorded by using a rotary head. The format includes error correcting code added to each of first group data including video data, audio data, or search data, and second group data including subcode data related to the first group data. The first group data and the second group data are formatted so that they are continuously disposed on the tracks of the magnetic tape. The 141 sync blocks, each of the 141 sync blocks having 111 bytes, are continuously disposed on each of the tracks. Among the 141 sync blocks, 123 sync blocks each consist of a two-byte detection pattern for detecting the sync block, three-byte identification information for identifying the sync block, 96-byte main data, and 10-byte inner error correcting code added to the identification information and the main data, and the remaining 18 sync blocks each consist of the two-byte detection pattern, the three-byte identification information, 96-byte outer error correcting code, and the 10-byte inner error correcting code: The outer error correcting code is provided for each group of the 141 sync blocks obtained by dividing 2256 sync blocks contained in sixteen tracks by sixteen planes, 1692 sync blocks contained in twelve tracks by twelve planes, or 1128 sync blocks contained in eight tracks by eight planes. The sync blocks are arranged on the magnetic tape so that the distance between the sync blocks belonging to the identical plane is constant among the planes.

According to a further aspect of the present invention, there is provided a magnetic tape recording apparatus for recording digital data on tracks of a magnetic tape by using a rotary head. The magnetic tape recording apparatus includes a formatting unit for adding error correcting code to each of first group data including video data, audio data, or search data, and second group data including subcode data related to the first group data, and for formatting the first group data and the second group data so that they are continuously disposed on the tracks of the magnetic tape. A supply unit supplies the data formatted by the formatting unit to the rotary head so as to record the data on the magnetic tape. The formatting unit continuously disposes 135 sync blocks on each of the tracks, each of the 135 sync blocks having 114 bytes. Among the 135 sync blocks, 118 sync blocks each consist of a two-byte detection pattern for detecting the sync block, three-byte identification information for identifying the sync block, 99-byte main data, and 10-byte inner error correcting code added to the identification information and the main data, and the remaining 17 sync blocks each consist of the two-byte detection pattern, the three-byte identification information, 99-byte outer error correcting code, and the 10-byte inner error correcting code. The outer error correcting code is provided for each group of the 135 sync blocks obtained by dividing 2160 sync blocks contained in sixteen tracks by sixteen planes, 1620 sync blocks contained in twelve tracks by twelve planes, or 1080 sync blocks contained in eight tracks by eight planes. The sync blocks are arranged on the magnetic tape so that the distance between the sync blocks belonging to the identical plane is constant among the planes.

According to a further aspect of the present invention, there is provided a magnetic tape recording method for use in a magnetic tape recording apparatus for recording digital data on tracks of a magnetic tape by using a rotary head. The magnetic tape recording method includes: a formatting step of adding error correcting code to each of first group data including video data, audio data, or search data, and second group data including subcode data related to the first group data, and formatting the first group data and the second group data so that they are continuously disposed on the tracks of the magnetic tape; and a supply step of supplying the data formatted in the formatting step to the rotary head so as to record the data on the magnetic tape. The formatting step continuously disposes 135 sync blocks on each of the tracks, each of the 135 sync blocks having 114 bytes. Among the 135 sync blocks, 118 sync blocks each consist of a two-byte detection pattern for detecting the sync block, three-byte identification information for identifying the sync block, 99-byte main data, and 10-byte inner error correcting code added to the identification information and the main data, and the remaining 17 sync blocks each consist of the two-byte detection pattern, the three-byte identification information, 99-byte outer error correcting code, and the 10-byte inner error correcting code. The outer error correcting code is provided for each group of the 135 sync blocks obtained by dividing 2160 sync blocks contained in sixteen tracks by sixteen planes, 1620 sync blocks contained in twelve tracks by twelve planes, or 1080 sync blocks contained in eight tracks by eight planes. The sync blocks are arranged on the magnetic tape so that the distance between the sync blocks belonging to the identical plane is constant among the planes.

According to a further aspect of the present invention, there is provided a recording medium for storing a computer readable program which allows a magnetic tape recording apparatus to record digital data on tracks of a magnetic tape by using a rotary head. The computer readable program includes: a formatting step of adding error correcting code to each of first group data including video data, audio data, or search data, and second group data including subcode data related to the first group data, and formatting the first group data and the second group data so that they are continuously disposed on the tracks of the magnetic tape; and a supply step of supplying the data formatted in the formatting step to the rotary head so as to record the data on the magnetic tape. The formatting step continuously disposes 135 sync blocks on each of the tracks, each of the 135 sync blocks having 114 bytes. Among the 135 sync blocks, 118 sync blocks each consist of a two-byte detection pattern for detecting the sync block, three-byte identification information for identifying the sync block, 99-byte main data, and 10-byte inner error correcting code added to the identification information and the main data, and the remaining 17 sync blocks each consist of the two-byte detection pattern, the three-byte identification information, 99-byte outer error correcting code, and the 10-byte inner error correcting code. The outer error correcting code is provided for each group of the 135 sync blocks obtained by dividing 2160 sync blocks contained in sixteen tracks by sixteen planes, 1620 sync blocks contained in twelve tracks by twelve planes, or 1080 sync blocks contained in eight tracks by eight planes. The sync blocks are arranged on the magnetic tape so that the distance between the sync blocks belonging to the identical plane is constant among the planes.

According to a further aspect of the present invention, there is provided a format of a magnetic tape having tracks on which digital data is recorded by using a rotary head. The format includes error correcting code added to each of first group data including video data, audio data, or search data, and second group data including subcode data related to the first group data. The first group data and the second group data are formatted so that they are continuously disposed on the tracks of the magnetic tape. 135 sync blocks, each of the 135 sync blocks having 114 bytes, are continuously disposed on each of the tracks. Among the 135 sync blocks, 118 sync blocks each consist of a two-byte detection pattern for detecting the sync block, three-byte identification information for identifying the sync block, 99-byte main data, and 10-byte inner error correcting code added to the identification information and the main data, and the remaining 17 sync blocks each consist of the two-byte detection pattern, the three-byte identification information, 99-byte outer error correcting code, and the 10-byte inner error correcting code. The outer error correcting code is provided for each group of the 135 sync blocks obtained by dividing 2160 sync blocks contained in sixteen tracks by sixteen planes, 1620 sync blocks contained in twelve tracks by twelve planes, or 1080 sync blocks contained in eight tracks by eight planes. The sync blocks are arranged on the magnetic tape so that the distance between the sync blocks belonging to the identical plane is constant among the planes.

According to a further aspect of the present invention, there is provided a magnetic tape recording apparatus for recording digital data on tracks of a magnetic tape by using a rotary head. The magnetic tape recording apparatus includes a formatting unit for adding error correcting code to each of first group data including video data, audio data, or search data, and second group data including subcode data related to the first group data, and for formatting the first group data and the second group data so that they are continuously disposed on the tracks of the magnetic tape. A supply unit supplies the data formatted by the formatting unit to the rotary head so as to record the data on the magnetic tape. The formatting unit continuously disposes 135 sync blocks on each of the tracks, each of the 135 sync blocks having 114 bytes. Among the 135 sync blocks, 118 sync blocks each consist of a two-byte detection pattern for detecting the sync block, three-byte identification information for identifying the sync block, 97-byte main data, and 12-byte inner error correcting code added to the identification information and the main data, and the remaining 17 sync blocks each consist of the two-byte detection pattern, the three-byte identification information, 97-byte outer error correcting code, and the 12-byte inner error correcting code. The outer error correcting code is provided for each group of the 135 sync blocks obtained by dividing 2160 sync blocks contained in sixteen tracks by sixteen planes, 1620 sync blocks contained in twelve tracks by twelve planes, or 1080 sync blocks contained in eight tracks by eight planes. The sync blocks are arranged on the magnetic tape so that the distance between the sync blocks belonging to the identical plane is constant among the planes.

According to a further aspect of the present invention, there is provided a magnetic tape recording method for use in a magnetic tape recording apparatus for recording digital data on tracks of a magnetic tape by using a rotary head. The magnetic tape recording method comprising: a formatting step of adding error correcting code to each of first group data including video data, audio data, or search data, and second group data including subcode data related to the first group data, and formatting the first group data and the second group data so that they are continuously disposed on the tracks of the magnetic tape; and a supply step of supplying the data formatted in the formatting step to the rotary head so as to record the data on the magnetic tape. The formatting step continuously disposes 135 sync blocks on each of the tracks, each of the 135 sync blocks having 114 bytes. Among the 135 sync blocks, 118 sync blocks each consist of a two-byte detection pattern for detecting the sync block, three-byte identification information for identifying the sync block, 97-byte main data, and 12-byte inner error correcting code added to the identification information and the main data, and the remaining 17 sync blocks each consist of the two-byte detection pattern, the three-byte identification information, 97-byte outer error correcting code, and the 12-byte inner error correcting code. The outer error correcting code is provided for each group of the 135 sync blocks obtained by dividing 2160 sync blocks contained in sixteen tracks by sixteen planes, 1620 sync blocks contained in twelve tracks by twelve planes, or 1080 sync blocks contained in eight tracks by eight planes. The sync blocks are arranged on the magnetic tape so that the distance between the sync blocks belonging to the identical plane is constant among the planes.

According to a further aspect of the present invention, there is provided a recording medium for storing a computer readable program which allows a magnetic tape recording apparatus to record digital data on tracks of a magnetic tape by using a rotary head. The computer readable program includes: a formatting step of adding error correcting code to each of first group data including video data, audio data, or search data, and second group data including subcode data related to the first group data, and formatting the first group data and the second group data so that they are continuously disposed on the tracks of the magnetic tape; and a supply step of supplying the data formatted in the formatting step to the rotary head so as to record the data on the magnetic tape. The formatting step continuously disposes 135 sync blocks on each of the tracks, each of the 135 sync blocks having 114 bytes. Among the 135 sync blocks, 118 sync blocks each consist of a two-byte detection pattern for detecting the sync block, three-byte identification information for identifying the sync block, 97-byte main data, and 12-byte inner error correcting code added to the identification information and the main data, and the remaining 17 sync blocks each consist of the two-byte detection pattern, the three-byte identification information, 97-byte outer error correcting code, and the 12-byte inner error correcting code. The outer error correcting code is provided for each group of the 135 sync blocks obtained by dividing 2160 sync blocks contained in sixteen tracks by sixteen planes, 1620 sync blocks contained in twelve tracks by twelve planes, or 1080 sync blocks contained in eight tracks by eight planes. The sync blocks are arranged on the magnetic tape so that the distance between the sync blocks belonging to the identical plane is constant among the planes.

According to a further aspect of the present invention, there is provided a format of a magnetic tape having tracks on which digital data is recorded by using a rotary head. The format includes error correcting code added to each of first group data including video data, audio data, or search data, and second group data including subcode data related to the first group data. The first group data and the second group data are formatted so that they are continuously disposed on the tracks of the magnetic tape. 135 sync blocks, each of the 135 sync blocks having 114 bytes, are continuously disposed on each of the tracks. Among the 135 sync blocks, 118 sync blocks each consist of a two-byte detection pattern for detecting the sync block, three-byte identification information for identifying the sync block, 97-byte main data, and 12-byte inner error correcting code added to the identification information and the main data, and the remaining 17 sync blocks each consist of the two-byte detection pattern, the three-byte identification information, 97-byte outer error correcting code, and the 12-byte inner error correcting code. The outer error correcting code is provided for each group of the 135 sync blocks obtained by dividing 2160 sync blocks contained in sixteen tracks by sixteen planes, 1620 sync blocks contained in twelve tracks by twelve planes, or 1080 sync blocks contained in eight tracks by eight planes. The sync blocks are arranged on the magnetic tape so that the distance between the sync blocks belonging to the identical plane is constant among the planes.

In the aforementioned magnetic tape recording apparatus and method, the recording medium, and the magnetic tape format, the video data may be high definition video data compressed by an MP@HL or MP@H-14 method.

BRIEF DESCRIPTION OF THE DRAWINGS

FIG. 9 illustrates an example of an ITI preamble of track F0 shown in FIG. 8;

FIG. 10 illustrates an example of an ITI preamble of track F1 shown in FIG. 8;

FIG. 11 illustrates an example of an ITI preamble of track F2 shown in FIG. 8;

FIG. 12 illustrates an example of SSA data of track F0 shown in FIG. 8;

FIG. 13 illustrates an example of SSA data of track F1 shown in FIG. 8;

FIG. 14 illustrates an example of SSA data of track F2 shown in FIG. 8;

FIG. 15 illustrates the configuration of a sync block of a TIA shown in FIG. 8;

FIG. 16 illustrates track information of the TIA shown in FIG. 8;

FIG. 17 illustrates information represented by APT of the TIA shown in FIG. 8;

FIG. 18 illustrates an example of TIA data of track F0 shown in FIG. 8;

FIG. 19 illustrates an example of TIA data of track F1 shown in FIG. 8;

FIG. 20 illustrates an example of TIA data of track F2 shown in FIG. 8;

FIG. 21 illustrates an example of data of an ITI postamble of track F0 shown in FIG. 8;

FIG. 22 illustrates an example of data of an ITI postamble of track F1 shown in FIG. 8;

FIG. 23 illustrates an example of data of an ITI postamble of track F2 shown in FIG. 8;

FIG. 32 illustrates the parity configuration of the ID of the DV format;

FIGS. 37, 38, and 39 illustrate the arrangement of sync blocks on magnetic tape after being interleaved on 16 planes over 16 tracks and being provided with parities;

FIGS. 40, 41, and 42 illustrate the arrangement of sync blocks on magnetic tape after being provided with parities and being interleaved on 16 planes over 16 tracks;

FIGS. 45 and 46 illustrate the arrangement of sync blocks on magnetic tape after being interleaved on 12 planes over 12 tracks and being provided with parities;

FIGS. 47 and 48 illustrate the arrangement of sync blocks on magnetic tape after being interleaved on 8 planes over 8 tracks and being provided with parities;

FIG. 50 is a block diagram illustrating another example of the configuration of a recording system for use in a magnetic tape recording/reading apparatus according to the present invention;

FIGS. 53, 54, and 55 illustrate the arrangement of sync blocks on magnetic tape after being interleaved on 16 planes over 16 tracks and being provided with parities;

FIGS. 56, 57, and 58 illustrate the arrangement of sync blocks on magnetic tape after being provided with parities and being interleaved on 16 planes over 16 tracks;

DESCRIPTION OF THE PREFERRED EMBODIMENTS

Figure 3:
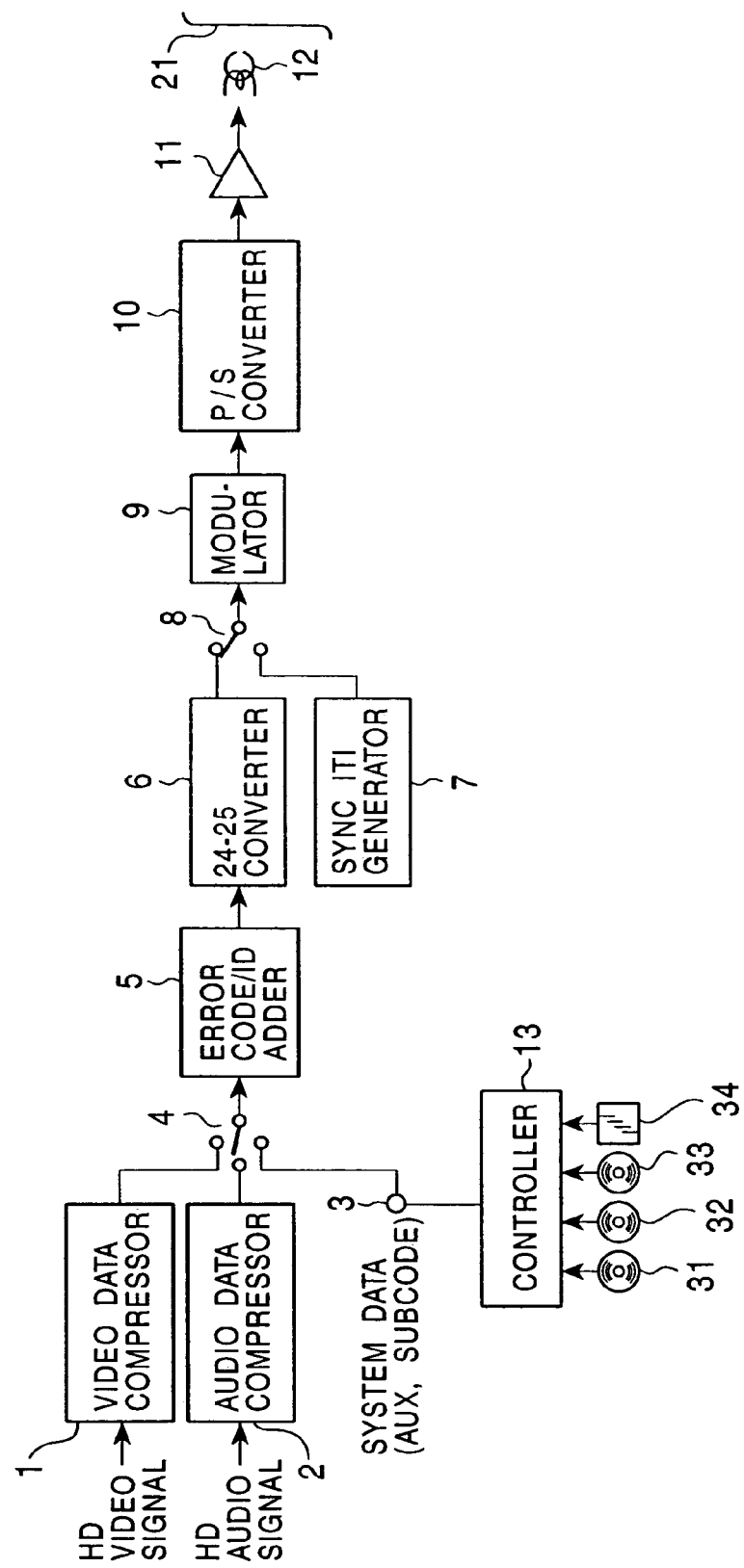
FIG. 3 is a block diagram illustrating an example of the configuration of a recording system for use in a magnetic tape recording/reading apparatus according to the present invention.

FIG. 3 illustrates the configuration of a recording system of a magnetic tape recording/reading apparatus to which the present invention is applied. A video data compressor 1 compresses input HD video signals according to an MPEG method, such as MP@HL or MP@H-14. An audio data compressor 2 compresses audio signals corresponding to the HD video signals according to, for example, an audio compression method corresponding to a DV-format compression method. System data, such as auxiliary data or subcode data, is input into a terminal 3 from a controller 13.

A switch 4 suitably selects one of the outputs from among the video data compressor 1, the audio data compressor 2, and the terminal 3 under the control of the controller 13, and supplies the selected output to an error code/ID adder 5. The error code/ID adder 5 adds an error detecting/correcting code or an ID to the input data and performs interleave processing for 16 tracks. The error code/ID adder 5 then outputs the resulting data to a 24-25 converter 6. The 24-25 converter 6 converts the data in units of 24 bits into data in units of 25 bits by adding one redundant bit, which is selected so that a pilot signal for a tracking operation appears at the highest level.

Figure 8:
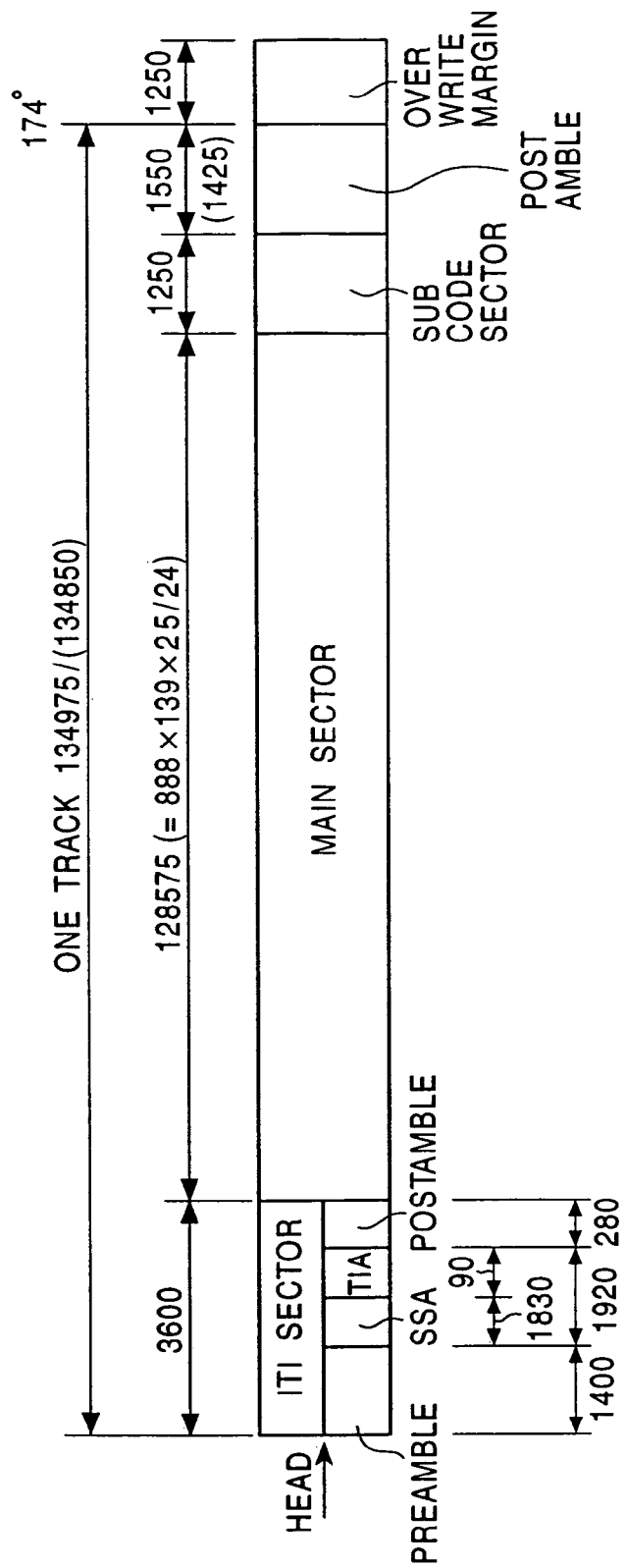
FIG. 8 illustrates the sector arrangement of the track shown in FIG. 4.

A sync ITI generator 7 generates sync data to be added to main data (FIG. 24) or subcode (FIG. 25), preamble and postamble data, and ITI data (FIG. 8).

A switch 8 selects one of the outputs from the 24-25 converter 6 and the sync ITI generator 7 under the control of the controller 13, and supplies the selected output to a modulator 9. The modulator 9 randomizes the input data so as to prevent "1"s or "0"s from being consecutive, and also modulates the data according to a method suitable for recording the data on magnetic tape 21 (the same method as that used for the DV format). The modulator 9 then supplies the resulting signal to a parallel-to-serial (P/S) converter 10.

The P/S converter 10 converts the input parallel data into serial data. An amplifier 11 then amplifies the data input from the P/S converter 10. The amplified data is supplied to a rotary head 12 attached to a rotary drum (not shown), and is then recorded on the magnetic tape 21.

Figure 4:
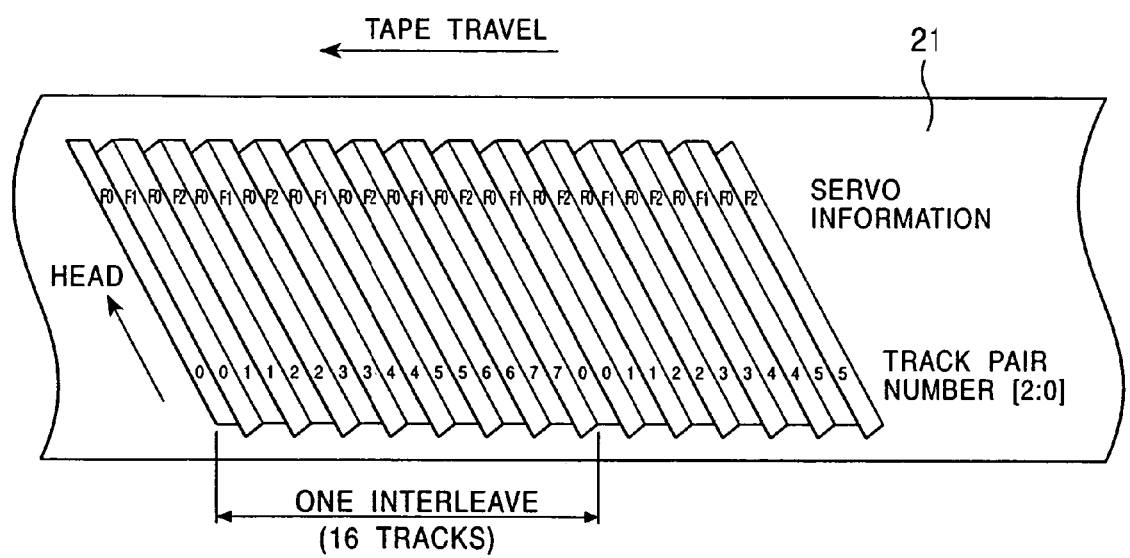
FIG. 4 illustrates the track format of magnetic tape shown in FIG. 3.

FIG. 4 illustrates the format of tracks which are formed on the magnetic tape 21 by the rotary head 12. The rotary head 12 traces over the magnetic tape 21 in the direction from the bottom right to the upper left in the drawing so as to form tracks which tilt with respect to the longitudinal direction of the magnetic tape 21. The magnetic tape 21 is conveyed from the right to the left direction in the drawing.

The tracks can be divided into F0, F1, and F2 according to the type of pilot signal used for a tracking control operation to be recorded on the tracks. The tracks are formed in the order of F0, F1, F0, F2, F0, F1, F0, and F2.

Figure 5:
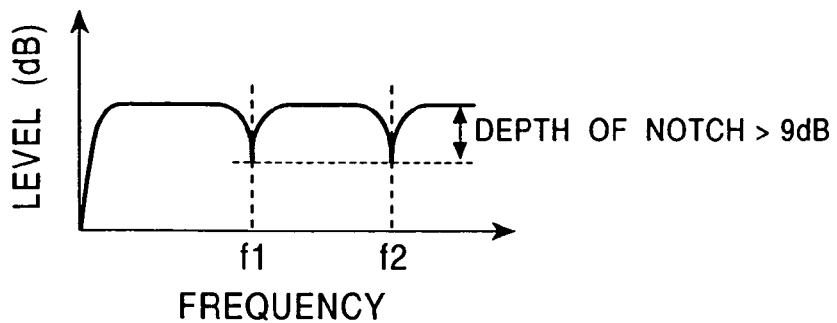
FIGS. 5, 6, and 7 illustrate tracking pilot signals to be recorded on the track shown in FIG. 4.
Figure 6:
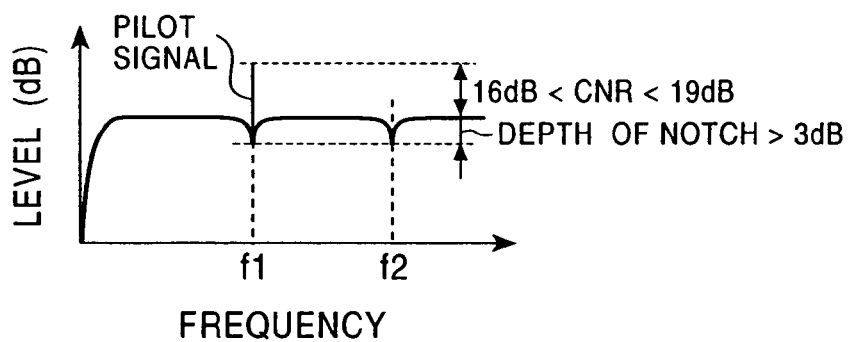
Figure 7:
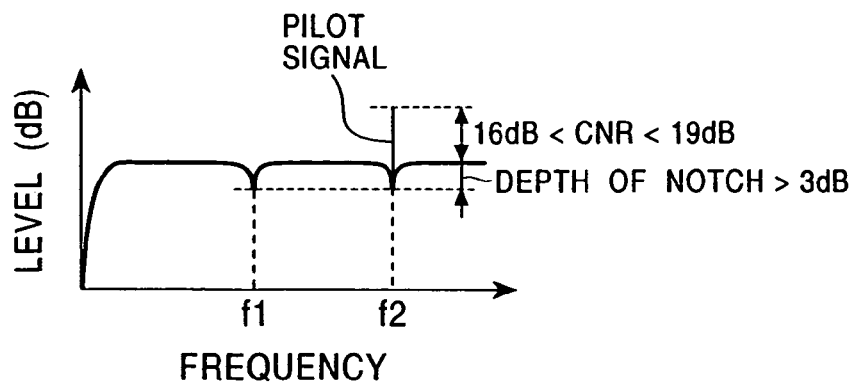

In track F0, as shown in FIG. 5, neither a pilot signal at frequency f1 nor a pilot signal at frequency f2 is recorded. In contrast, as shown in FIG. 6, in track F1, a pilot signal at frequency f1 is recorded. In track F2, as shown in FIG. 7, a pilot signal at frequency f2 is recorded.

Frequencies f1 and f2 are respectively 1/90 and 1/60 of the recording frequency of a channel bit.

The depth of the notch at frequency f1 or f2 of track F0 is, as shown in FIG. 5, 9 dB. In contrast, the carrier-to-noise ratio (CNR) of the pilot signal at frequency f1 or f2 is, as shown in FIG. 6 or 7, greater than 16 dB and smaller than 19 dB. The depth of the notch at frequency f1 or f2 is greater than 3 dB.

The track pattern having the above-described frequency characteristics is the same pattern used in the DV format. Accordingly, magnetic tape, a rotary head, a driving system, a demodulation system, and a control system for use in consumer digital video cassette recorders can be employed in the present invention. The track pitch and the tape speed are similar to those in the DV format.

FIG. 8 illustrates an example of the sector arrangement in each track. The number of bits of the individual elements shown in FIG. 8 are numbers after 24-25 conversion is performed on the data. The length of one track is 134975 bits when the rotary head 12 is rotated at a frequency of 60×1000/1001 Hz, and is 134850 bits when the rotary head 12 is rotated at a frequency of 60 Hz. The length of one track is equal to a portion of the magnetic tape 21 up to a winding angle of 174 degrees. After one track, a 1250-bit overwrite margin is formed for preventing data from remaining recorded.

Figure 1:
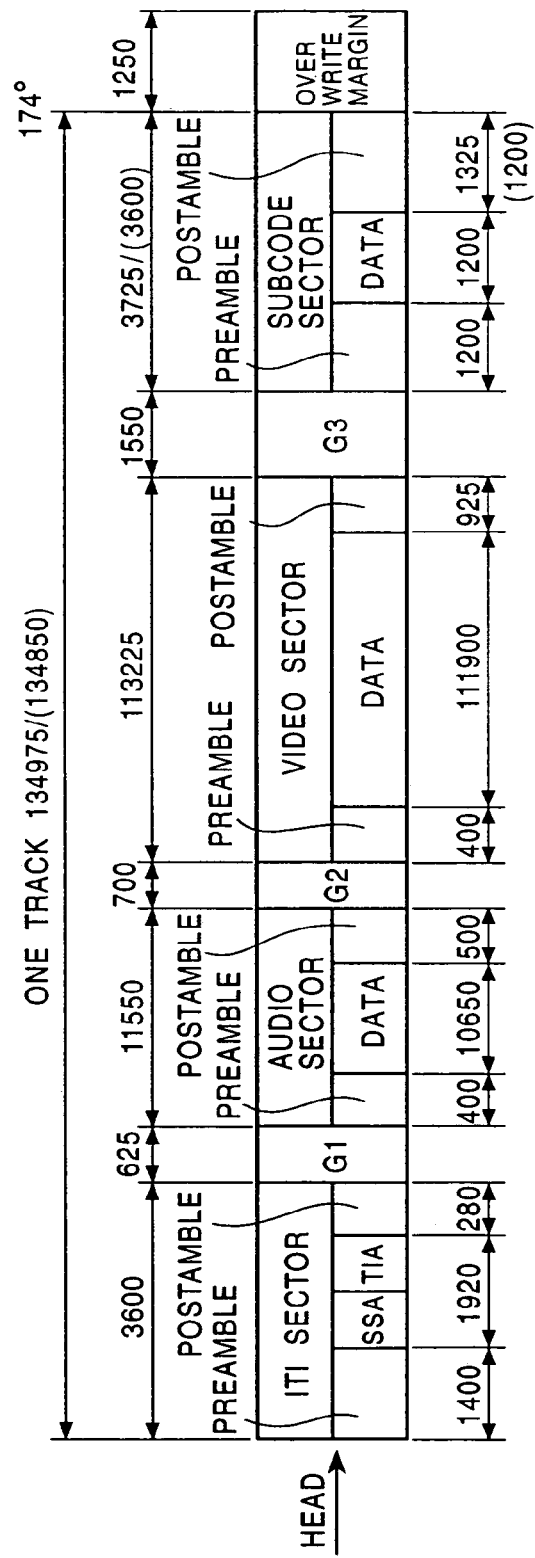
FIG. 1 illustrates the configuration of a track sector of a DV format.
Figure 2:
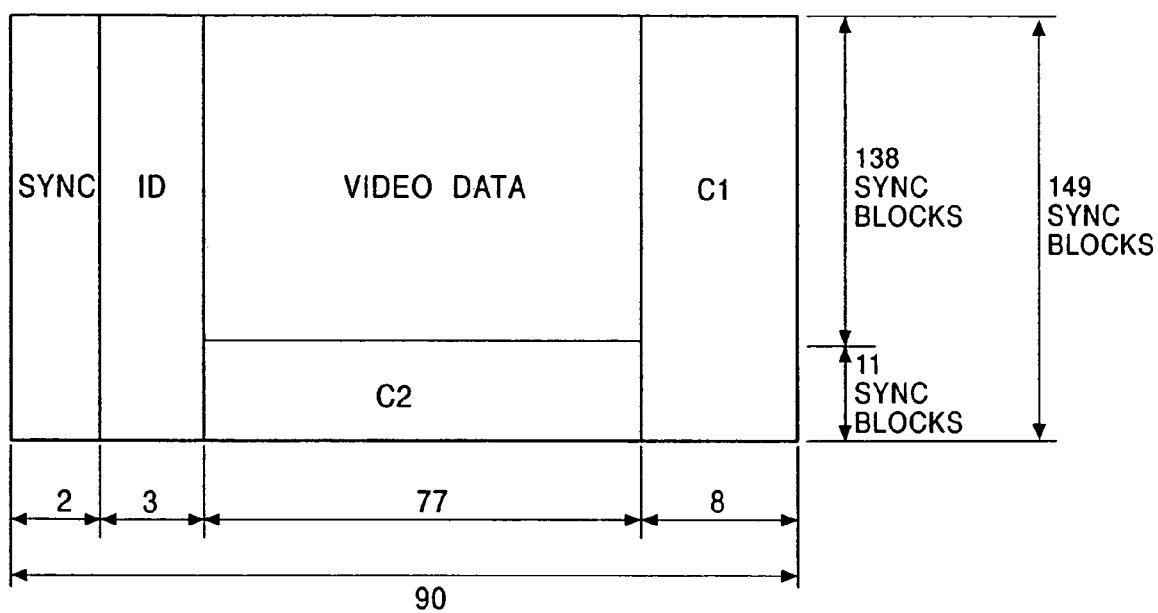
FIG. 2 illustrates the configuration of a video sector shown in FIG. 1.

In FIG. 8, the rotary head 12 traces over the track from the left to the right. At the head of the track, a 3600-bit ITI sector, which is similar to the counterpart shown in FIG. 1, is disposed. At the start of the ITI sector, a 1400-bit ITI preamble is disposed. The ITI preamble of track 0 has data, such as that shown in FIG. 9, and the ITI preamble of track 1 has data, such as that shown in FIG. 10. The ITI preamble of track 2 has data, such as that shown in FIG. 11. Based on the data of the ITI preamble, a clock is generated when the data is read from the magnetic tape 21.

Subsequent to the ITI preamble, a 1830-bit SSA is located. The SSA of track F0 is formed of data, such as that shown in FIG. 12, the SSA of track F1 includes data, such as that shown in FIG. 13, and the SSA of track F2 contains data, such as that shown in FIG. 14. The start of the subsequent TIA can be detected by the SSA.

The 90-bit TIA is positioned after the SSA. The TIA is formed of 30 sync blocks, and each block is formed of 30 bits ranging from b29 to b0, as shown in FIG. 15. The same data is recorded in three consecutive sync blocks. Accordingly, the same data is substantially repeated three times in the TIA.

Among the 30 bits (bits b29 through b0), the data shown in FIG. 16 is disposed for bits from b27 to b22, and bits from b17 to b12. That is, $APT_2$ is disposed in bits b12 and b13, $APT_1$ is positioned for bits 14 and b15, and $APT_0$ is positioned for bits 16 and b17.

The type of data recorded on the track in the DV format can be identified by $APT_2$, $APT_1$, and $APT_0$. For example, when the values of $APT_2$, $APT_1$, and $APT_0$ are "000", data for a consumer digital video cassette recorder, i.e., DV-format data, is recorded on the track. When the values of $APT_2$, $APT_1$, and $APT_0$ are "111", data is not recorded on the track. Accordingly, when the values "111" are detected as $APT_2$, $APT_1$, and $APT_0$, a DV-format-compatible magnetic-tape recording/reading apparatus does not perform a reading operation.

In this embodiment, as shown in FIG. 16, the values "111" are recorded as $APT_2$, $APT_1$, and $APT_0$. As a result, when the magnetic tape 21 shown in FIG. 3 is read by a DV-format-compatible magnetic-tape reading apparatus, a recording operation is not performed. In contrast, when the magnetic tape 21 is read by a HD-signal-compatible magnetic-tape recording/reading apparatus, a reading operation is performed assuming that HD video signal data is recorded on the magnetic tape 21

As shown in FIG. 16, $TP_1$ is recorded in bits b22 and b23, while $TP_0$ is recorded in bits b24 and b25. In the DV format, when the values of $TP_1$ and $TP_0$ are "11", the track pitch is 0 for an SP mode pitch. When the values of $TP_1$ and $TP_0$ are "10", the track pitch is 1 for an LP mode pitch. When the values of $TP_1$ and $TP_0$ are "01", the track pitch is 2. When the values of $TP_1$ and $TP_0$ are "00", the track pitch is 3. In the present invention, the definition of $TP_1$ and $TP_0$ is similar to that in the DV format.

In the example shown in FIG. 16, since $TP_1$ and $TP_0$ indicate "11", the SP mode is selected.

$PF_0$ and $PF_1$ are recorded in bit b26 and b27, respectively. PF stands for a pilot frame, and 0 represents pilot frame 0, and 1 represents pilot frame 1. Pilot frame 0 indicates that track F1 is disposed after track F0 as the first two tracks of the ten tracks forming one frame. Pilot frame 1 indicates that track F2 is disposed after track F0 as the above-described first two tracks.

That is, as discussed with reference to FIG. 4, tracks are formed in the order of F0, F1, F0, F2, F0, F1, F0, and F2. If the first two tracks of one predetermined frame are F0 and F1, the subsequent two tracks can be F0 and F1 or F0 and F2 according to the amount of data of the previous frame. The type of track pattern, i.e., F0 and F1 or F0 and F2, can be represented by the pilot frame.

As stated above, the bits of the TIA sync blocks are randomized so as to prevent a considerably large number of consecutive "1"s or "0"s from occurring. As a result, the TIA data formed of three sync blocks (90 bits), each having bits b29 through b0 shown in FIG. 15, of track F0 can be indicated as shown in FIG. 18. The TIA data of track F1 can be represented as shown in FIG. 19, and the TIA data of track F2 can be designated as shown in FIG. 20.

After the TIA, as shown in FIG. 8, a 280-bit postamble is disposed. The postamble of track 0 can be indicated as shown in FIG. 21, the postamble of track 1 can be represented as shown in FIG. 22, and the postamble of track 2 can be indicates as shown in FIG. 23. The data of the ITI sector is generated by the sync ITI generator 7.

After the postamble, a 128575-bit main sector is disposed. The structure of the main sector is shown in FIG. 24A.

Figure 24A:
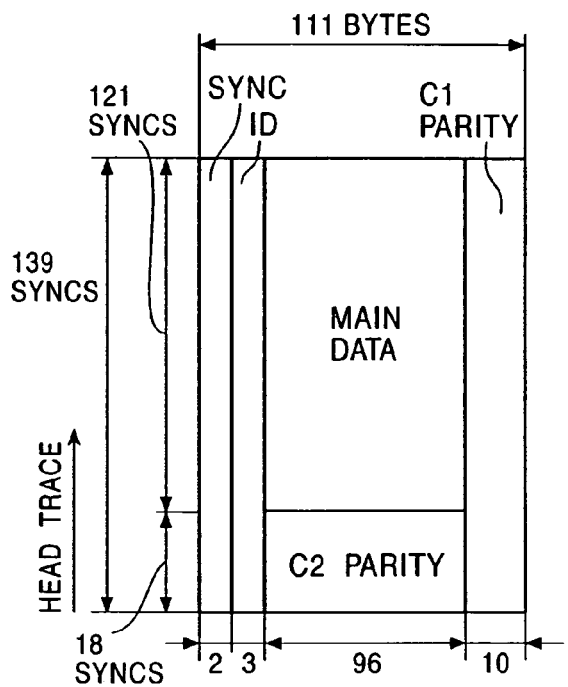
FIGS. 24A, 24B, and 24C illustrate an example of the configuration of the main sector shown in FIG. 8.

The main sector is formed of, as shown in FIG. 24A, 139 sync blocks, and each sync block has 888 bits (111 bytes). The first 121 sync blocks each have a 16-bit sync, a 24-bit ID, an eight-bit header, 760-bit main data, and 80-bit parity C1. The sync is generated by the sync ITI generator 7. The ID is added by the error code/ID adder 5. The header includes ID information indicating whether the main data is audio data, video data, search video data, transport stream data, or auxiliary data. The header data is supplied as one type of system data from the controller 13 via the terminal 3.

If the main data is video data, it is supplied from the video data compressor 1. If the main data is audio data, it is supplied from the audio data compressor 2. If the main data is auxiliary data, it is supplied from the controller 13 via the terminal 3.

The parity C1 is calculated for each sync block from the ID, the header, and the main data by the error code/ID adder 5.

Among the 139 sync blocks, the last 18 sync blocks are formed of the sync, the ID, parity C2, and parity C1. Parity C2 can be calculated based on the header or the main data in the longitudinal direction in FIG. 24A. This calculation is performed in the error code/ID adder 5.

The total amount of the data of the main sector is 888 bits×139 sync blocks=123432 bits, and becomes 128575 bits after 24-25 conversion. The maximum data rate when the rotary head 12 is rotated in synchronization with 60 Hz is substantially 760 bits×121 sync blocks×10 tracks×30 Hz=27.588 Mbps. This bit rate is sufficient to record MP@HL-compressed or MP@H-14-compressed HD video data, audio compressed data, auxiliary data, and search video data.

Figures 25, 26:
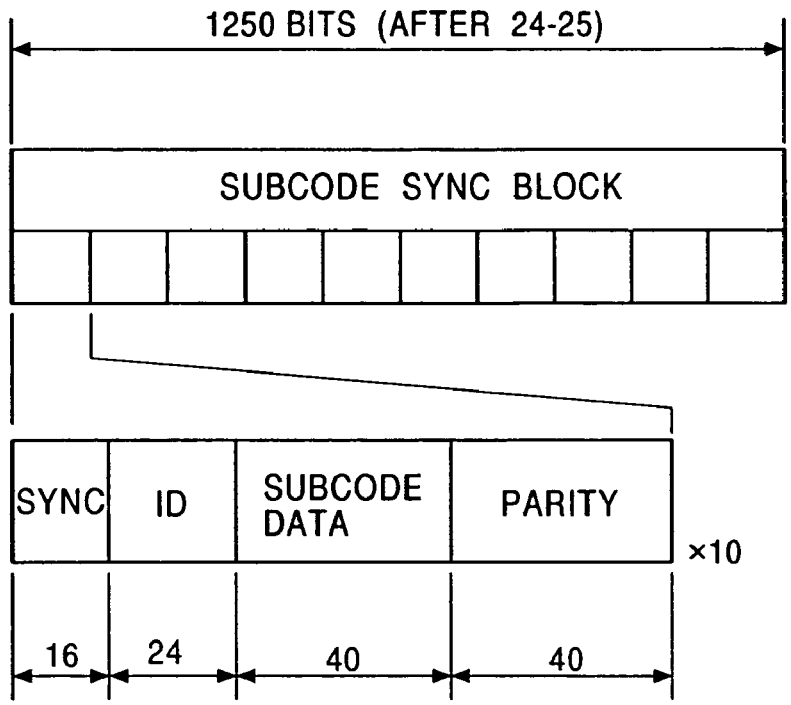
FIG. 25 illustrates the configuration of the subcode sector shown in FIG. 8.
FIG. 26 illustrates the pattern of the postamble shown in FIG. 8.

Subsequent to the main data, a 1250-bit subcode sector is disposed. The configuration of the subcode sector is shown in FIG. 25.

A one-track subcode sector is formed of 10 subcode sync blocks, and each subcode sync block is formed of a sync, an ID, subcode data, and a parity.

At the head of each subcode sync block of the 1250-bit (after 24-25 conversion) subcode sector, a 16-bit sync (before 24-25 conversion) is disposed, followed by a 24-bit ID. The sync is generated by the sync ITI generator 7, and the ID is added by the error code/ID adder 5.

After the ID, 40-bit subcode data is located. The subcode data is supplied from the controller 13 via the terminal 3, and includes, for example, a track number and a time code number. Subsequent to the subcode data, a 40-bit parity is added. The parity is added by the error code/ID adder 5.

The 120-bit subcode sync block data before 24-25 conversion becomes 125-bit (=120×25/24) data after 24-25 conversion.

After the subcode sector, a postamble is disposed. In the postamble, a combination of pattern A and pattern B required for generating a clock, for example, that shown in FIG. 26, is recorded. Pattern B has "1"s and "0"s inverted with respect to those of pattern A, and vice versa. By suitably combining pattern A and pattern B, the tracking patterns F0, F1, and F2 shown in FIGS. 5, 6, and 7, respectively, can be implemented. The run pattern shown in FIG. 9 represents a pattern after 24-25 conversion is performed by the 24-25 converter 6 shown in FIG. 3. The length of the postamble is 1550 bits when the rotary head 12 is rotated in synchronization with 60×1000/1001 Hz, and is 1425 bits when the rotary head 12 is rotated in synchronization with 60 Hz.

The operation of the recording system shown in FIG. 3 is as follows. A HD video signal is input, together with search video data (thumbnail data), into the video data compressor 1, and is compressed according to, for example, the MP@HL or MP@H-14 method. The audio signal is input into the audio data compressor 2, and is compressed according to a method similar to a DV-format-compatible method. System data, such as subcode data, auxiliary data, and the header, is supplied to the terminal 3 from the controller 13.

Under the control of the controller 13, the switch 4 appropriately incorporates the video data (including the search video data) output from the video data compressor 1, the audio data output from the audio data compressor 2, and the system data output from the terminal 3, and combines the above-described data and outputs it to the error code/ID adder 5.

The error code/ID adder 5 adds a 24-bit ID to each sync block of the main sector shown in FIG. 24A. The parity C1 shown in FIG. 24A is calculated for each sync block and is added, and instead of the header and the main data, the parity C2 is added to the last 18 sync blocks of the 139 sync blocks.

The error code/ID adder 5 also adds, as shown in FIG. 25, the 24-bit ID for each subcode sync block of the subcode data, and also calculates the 40-bit parity.

The error code/ID adder 5 retains 16 tracks of the main data and interleaves it across 16 tracks (subcode data is not interleaved).

The 24-25 converter 6 converts data in units of 24 bits supplied from the error code/ID adder 5 into data in units of 25 bits. Accordingly, the tracking pilot signal components at frequencies f1 and f2 shown in FIGS. 5 through 7 appear at the highest level.

The sync ITI generator 7 adds, as shown in FIG. 24A, a 16-bit sync to each sync block of the main sector. The sync ITI generator 7 also adds, as shown in FIG. 25, a 16-bit sync to each subcode sync block of the subcode sector. Additionally, the ITI generator 7 generates the run pattern of the postamble shown in FIG. 26, and also generates the ITI sector data.

More specifically, the above-described data is added or combined as follows. The controller 13 changes the switch 8 to select between the data output from the sync ITI generator 7 and the data from the 24-25 converter 6, and the switch 8 supplies the selected data to the modulator 9.

The modulator 9 randomizes the input data and also modulates it according to a DV-format-compatible method. The modulated data is then output to the P/S converter 10. The P/S converter 10 converts the input parallel data into serial data, and supplies it to the rotary head 12 via the amplifier 11. The rotary head 12 records the input data on the magnetic tape 21.

Figure 27:
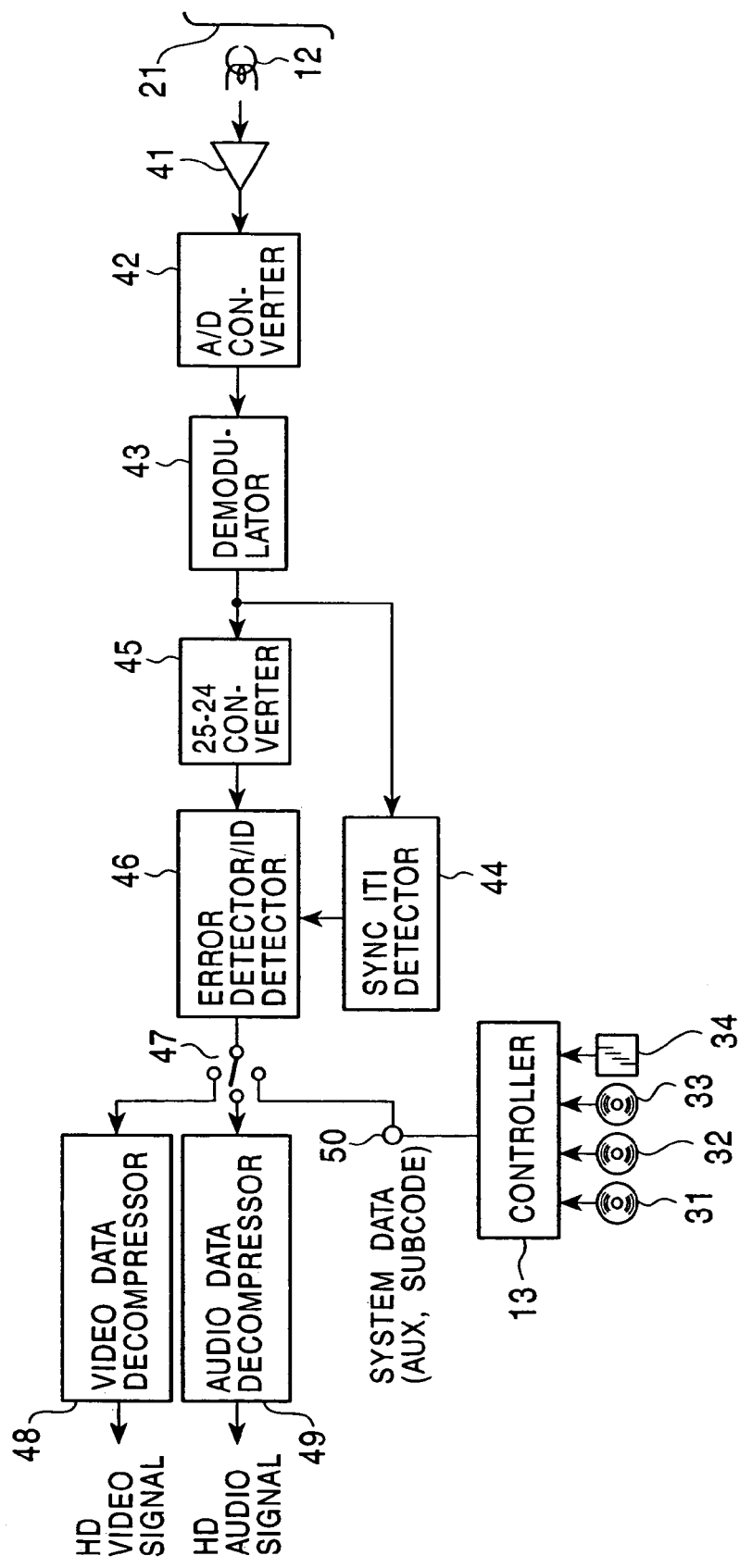
FIG. 27 is a block diagram illustrating an example of the configuration of a reading system for use in the magnetic tape recording/reading apparatus according to the present invention.

FIG. 27 illustrates the configuration of a reading system for reading data recorded on the magnetic tape 21 as discussed above.

The rotary head 12 reads the data recorded on the magnetic tape 21 and outputs it to an amplifier 41. The amplifier 41 amplifies the input signal and supplies it to an analog-to-digital (A/D) converter 42. The A/D converter 42 converts the input analog signal into a digital signal and supplies it to a demodulator 43. The demodulator 43 derandomizes the data supplied from the A/D converter 42 according to a method corresponding to the randomization method employed by the modulator 9, and also demodulates the derandomized data according to a method corresponding to the modulation method employed by the modulator 9.

A sync ITI detector 44 detects a sync of each sync block of the main sector shown in FIG. 24A, a sync of each subcode sync block of the subcode sector shown in FIG. 25, and the ITI sector shown in FIG. 8 from the demodulated data output from the demodulator 43. The sync ITI detector 44 then supplies the detected syncs to an error corrector/ID detector 46. A 25-24 converter 45 converts the data in units of 25 bits supplied from the demodulator 43 into data in units of 24 bits in accordance with the 24-25 conversion performed by the 24-25 converter 6, and then outputs the converted data to the error detector/ID converter 46.

The error corrector/ID converter 46 performs error correction, ID detection, and interleave processing based on the syncs input from the sync ITI detector 44. Under the control of a controller 13, a switch 47 outputs the video data (including search video data) to a video data decompressor 48, the audio data to an audio data decompressor 49, and system data, such as subcode data and auxiliary data, to the controller 13 via a terminal 50.

The video data decompressor 48 decompresses the input video data and converts the decompressed digital data into analog data, which is then output as an analog HD video signal. The audio data decompressor 49 decompresses the input audio data and converts the decompressed digital data into analog data, which is then output as an analog audio signal.

The reading operation of the reading system shown in FIG. 27 is as follows. The rotary head 12 reads the data recorded on the magnetic tape 21. The read data is then amplified by the amplifier 41 and is supplied to the A/D converter 42. The analog data is converted into digital data by the A/D converter 42 and is input into the demodulator 43. The digital data is then derandomized and demodulated by the demodulator 43 in accordance with a derandomization method and a demodulation method corresponding to the randomization method and the modulation method, respectively, performed by the modulator 9 shown in FIG. 3.

The output of the A/D converter 42 is also supplied to a servo circuit (not shown) in which pattern A and pattern B recorded in the postamble (FIG. 26) are read so as to generate a tracking pilot signal, thereby performing the tracking control operation. It should be noted that the tracking control signal is read from the overall track, though a tracking signal component read from the ITI sector appears at the highest level.

The 25-24 converter 45 converts the demodulated data in units of 25 bits into data in units of 24 bits, and outputs it to the error corrector/ID detector 46.

The sync ITI detector 44 detects the syncs of the main sector shown in FIG. 24A or the syncs of the subcode sector shown in FIG. 25 from the data output from the demodulator 43, and supplies the detected syncs to the error corrector/ID detector 46. The error corrector/ID detector 46 stores 16 tracks of the main data and performs deinterleave processing, and also performs error correcting of the main data by using parities C1 and C2 of the main sector shown in FIG. 24A. The error corrector/ID detector 46 also detects the ID of the main sector and determines whether the data recorded in each sync block is video data, audio data, auxiliary data, or search video data.

The error corrector/ID detector 46 also performs error correcting of the subcode data by using the parity of the subcode sector shown in FIG. 25, and detects the ID so as to determine the type of subcode data, i.e., whether the subcode data represents a track number or a time code number.

The switch 47 supplies the video data and the search video data to the video data decompressor 48 based on the ID detected by the error corrector/ID detector 46. The video data decompressor 48 decompresses the data according to a decompression method corresponding to the compression method employed by the video data compressor 1 shown in FIG. 3, and outputs the decompressed data as the video signal.

The switch 47 outputs the audio data to the audio data decompressor 49. The audio data decompressor 49 decompresses the data according to a decompression method corresponding to the compression method employed by the audio data compressor 2 shown in FIG. 3, and outputs the decompressed data as the audio signal.

The switch 47 also outputs the auxiliary data and subcode data output from the error corrector/ID detector 46 to the controller 13 via the terminal 50.

Figure 28:
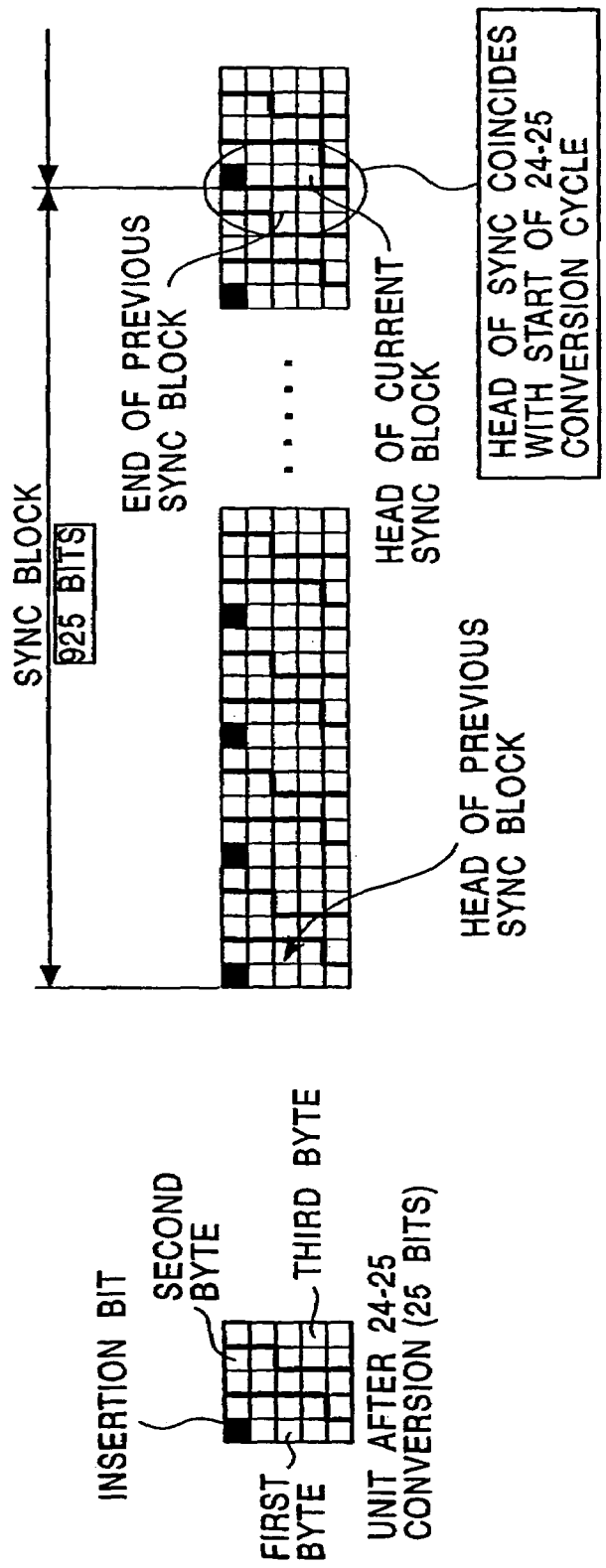
FIG. 28 illustrates the relationship between the length of a sync block and the 24-25 conversion cycle.

Details of the configuration of the main sector are further discussed below. As shown in FIG. 24A, each sync block of the main data has 111 bytes (=888 bits) consisting of a two-byte sync pattern, a three-byte ID, 96-byte main data, and 10-byte parity C1. The data length of the sync block after 24-25 conversion, i.e., 925 bits (=111×8×25/24) are a multiple of 25 bits, and also, 888 bits are a multiple of three bytes (24 bits). As a result, as shown in FIG. 28, the head of a sync block coincides with the start of a 24-25 conversion cycle, thereby facilitating signal processing.

Figure 29:
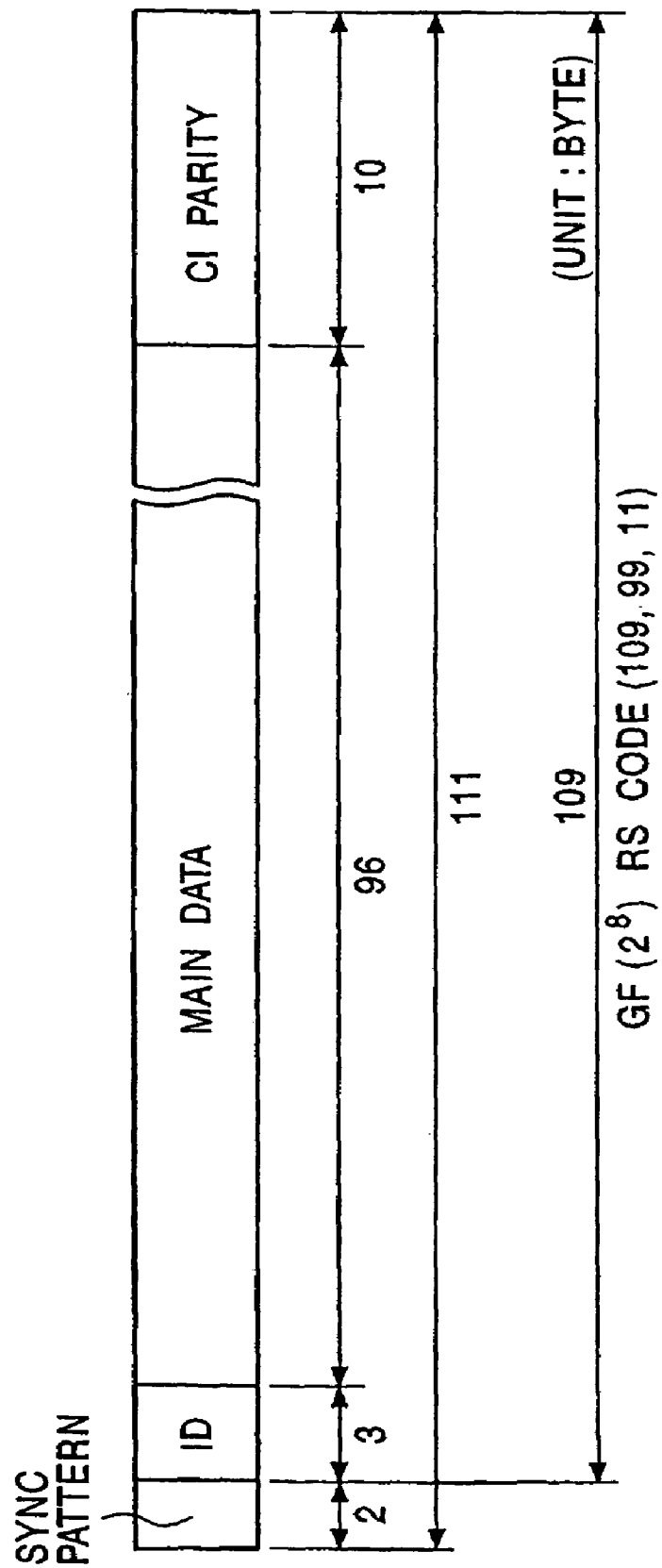
FIG. 29 illustrates the configuration of error correcting codes of a sync block.

As the inner error correcting code, as shown in FIG. 29, a Galois field GF ($2^8$) 109-byte Reed-Solomon code (109, 99, 11) is formed of a three-byte ID, 96-byte main data, and 10-byte parity C1. When the bit error probability of a read bit data string recorded on the magnetic tape 21 is indicated by Pb, the Galois field GF ($2^8$) symbol error probability $P_S$ can be expressed by the following equation.

$$P_S = 1 - (1-Pb)^8$$

The probability P that the Reed-Solomon code cannot be correctly decoded (impossible to be decoded or is erroneously decoded) can be expressed by the following equation.

$$P = 1 - \sum_{i=0}^{t} {}_{109}C_i \cdot (P_s)^i \cdot (1-P_s)^{109-i}$$

Figure 30:
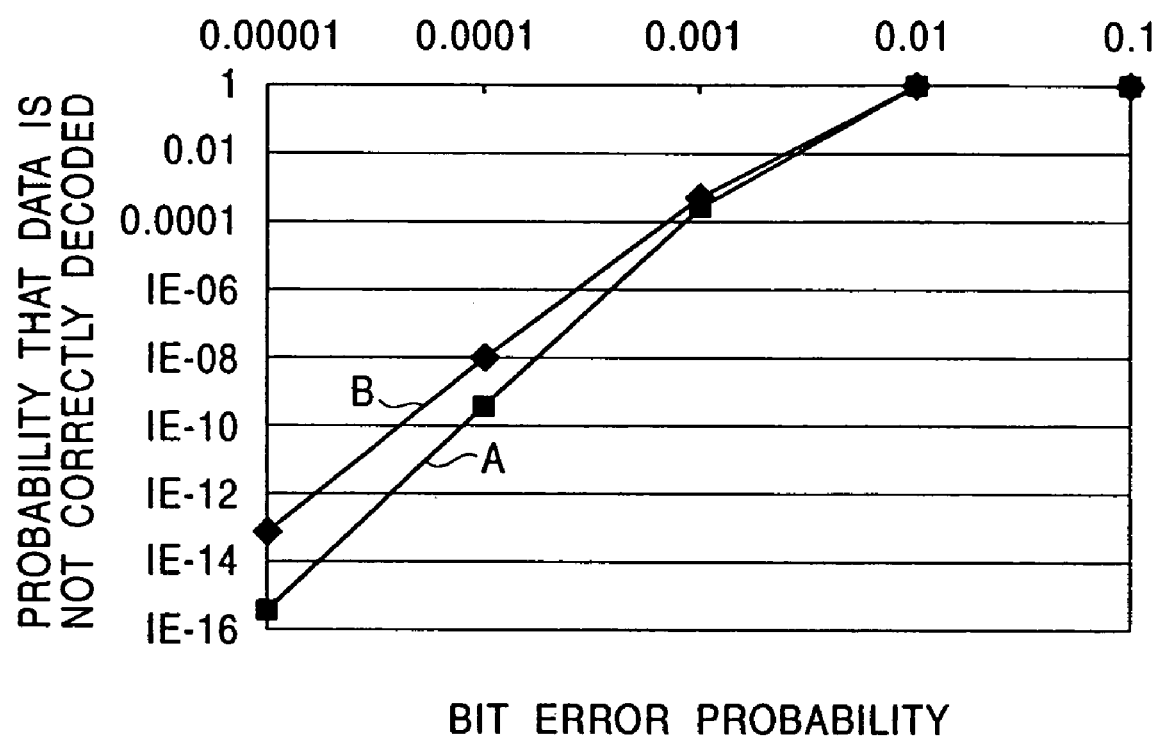
FIG. 30 illustrates the relationship between the bit error probability and the probability that data cannot be correctly decoded.

Curve A in FIG. 30 indicates the probability P that the Reed-Solomon code cannot be correctly decoded.

Figure 31:
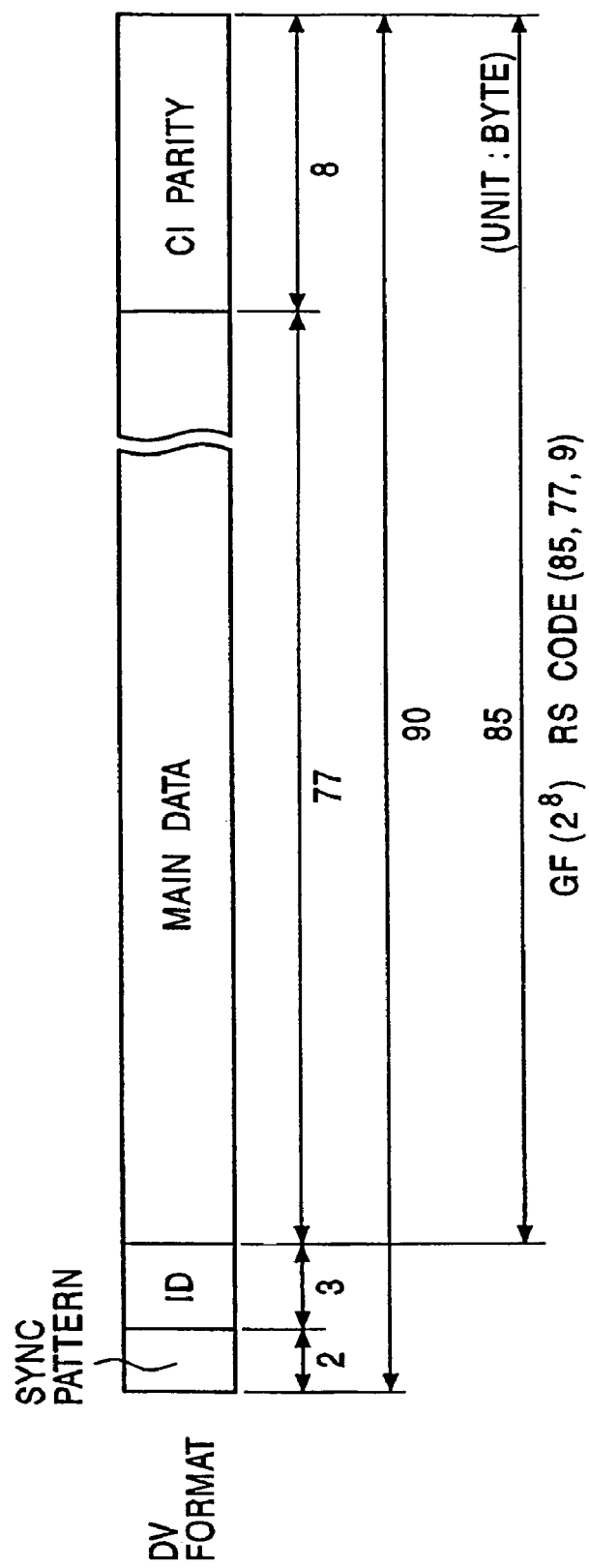
FIG. 31 illustrates the configuration of inner error correcting codes of a sync block of the DV format.

For comparison with curve A, the probability that DV format data cannot be correctly decoded is found. In the DV format, as shown in FIG. 31, as the inner error correcting code, a Galois field ($2^8$) Reed-Solomon code (85, 77, 9) is formed of 77-byte main data and 8-byte parity C1 without including the ID. The probability that the Reed-Solomon code cannot be correctly decoded is expressed by curve B in FIG. 30.

Curve A obtained by the format of the main sector according to the present invention shows that the probability that Reed-Solomon code cannot be correctly decoded when the bit error probability is around 0.0001 is about 1E-09. In contrast, curve B obtained by the DV format reveals that the above-described probability is about 1E-08. Thus, the probability P indicated by curve A is smaller than that of curve B by one and half orders of magnitude.

The probability Q that Reed-Solomon code is erroneously corrected is simply determined by the number of parity bits N and can be expressed by the following equation.

$$Q = 1/2^N$$

The number of parity bits in the DV format is 64 (=8×8), and the probability that the Reed-Solomon data is erroneously corrected can be expressed by the following expression.

$$QDV = 5.4E-20$$

In contrast, the number of parity bits in the present invention is 80 (=10×8), and the probability QIN that data is erroneously corrected can be expressed by the following equation.

$$QIN = 8.3E-25$$

That is, according to the present invention, the probability that the Reed-Solomon code is erroneously corrected is reduced by about five orders of magnitudes over the DV format.

Additionally, in the present invention, the ID is included in the inner error correcting code, as shown in FIG. 29. Conversely, as shown in FIG. 31, the ID is not included in the inner error correcting code.

Figure 32:
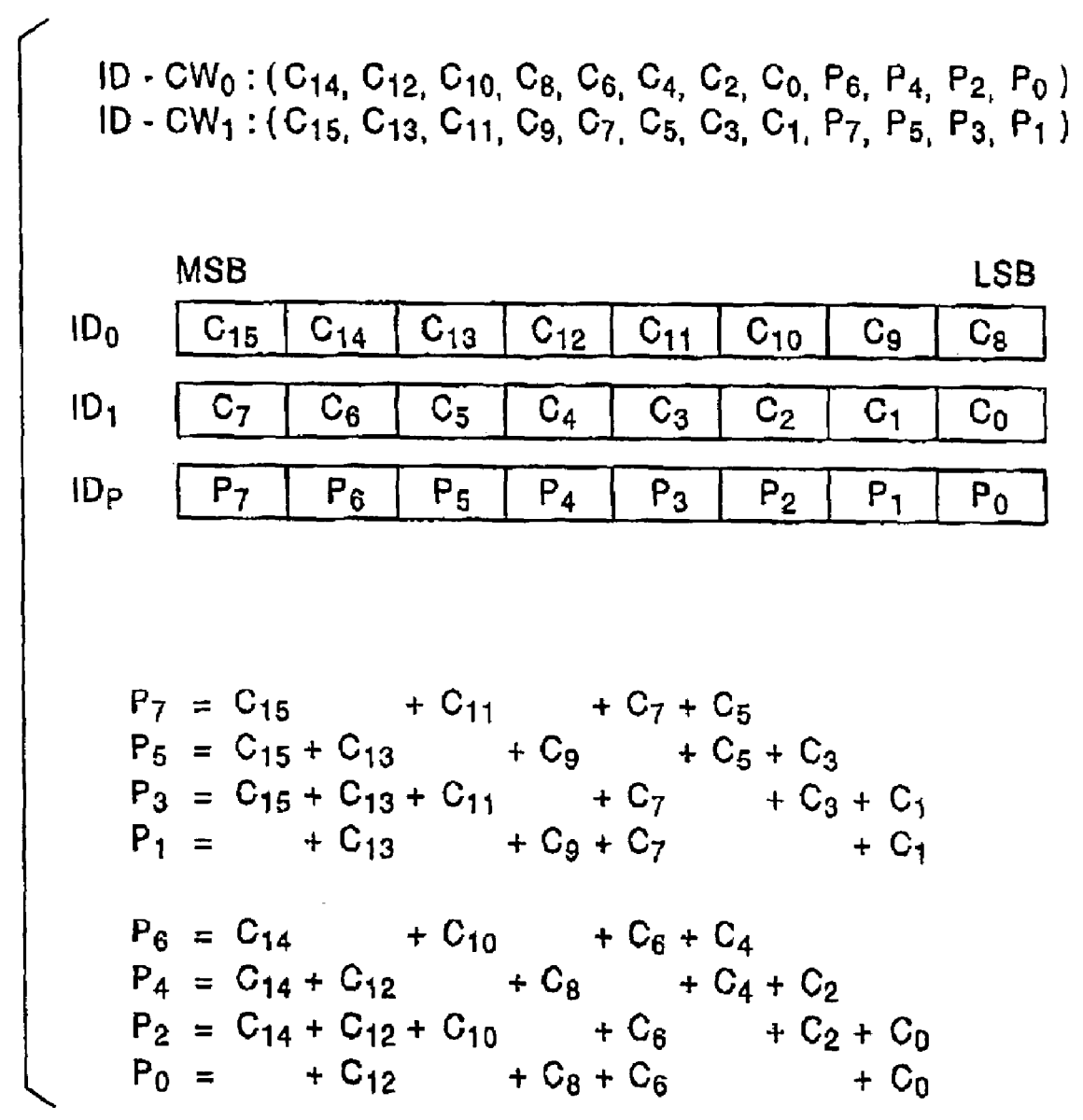

In the DV format, the ID is error-corrected by two-plane Bose-Chaudhuri-Hocquenghem (BCH) code (12, 8, 3). FIG. 32 illustrates ID parities in the DV format. Parities $P_0$ through $P_7$ are calculated for two-byte data $C_0$ through $C_{15}$, as shown in FIG. 32, resulting in the DV-format ID. In this error correcting, since the minimum Hamming distance is three symbols, an error having three symbols may be corrected to a wrong code. Additionally, the BCH code is binary code, and the bit rate is merely arranged in the order of No good-OK-No good. Thus, the data may be erroneously corrected.

In contrast, according to the present invention, the three-byte ID is included together with the main data in the Reed-Solomon code, thereby improving the error correcting performance. In terms of the ID, the Reed-Solomon code is substituted for the BCD code, thereby increasing error resistant characteristics compared to the DV format. In terms of the main data, the code length is increased, thereby enhancing the coding efficiency.

By using a Galois field ($2^8$) Reed-Solomon code (139, 121, 19), bit errors caused by a scratch extending a maximum of 650 µm in the tracking direction can be corrected. Moreover, as will be discussed below, if outer error correcting code is interleaved across a plurality of tracks, for example, 16 tracks, on the magnetic tape 21, errors continuously extending two tracks can be corrected.

Also, in the present invention, sync blocks used for error correction (sync blocks having parity C2) are disposed toward the front in the tracing direction of the rotary head 12 (in the direction from the bottom to up in FIG. 24A), i.e., at the head of the track. The head of the track is vulnerable to reading errors since it is frequently in contact with the rotary head 12. In the format shown in FIG. 24A, however, sync blocks having parity C2 are disposed at the head of the track, and sync blocks including the main data are disposed toward the end. As a result, the probability that the sync blocks having the main data cannot be decoded can be lower than the probability that the sync blocks having parity C2 cannot be decoded.

Figure 24B:
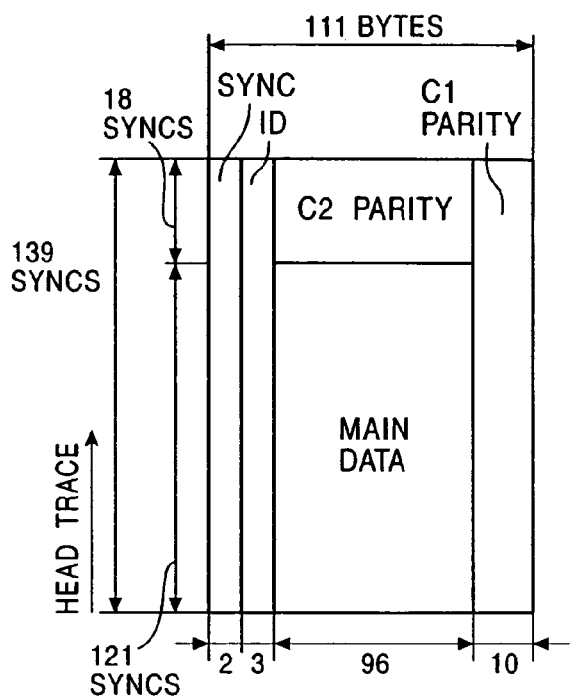

Alternatively, as shown in FIG. 24B, parity C2 may be located at the uppermost portion (toward the end of the track).

Figure 24C:
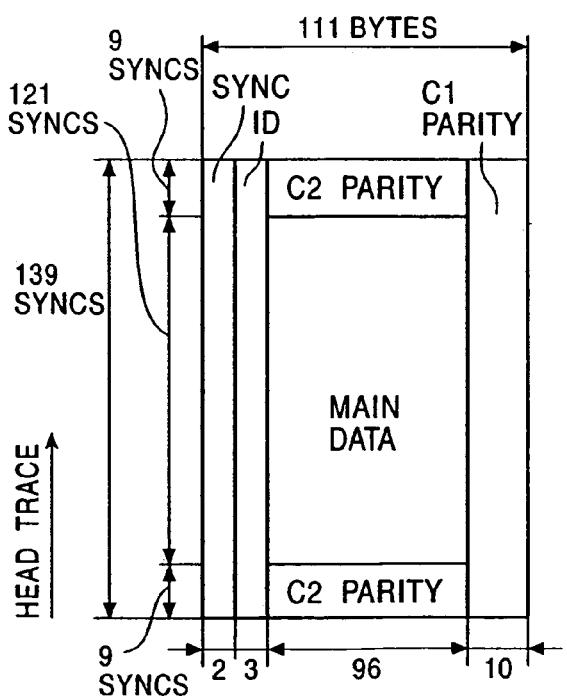

Alternatively, as shown in FIG. 24C, parity C2 may be divided and located near the head and near the end of the track. In the example shown in FIG. 24C, 9 sync blocks having parity C2 are disposed near the head of the track, and another 9 sync blocks having parity C2 are located near the end of the track. The split ratio of sync blocks having parity C2 does not have to be 1:1, as shown in FIG. 24C.

In the present invention, for enhancing error resistance to a scratch extending over more than one track, error correcting codes are shuffled over a plurality of tracks, and are then recorded on the magnetic tape 21. Accordingly, in N tracks, N-plane error correcting codes are formed. On one plane, Galois field GF ($2^8$) Reed-Solomon codes (139, 121, 19) are used. On the magnetic tape 21, the distance between adjacent sync blocks belonging to the same plane is fixed so that the resistance to a scratch extending in the longitudinal direction of the track can be consistent regardless of the location of the scratch in the tracking direction.

Figure 33:
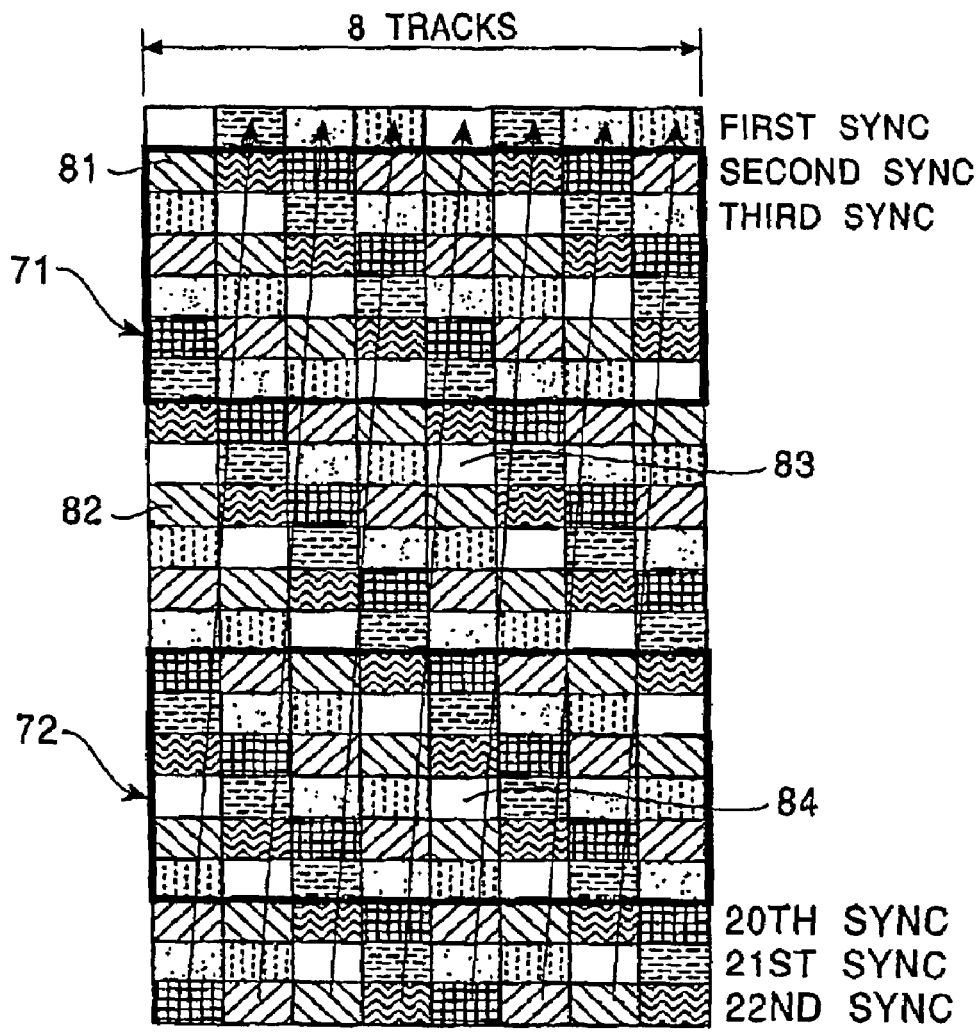
FIG. 33 illustrates an example of the arrangement of sync blocks on a plurality of planes on magnetic tape.

FIG. 33 illustrates an example of the arrangement of sync blocks on the magnetic tape 21 when error correcting codes are interleaved over eight-plane eight tracks. In this example, the first-plane through eighth-plane sync blocks are sequentially disposed in the top to bottom direction from the leftmost track. After an eighth-plane sync block is disposed, another first-plane sync block is positioned again. When a sync block is located at the bottommost portion of one track (in the example shown in FIG. 33, when the 22nd sync block is disposed), the subsequent-plane sync block is positioned at the uppermost portion of a track right adjacent to the previous track. In this manner, sync blocks are disposed for the eight-plane eight tracks.

A sync block 81 and a sync block 82 belong to the same plane (second plane), and are separated from each other by eight blocks. A sync block 83 and a sync block 84 also belong to the same plane (first plane), and are also separated from each other by eight blocks. In this manner, the distance between adjacent sync blocks belonging to the same plane is constant.

In FIG. 33, it is assumed that a scratch 71 or 72 is formed in the longitudinal direction (in the vertical direction in the drawing) for the eight tracks. Such a scratch 71 or 72 extends over only 6 sync blocks for each track. Accordingly, only one sync block for each plane is missing, which can be sufficiently corrected.

That is, a scratch formed with the same length among the tracks (i.e., the same height in FIG. 33) can be equally corrected with the same result regardless of where the scratch is formed on the track.

In the example shown in FIG. 33, the continuity of the planes between adjacent tracks is ensured. Thus, the error correcting performance can be best exhibited for temporally continuous burst errors caused by an extraneous substance attached to the magnetic tape 21 or spontaneous clogging at spliced portions of the magnetic tape 21 caused during a recording operation.

Figure 34:
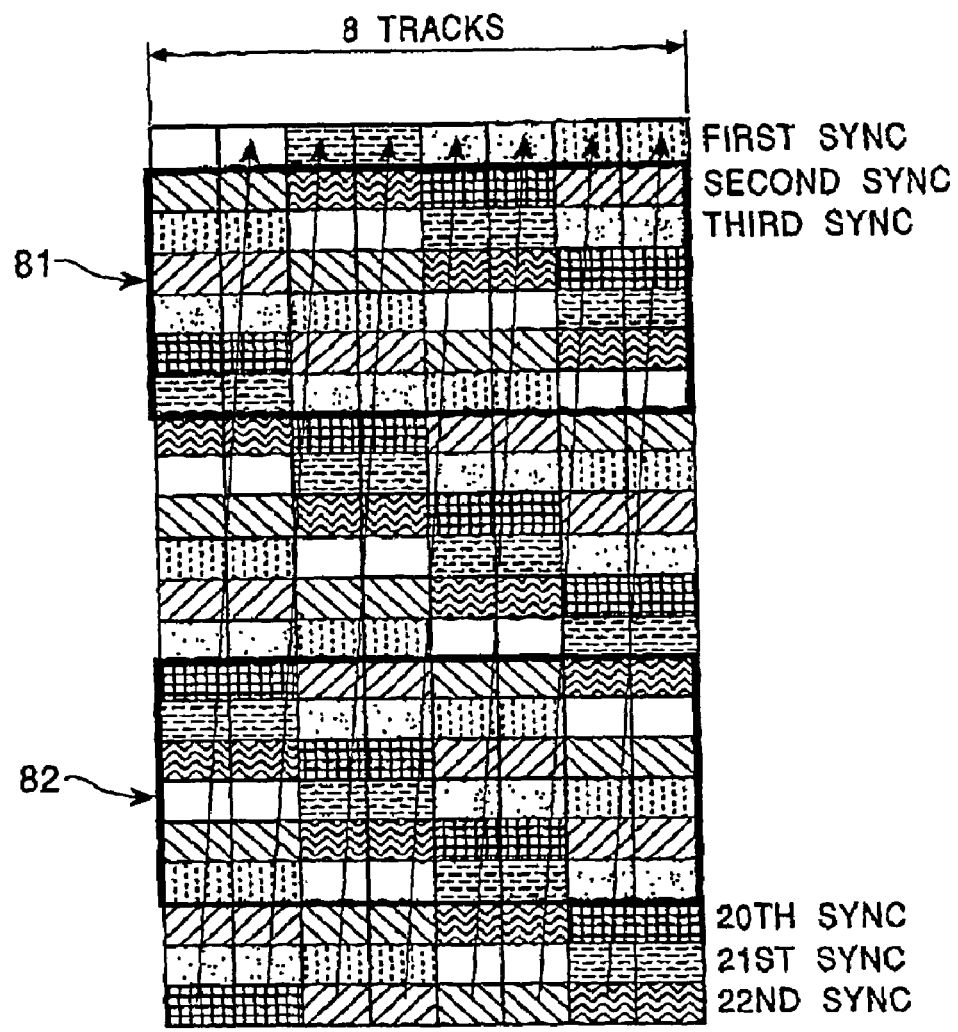
FIG. 34 illustrates another example of the arrangement of sync blocks on a plurality of planes on magnetic tape.

FIG. 34 illustrates another example of the arrangement of sync blocks on the magnetic tape 21 when error correcting codes are interleaved over eight-plane eight tracks. In this example, the arrangement of sync blocks is the same between two adjacent tracks. The first-plane through eighth-plane sync blocks are sequentially disposed from the top to the bottom of the two adjacent tracks, and when the sync blocks reach the bottommost portions of the tracks, the subsequent sync blocks are positioned at the uppermost portions of the tracks, which are located two tracks away from the previous tracks.

According to the arrangement of the sync blocks shown in FIG. 34, the performance in correcting a scratch extending in the longitudinal direction of the track is similar to that exhibited when the sync blocks are arranged in the example shown in FIG. 33. However, according to the arrangement shown in FIG. 34, the error correcting performance is most effective for clogging on one side channel occurring during a reading operation.

Figure 35:
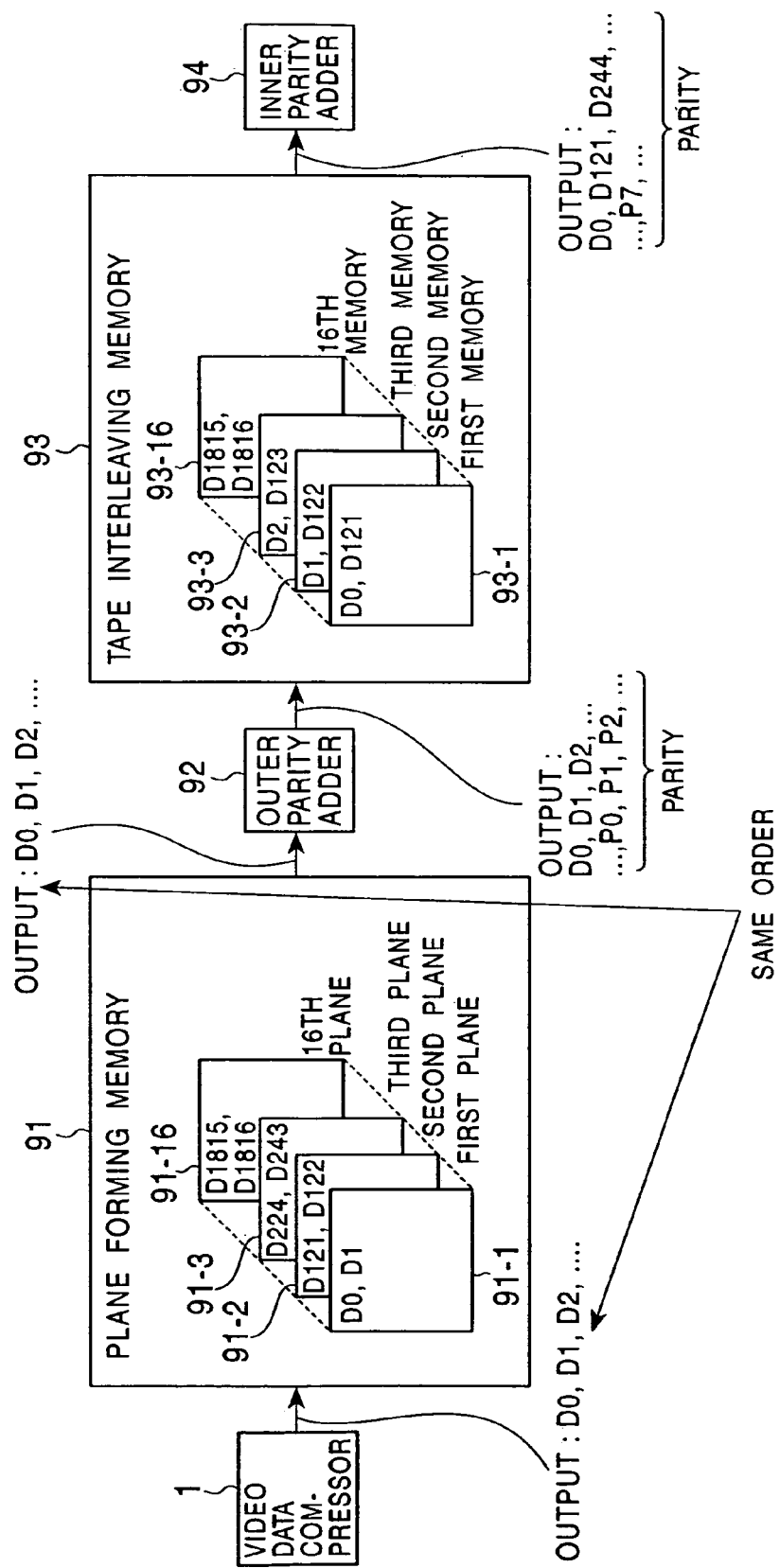
FIG. 35 illustrates interleave processing when the order of the output from a video data compressor is arranged to the order of sync blocks on magnetic tape.

For example, when Reed-Solomon codes are interleaved on 16 planes over 16 tracks, there are two approaches to arrange the sync blocks and to add parities by the error code/ID adder 5. In one method, as shown in FIG. 35, the sync blocks are arranged as follows. The 16 planes are formed while error correcting codes are interleaved, and parities are then added. Thereafter, the sync blocks are arranged in the order of the arrangement on the magnetic tape 21.

More specifically, in the example shown in FIG. 35, when the data output from the video data compressor (MPEG encoder) 1 is temporally in the order D0, D1, D1, D2, D3, and so on, the data input into a memory 91 are temporally assigned to planes 91-1 through 91-16. In other words, data D0 through D15 are sequentially disposed in the planes 91-1 through 91-16, respectively. Then, the subsequent data D16 is again disposed in the plane 91-1. In this manner, data are sequentially positioned in the planes 91-1 through 91-16.

After the planes are formed in the memory 91, an outer parity (parity C2) is calculated and added for each of the planes 91-1 through 91-16 by an outer parity adder 92.

The data with the outer parities are then supplied to a memory 93. In the memory 93, the data is sequentially arranged in the same order arranged by the video data compressor 1 (in the order D0, D1, D2, and so on), and 139 pieces of data (121 pieces of data and 18 parities) are stored for each of a first memory area 93-1 through a sixteenth memory area 93-16. That is, for example, data D0, D1, D2, ..., D120 and the corresponding parities P0, P1, ..., P17 are stored in the first memory area 93-1. Data D121, D122, ..., D241, and the corresponding parities are stored in the second memory area 93-2.

According to the priority concerning which type of error the error correcting performance is used, the 16 data groups are read from the memory 93 according to either method shown in FIG. 33 or 34, and are supplied to an inner parity adder 94. In the inner parity adder 94, an inner parity (parity C1) is added. Then, the order of the data output from the video data compressor 1 can be rearranged to the order of data on the magnetic tape 21. With this arrangement, a continuous error, which may occur during a reading operation, becomes temporally continuous when it is input into the video data decompressor 48. This method is effective on occasions, such as when there are continuous errors within a B picture. A B picture is not referred to by other pictures (I picture and P picture) according to the MPEG method, and thus, errors occurring in a B picture do not travel to an I picture or a P picture. On the other hand, it is very likely that errors occur for a small amount of data.

Figure 36:
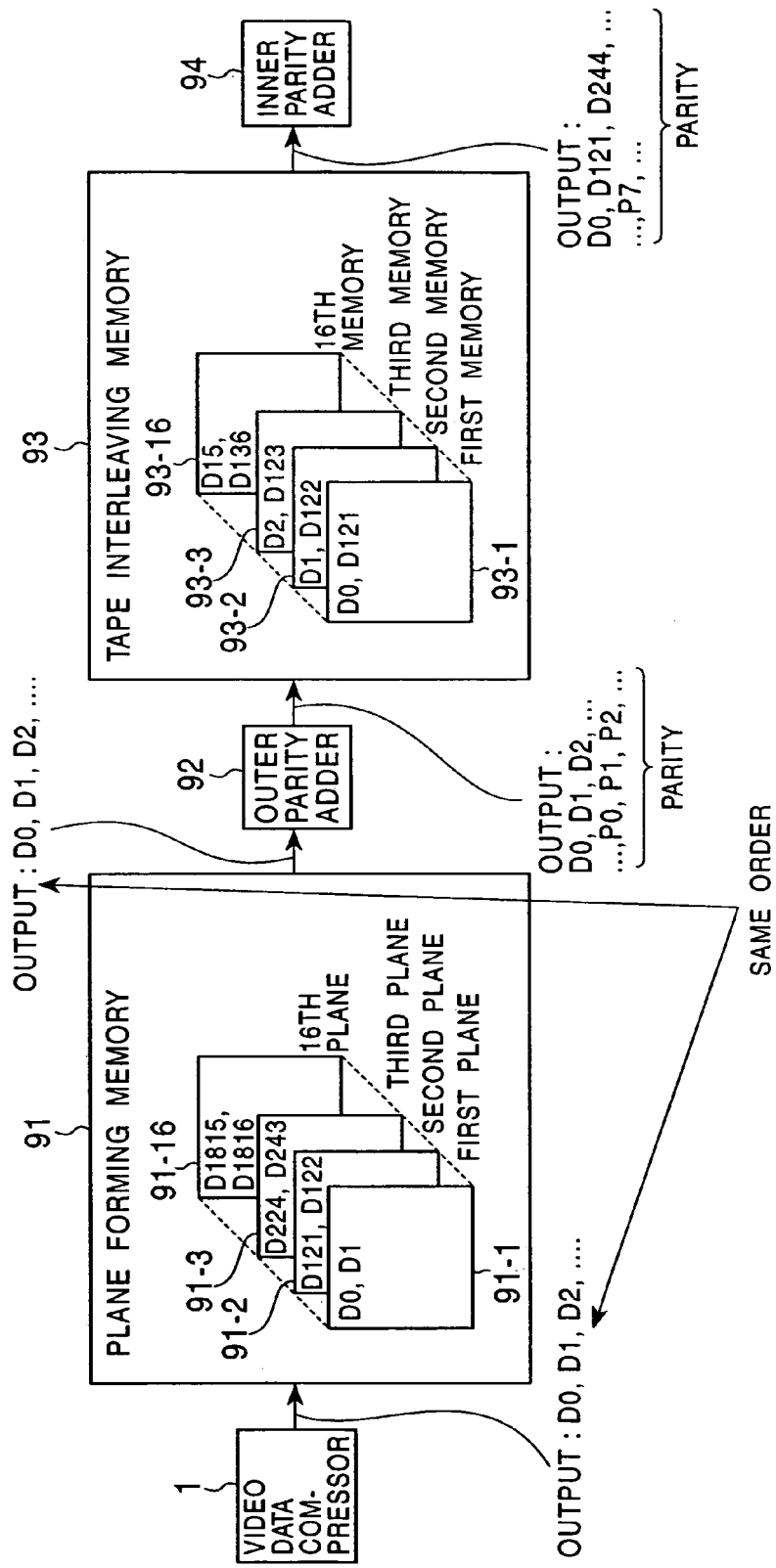
FIG. 36 illustrates interleave processing when the order of the output from the video data compressor is arranged to the order of sync blocks on the planes.

As another approach to arrange the sync blocks and to add parities, as shown in FIG. 36, after parities are added, the data are rearranged by being shuffled in the order of the arrangement on the magnetic tape 21. More specifically, as shown in FIG. 36, the data D0, D1, D2, and so on, output from the video data compressor 1 are assigned in units of 121 data to 16 different planes in the temporal order in the memory 91. For example, the first data D0 through 121st data D120 are stored in the first memory area 91-1, and the 122nd data D121 through the 242nd data D241 are stored in the second memory area 91-2. In the same manner, the subsequent data are stored in the memory areas 91-3 through 91-16.

Upon completing the formation of the 16 planes in the memory 91, an outer parity is added for each plane by the outer parity adder 92. The data with the outer parities are then assigned to the first through sixteenth groups in the memory 93 so that the distance between adjacent data is set to be constant among the planes. For example, the data D0 is stored in the first memory area 93-1, and the subsequent data D1 is stored in the second memory area 93-2. Similarly, the data D15 is stored in the sixteenth memory area 93-16. Then, the 17th data D16 is again stored in the first memory area 93-1, and the 18th data D17 is stored in the second memory area 93-2.

As described above, according to the priority concerning which type of error the error correcting performance is used, the sixteen data groups are read from the memory 93 group by group according to either method shown in FIG. 33 or 34, and are supplied to the inner parity adder 94. An inner parity is added to each data by the inner parity adder 94. That is, an inner parity is added to the data and the outer parity stored in the first memory area 93-1, and another inner parity is added to the data and the outer parity stored in the second memory area 93-2. The same applies to the subsequent data and the outer parities.

In this manner, the order of the data output from the video compressor 1 is rearranged to the order of the sync blocks on the individual planes. Thus, continuous errors may occur on the track during a reading operation in the following manner. When the data is input into the video data decompressor 48, it is very unlikely that errors continue in time, but errors may occur at regular intervals among 16 planes. In this case, in the MPEG method, errors occur over a plurality of pictures, and by cross-referring to pictures, an error may propagate more easily compared to the method shown in FIG. 35. On the other hand, errors will seldom occur for a small amount of data.

Accordingly, the arrangements of sync blocks on the magnetic tape 21 can be classified into the following four types according to the resistance to continuous errors and the distribution of uncorrectable errors:

(1) resistant to continuous errors caused by an extraneous substance on the tape, and uncorrectable errors temporally concentrating on one portion;

(2) resistant to continuous errors caused by an extraneous substance on the tape, and uncorrectable errors being temporally distributed;

(3) resistant to continuous errors caused by clogging on one side channel, and uncorrectable errors temporally concentrating on one portion; and (4) resistant to continuous errors caused by clogging on one side channel, and uncorrectable errors being temporally distributed.

Figure 37:
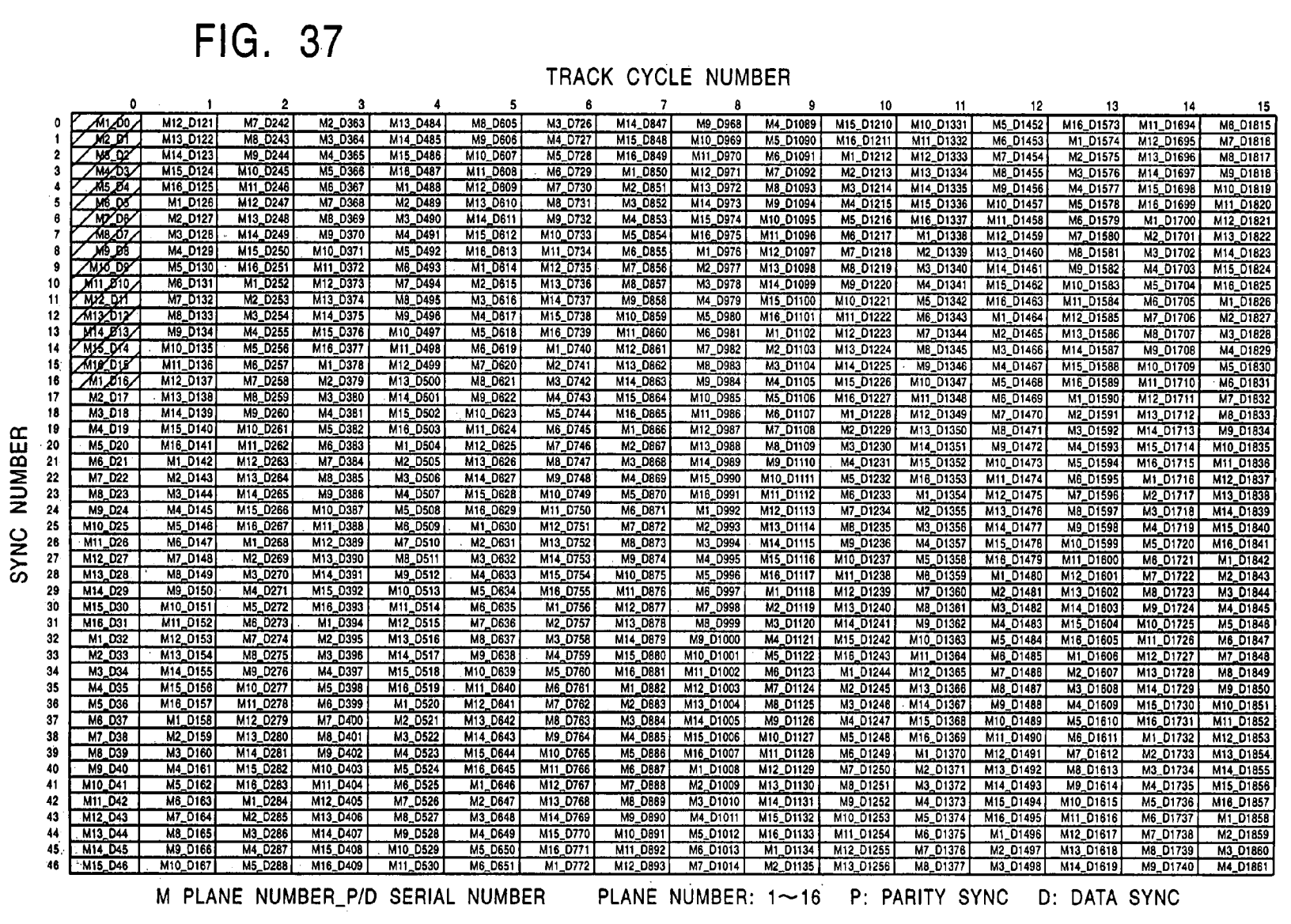
Figure 38:
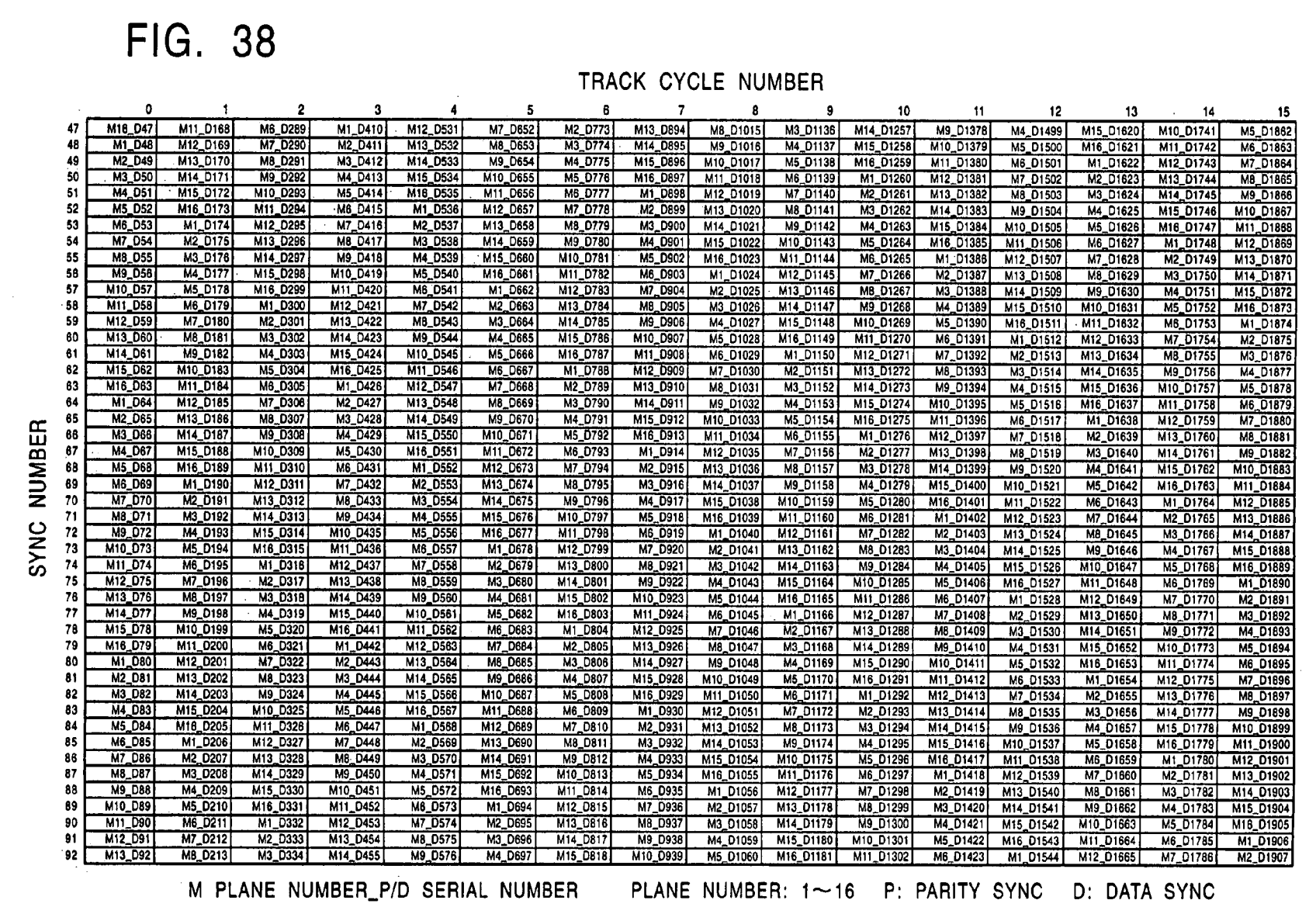
Figure 39:
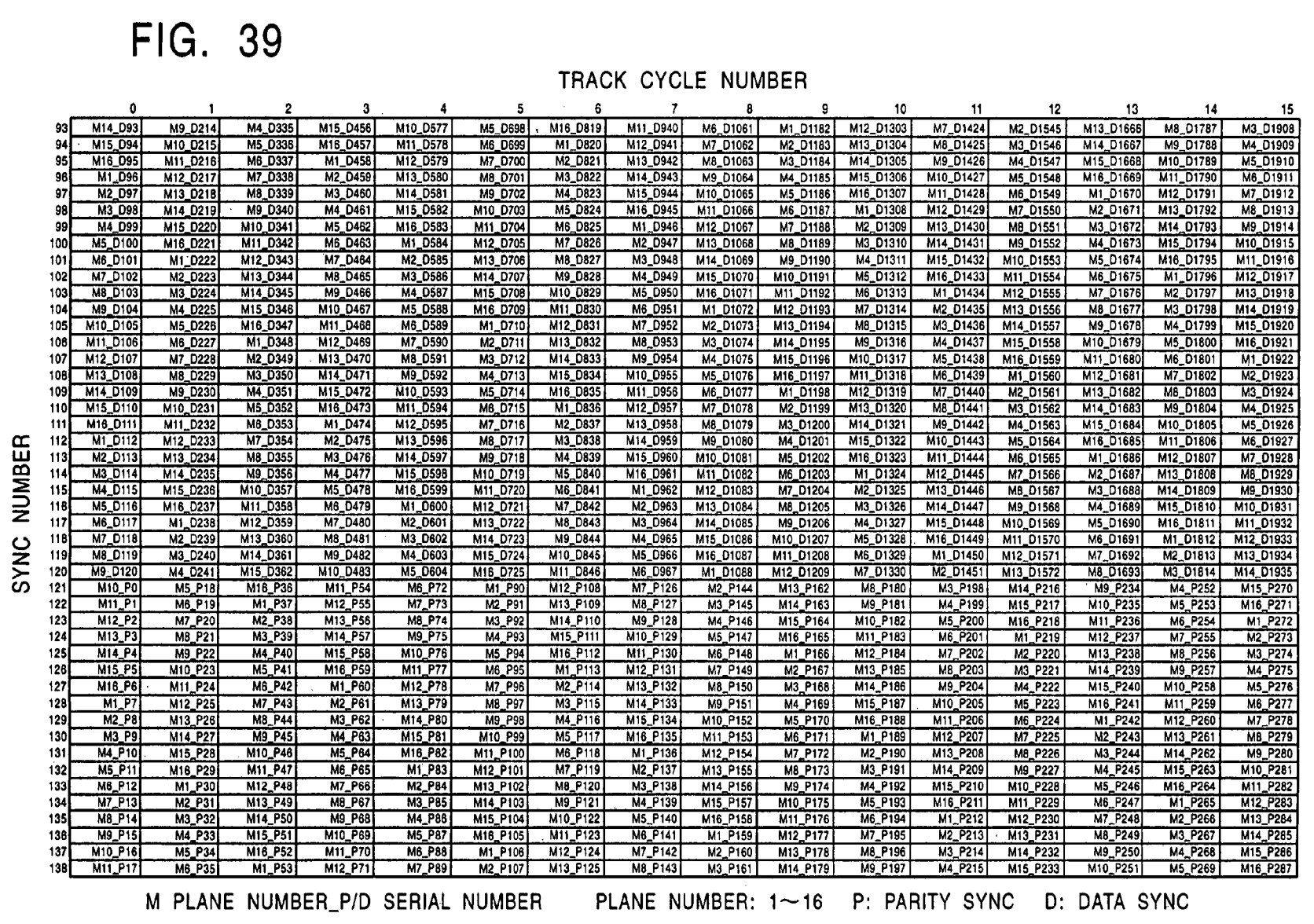
Figure 40:
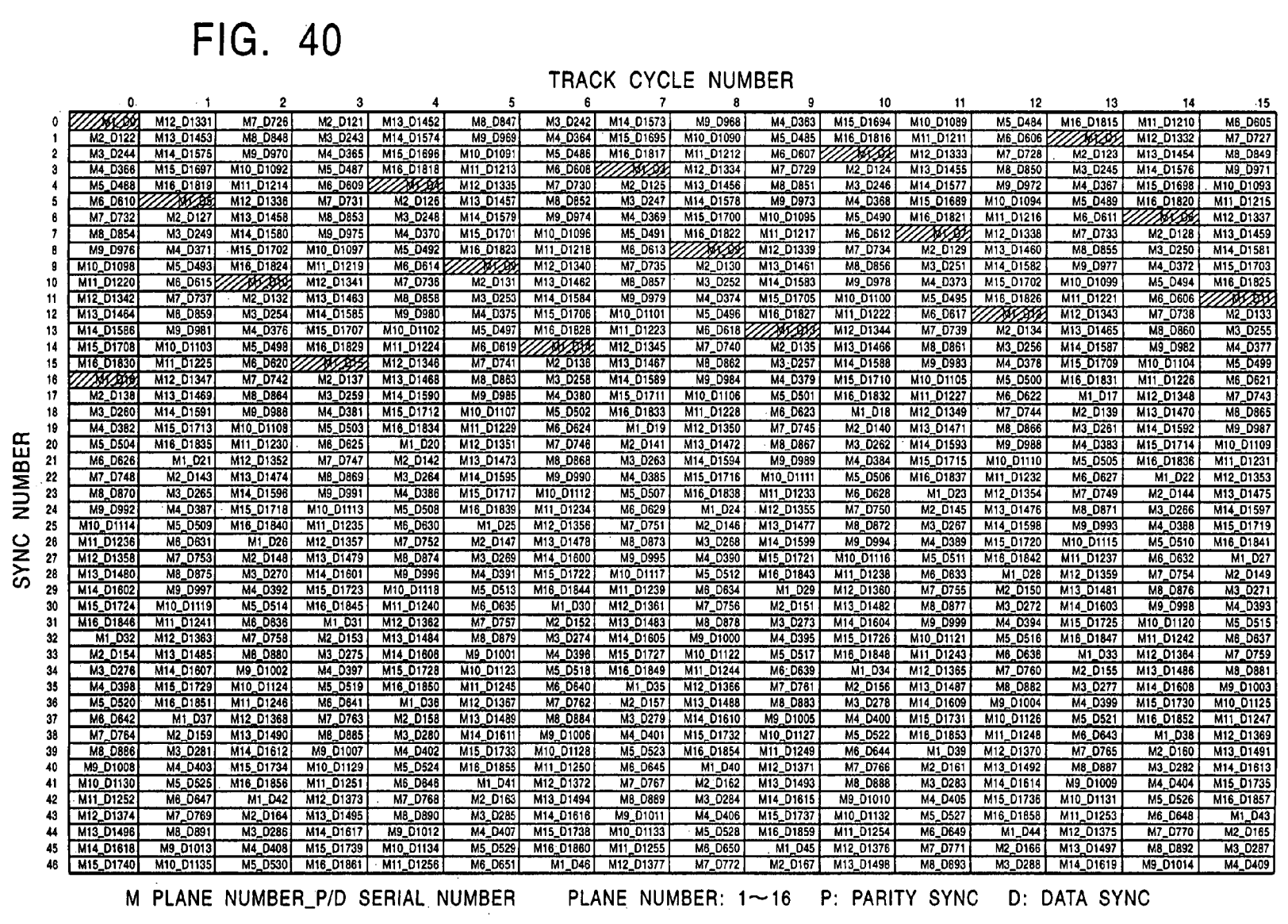
Figure 41:
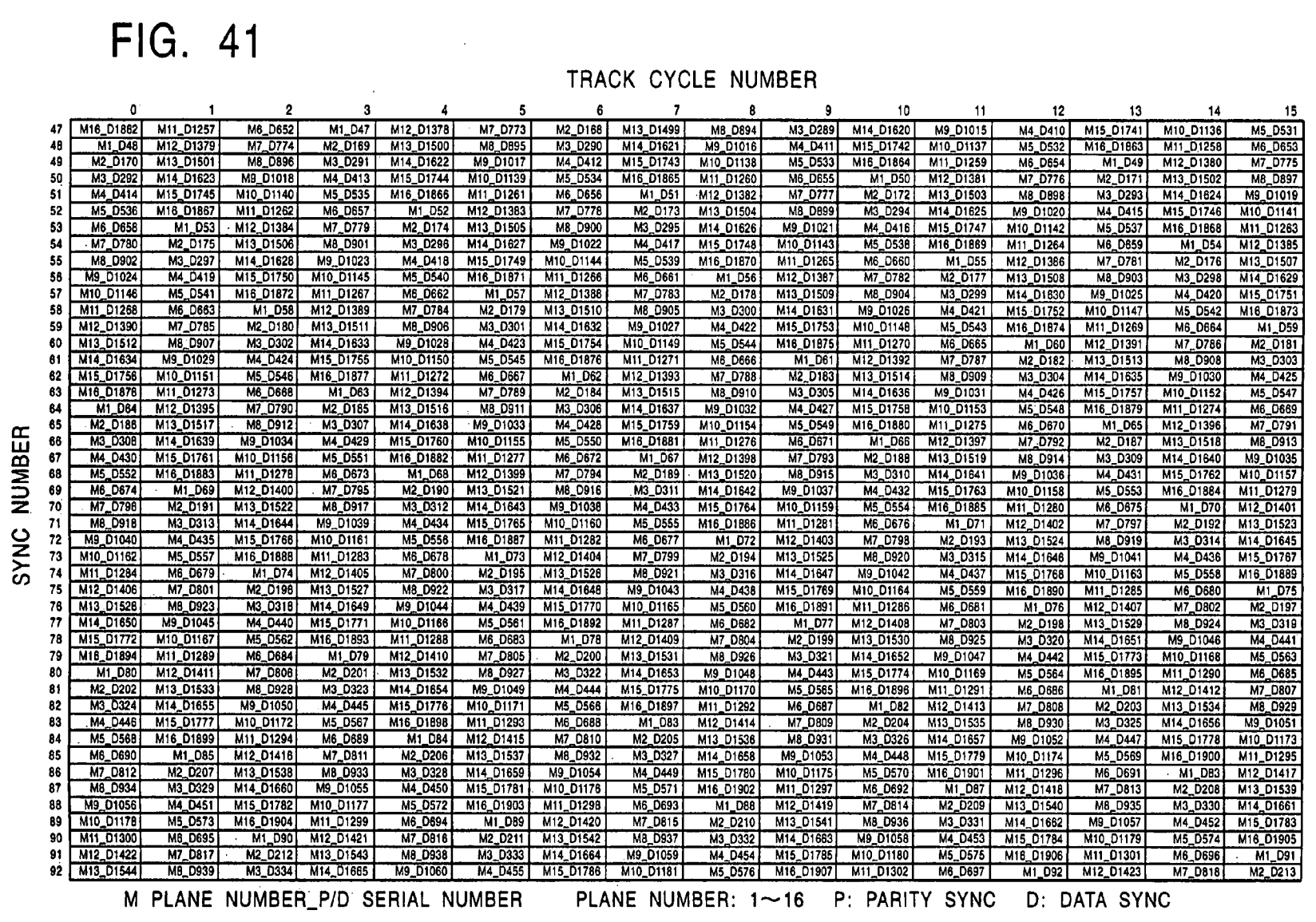

FIGS. 37 through 39 illustrate an example of the type (1) arrangement of sync blocks when error correcting codes are interleaved on 16 planes over 16 tracks. In contrast, FIGS. 40 through 42 illustrate an example of the type (2) arrangement of sync blocks when error correcting codes are interleaved on 16 planes over 16 tracks.

In FIGS. 37 through 42, $M_i$ (i=1, 2, ..., 16) indicates the plane number, $D_j$ (j=1, 2, ...) represents sync block data, $P_k$ (k=1, 2, ...) designates a parity, and j and k represent serial numbers.

In the examples shown in FIGS. 37 through 42, outer parities (parities C2) are disposed toward the end of the track.

Figure 43:
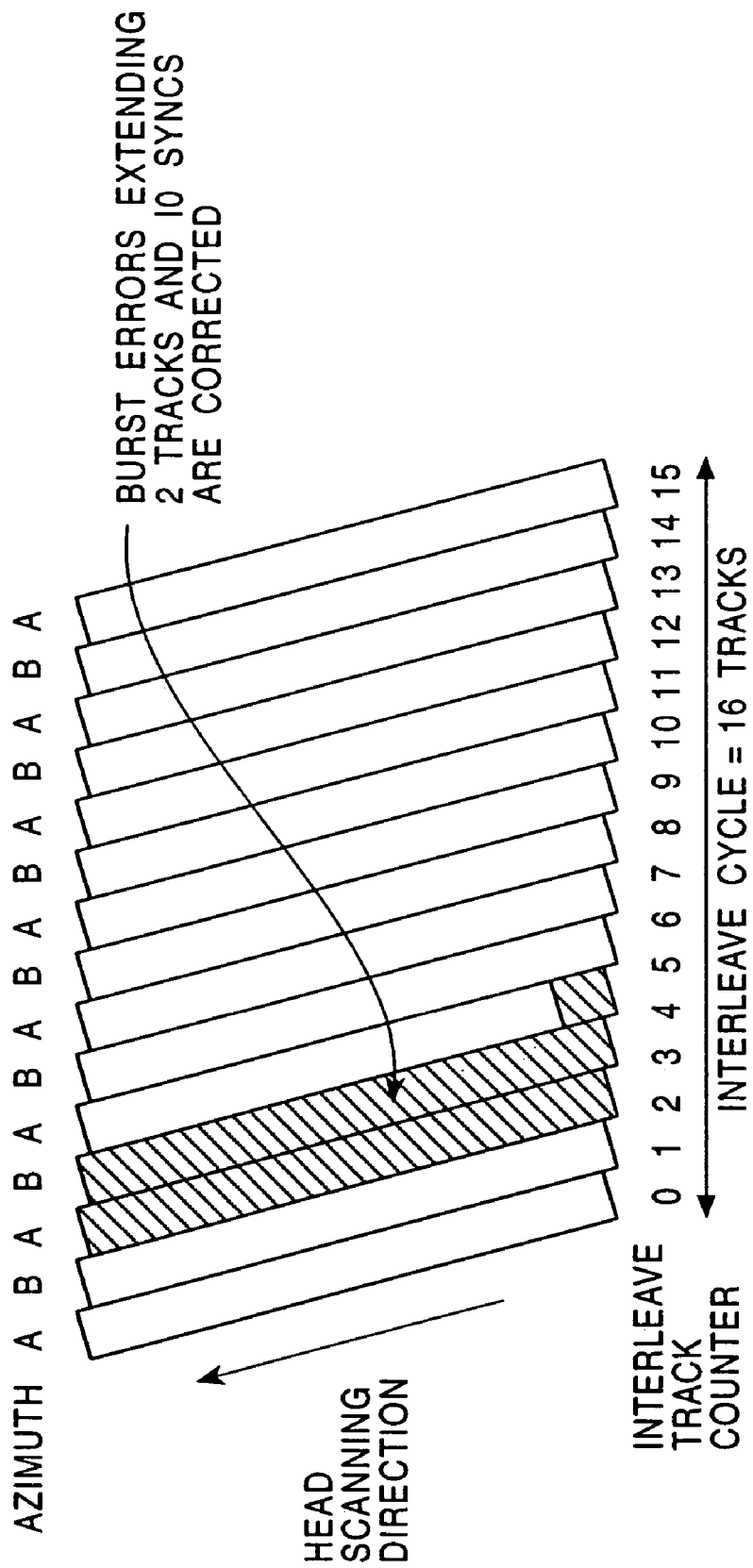
FIG. 43 illustrates the error resistance to damaged tracks caused by burst errors.
Figure 44:
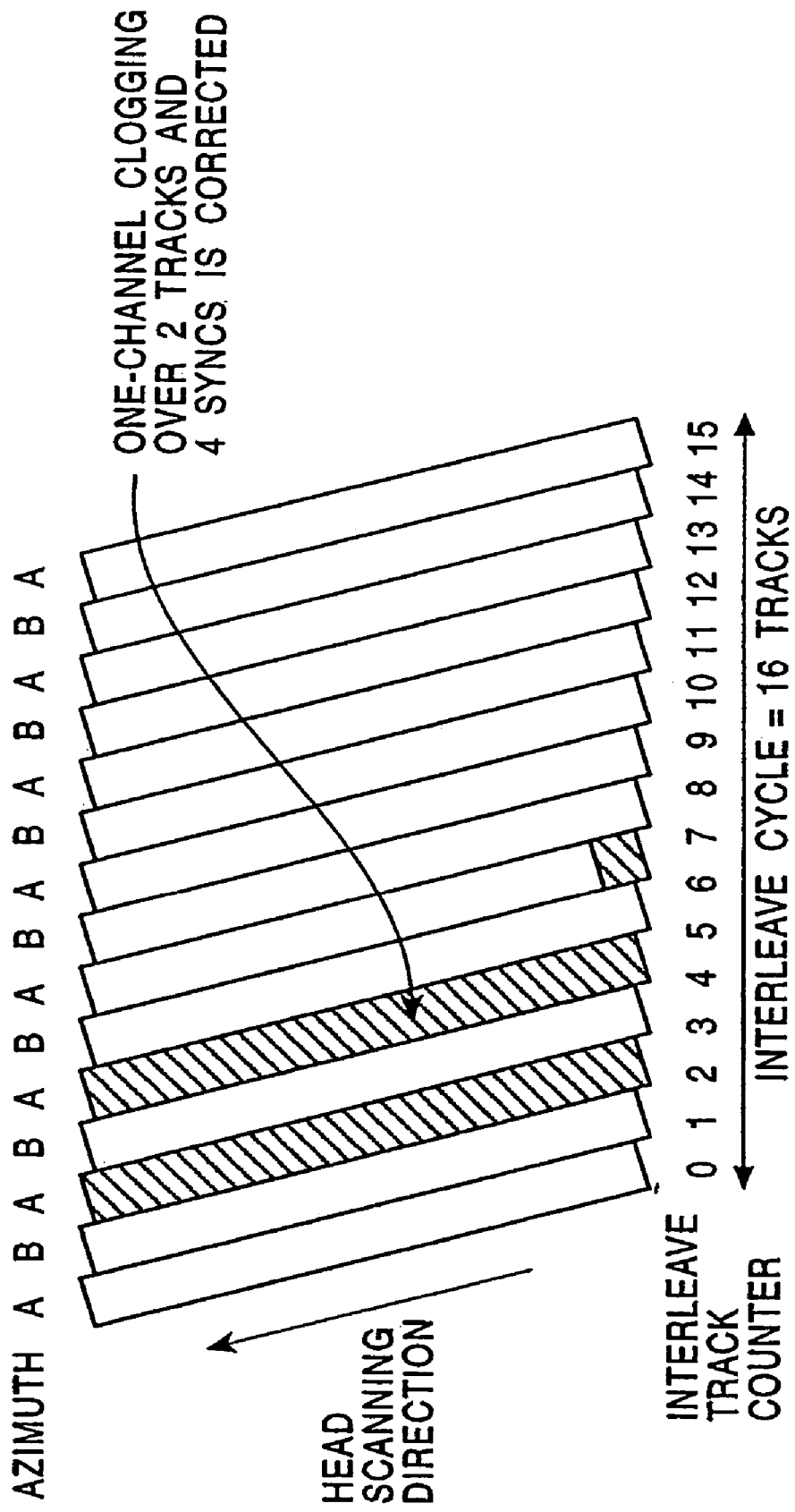
FIG. 44 illustrates the error resistance to damaged tracks on one side channel caused by burst errors.

When Reed-Solomon codes are formed on 16 planes over 16 tracks and interleaved under the above-described condition (1) or (2), continuous errors extending over two tracks and ten sync blocks can be corrected, as shown in FIG. 43. Similarly, when Reed-Solomon codes are formed under the above-described condition (3) or (4), continuous errors over two tracks and four sync blocks caused by clogging on one side channel can be corrected, as shown in FIG. 44.

Figure 45:
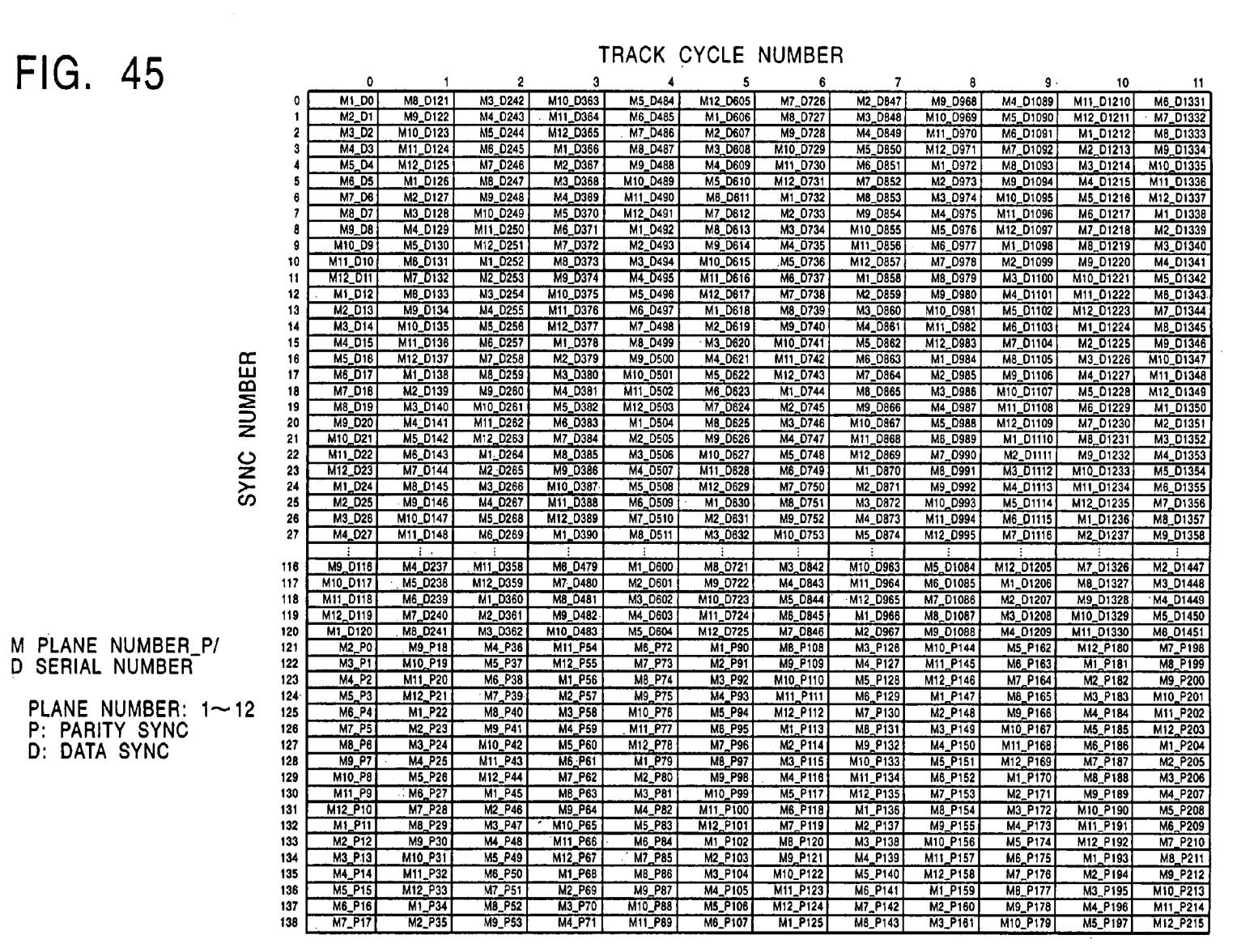

The resistance to continuous errors can be varied even by using the same Reed-Solomon codes. For example, FIGS. 45 and 46 illustrate an example of the arrangement of sync blocks in which Reed-Solomon codes are interleaved on 12 planes over 12 tracks. FIGS. 47 and 48 illustrate an example of the arrangement of sync blocks in which Reed-Solomon codes are interleaved on 8 planes over 8 tracks.

In the example shown in FIGS. 45 and 46, burst errors extending over one track and 77 sync blocks can be corrected, while clogging on one side channel for one track and 63 sync blocks can be corrected.

In contrast, in the example shown in FIGS. 47 and 48, burst errors extending for one track and five syncs can be corrected, while clogging on one side channel for one track and two sync blocks can be corrected.

Figure 49A:
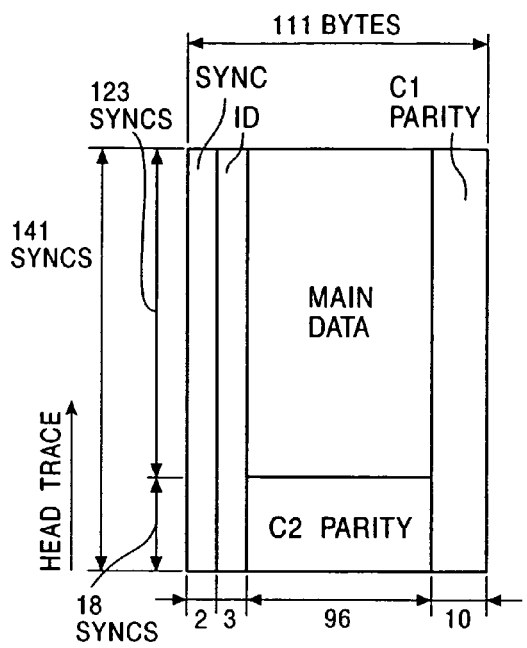
FIGS. 49A, 49B, and 49C illustrate another example of the configuration of the main sector shown in FIG. 8.
Figure 49B:
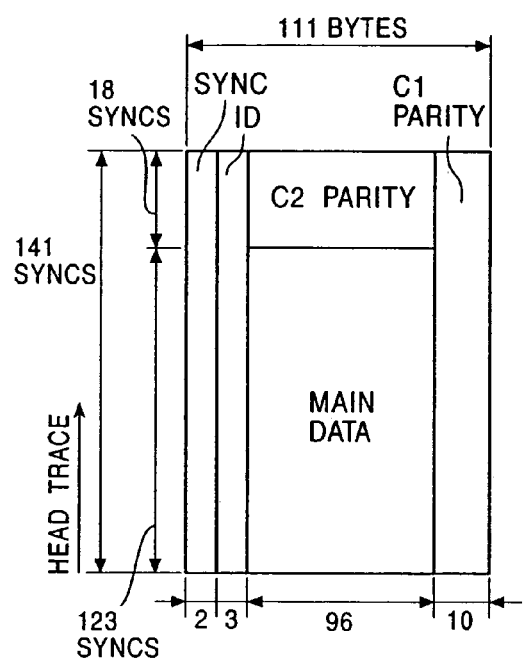
Figure 49C:
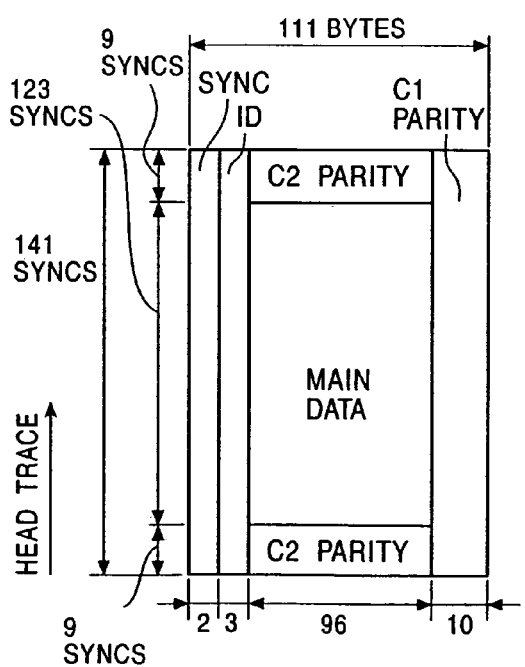

FIGS. 49A, 49B, and 49C illustrate another example of the configuration of the main sector. As in the example shown in FIGS. 24A, 24B, and 24C, the length of the main sector is 111 bytes. However, the number of sync blocks is 141, and thus, the number of sync blocks forming the main data is increased to 123, which is greater than that shown in FIGS. 24A through 24C by two. The other configurations of this example are similar to those shown in FIGS. 24A through 24C.

FIG. 50 illustrates an example of a recording system of a magnetic tape recording/reading apparatus when the main sector is configured as shown in FIGS. 49A through 49C. A sync generator 7A is substituted for the sync ITI generator 7 shown in FIG. 3.

The sync generator 7A generates sync data to be added to the main data (FIGS. 49A through 49C) or the subcode (FIG. 25), and preamble and postamble data. The other configurations are similar to those shown in FIG. 3.

Figure 51:
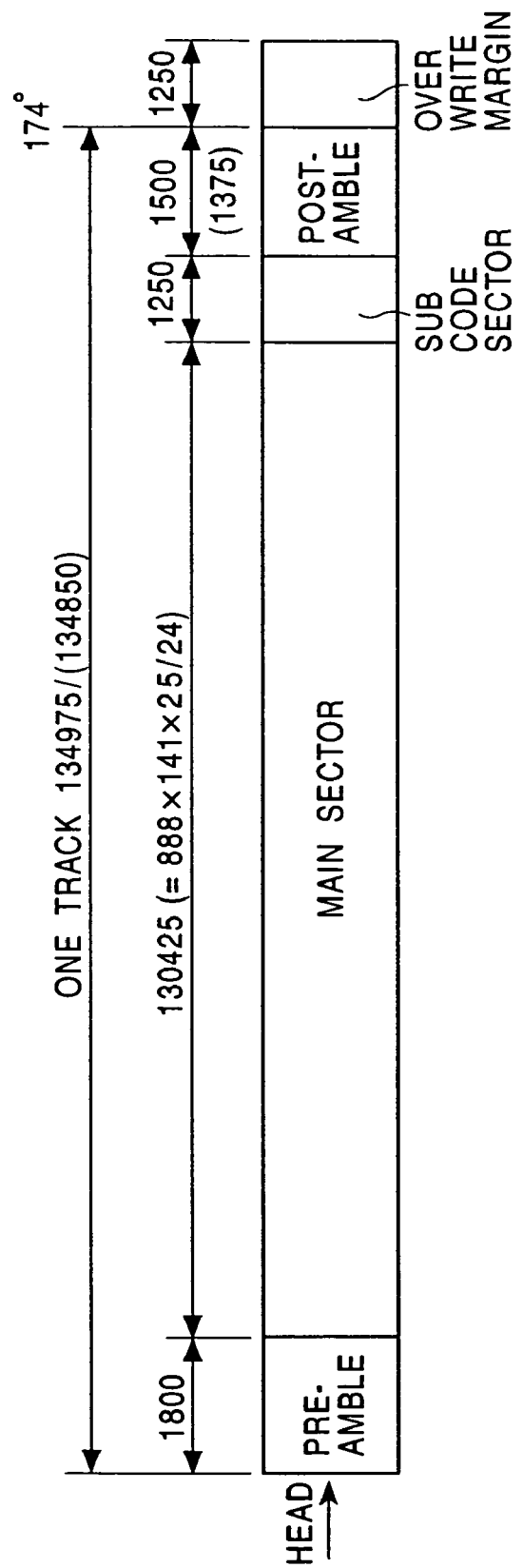
FIG. 51 illustrates the track format of magnetic tape shown in FIG. 50.

FIG. 51 illustrates an example of the sector arrangement in each track of the magnetic tape 21 shown in FIG. 50. The numbers of bits representing the lengths of the individual elements shown in FIG. 51 are numbers after 24-25 conversion is performed. The length of one track is 134975 bits when the rotary head 12 is rotated at a frequency of 60×1000/1001 Hz, and is 134850 bits when the rotary head 12 is rotated at a frequency of 60 Hz. The length of one track is equal to a portion of the magnetic tape 21 up to a winding angle of 174 degrees. Outside the one-track portion, a 1250-bit overwrite margin is formed for preventing data from remaining recorded.

In FIG. 51, the rotary head 12 traces over the track from the left to the right. At the head of the track, a 1800-bit preamble is disposed. As in the postamble after the subcode sector shown in FIG. 8, in this preamble shown in FIG. 51, data required for generating a clock, such as a combination of pattern A and pattern B shown in FIG. 26, is recorded. In pattern A and pattern B, "0"s and "1"s are inverted with respect to each other. By suitably combining these patterns, the tracking patterns F0, F1, and F2 shown in FIGS. 5, 6, and 7, respectively, can be implemented. The run pattern shown in FIG. 26 represents a pattern after 24–25 conversion is performed by the 24-25 converter 6 shown in FIG. 50.

After the 1800-bit preamble, a 134850-bit main sector is disposed. The structure of the main sector is shown in FIG. 49A.

As shown in FIG. 49A, the main sector is formed of 141 sync blocks, and the length of each sync block is 888 bits (111 bytes).

The first 123 sync blocks are each formed of a two-byte (16-bit) sync, a three-byte (24-bit) ID, 96-byte (768-bit) main data, and 10-byte (80-bit) parity C1. The syncs are generated by the sync generator 7A. The ID is added by the error code/ID adder 5.

When the main data is video data, it is supplied from the video data compressor 1. When the main data is audio data, it is supplied from the audio data compressor 2. When the main data is auxiliary data, it is supplied from the controller 13 via the terminal 3.

The parity C1 is calculated from the ID and the main data for each sync block by the error code/ID adder 5, and is then added.

Among the 141 sync blocks, the last 18 sync blocks are each formed of a sync, an ID, parity C2, and parity C1. The parity C2 is calculated based on the main data in the longitudinal direction in FIG. 49A. This calculation is performed in the error code/ID adder 5.

The total amount of data of the main sector is 888 bits×141 sync blocks=125208 bits, and becomes 130425 bits after 24-25 conversion. The maximum data rate when the rotary head 12 is rotated in synchronization with 60 Hz is substantially 768 bits×123 sync blocks×10 tracks×30 Hz=28.339 Mbps. This bit rate is sufficient to record MP@HL-compressed or MP@H-14-compressed HD video data, audio compressed data, auxiliary data, and search video data.

Subsequent to the main data, a 1250-bit subcode sector is disposed. The configuration of the subcode sector is shown in FIG. 25.

After the subcode sector, a postamble is located. The postamble, as well as the preamble, can be recorded by a combination of pattern A and pattern B shown in FIG. 26. The length of the postamble is 1500 bits when the rotary head 12 is rotated in synchronization with 60×1000/1001 Hz, and is 1375 bits when the rotary head 12 is rotated in synchronization with 60 Hz.

The operation of the recording system shown in FIG. 50 is similar to that of the counterpart shown in FIG. 3, and an explanation thereof will thus be omitted.

Figure 52:
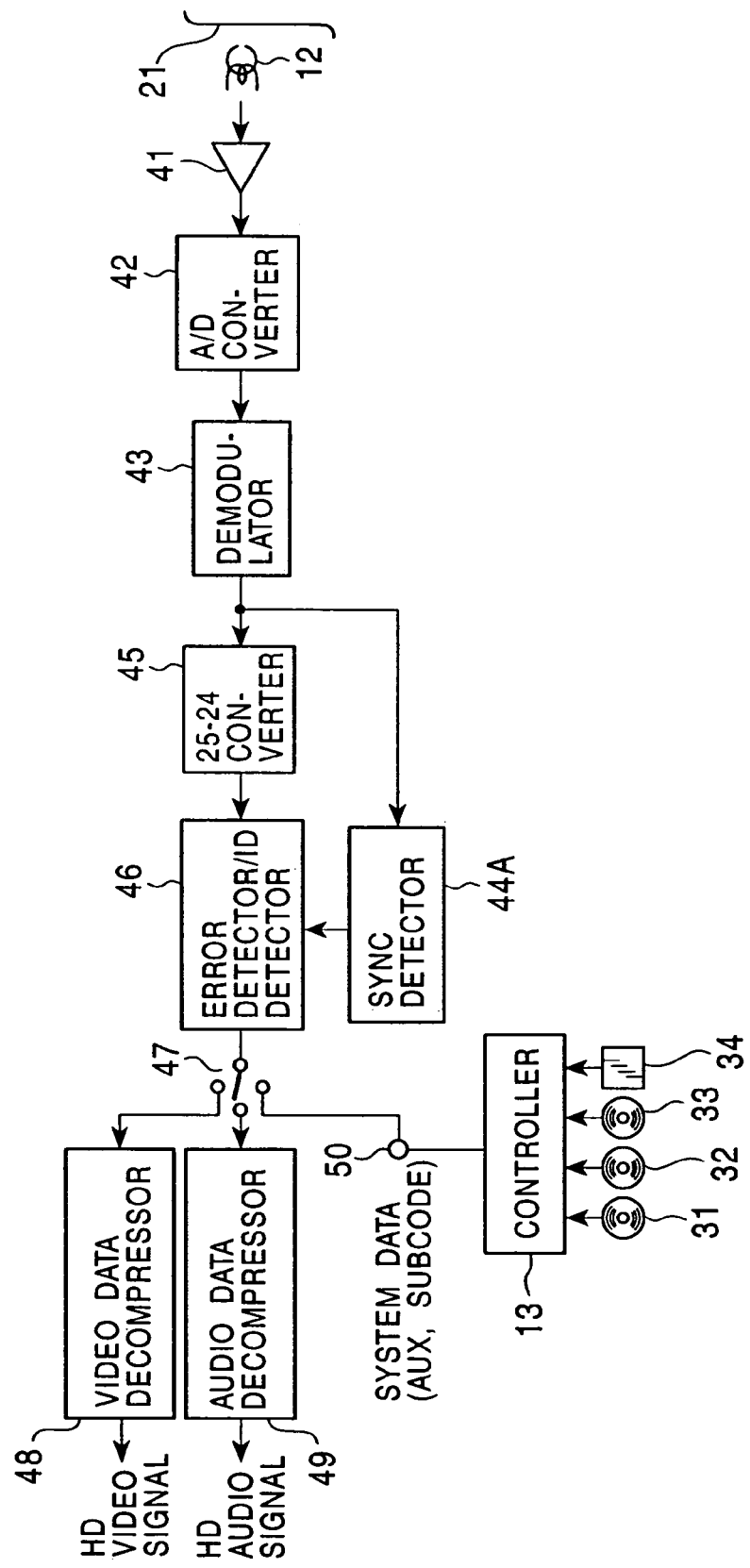
FIG. 52 is a block diagram illustrating another example of the configuration of a reading system for use in the magnetic tape recording/reading apparatus according to the present invention.

FIG. 52 illustrates an example of the configuration of a reading system for reading the data recorded on the magnetic tape 21 shown in FIG. 50. This reading system is similar to that shown in FIG. 27, except that, instead of the sync ITI detector 44 shown in FIG. 27, a sync detector 44A is used.

The sync detector 44A detects the sync of each sync block of the main sector shown in FIG. 49A and the sync of each subcode sync block of the subcode sector shown in FIG. 25 from the demodulated data output from the demodulator 43, and supplies the detected syncs to the error detector/ID corrector 46.

The operation of the reading system shown in FIG. 52 is similar to that of the counterpart shown in FIG. 27, and an explanation thereof will thus be omitted.

For the main sector shown in FIG. 49A, a Galois field GF ($2^8$) Reed-Solomon code (141, 123, 19) is used as the outer error correcting code. In this case, the recording bit rate of the main data is 768 bits×123 sync blocks×10 tracks×30 Hz is 28.339 Mbps.

According to the configuration shown in 49A, as well as in that shown in FIG. 24A, bit errors caused by a scratch extending for a maximum of 650 μm in the longitudinal direction of the track can be corrected. Additionally, by interleaving outer error correcting codes over a plurality of tracks, for example, 16 tracks, continuous errors for two tracks can be corrected.

Figure 53:
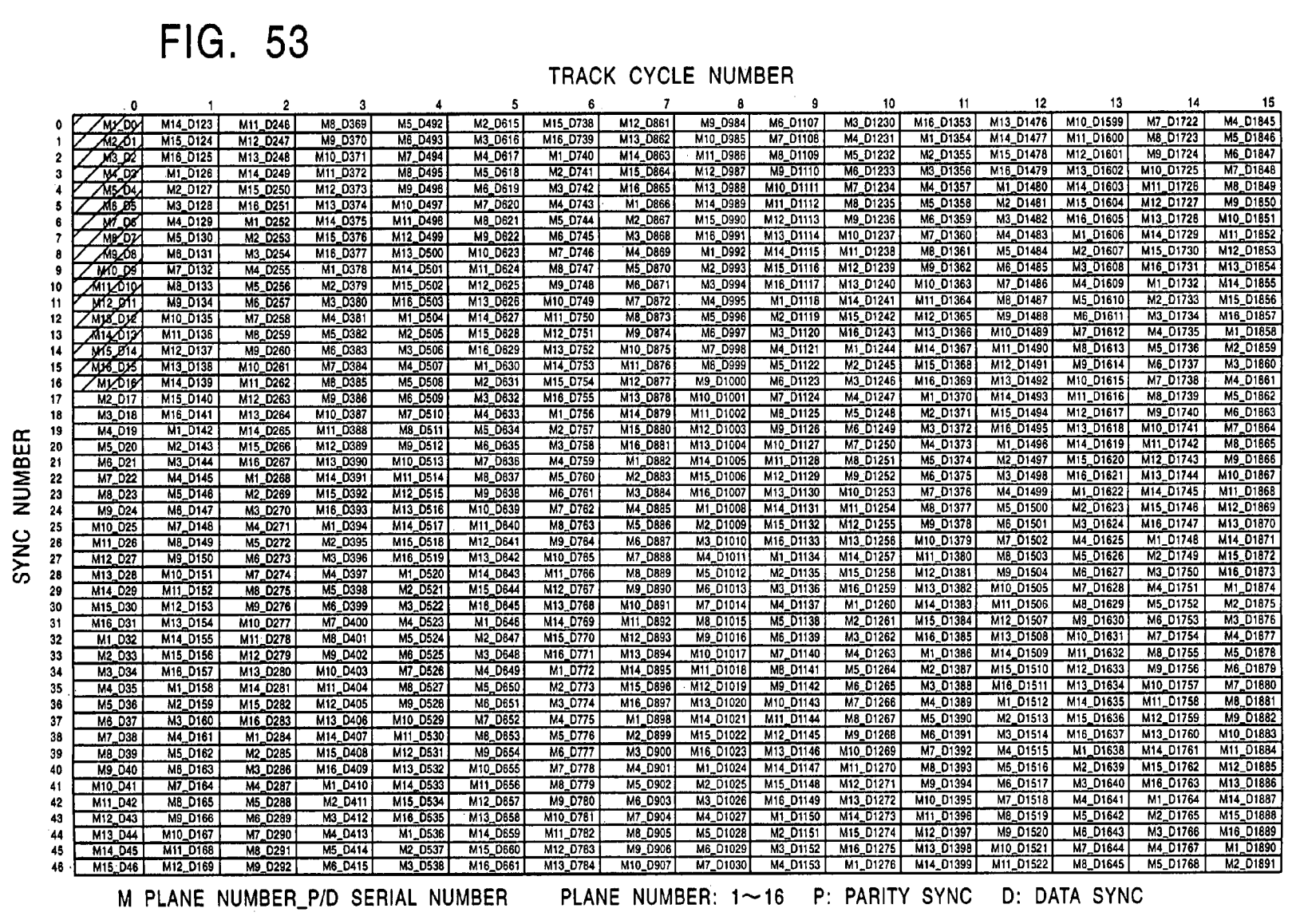
Figure 54:
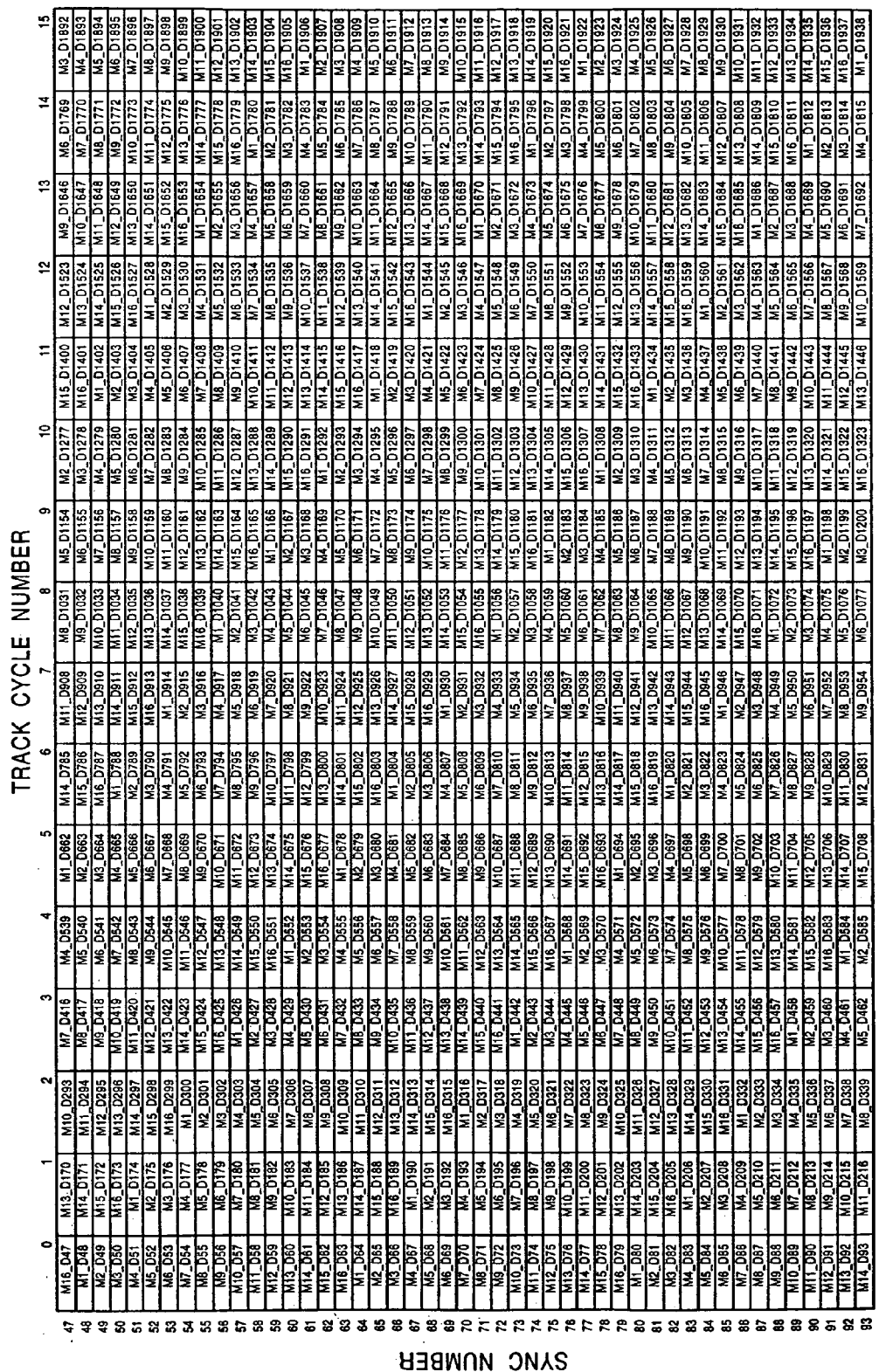
Figure 55:
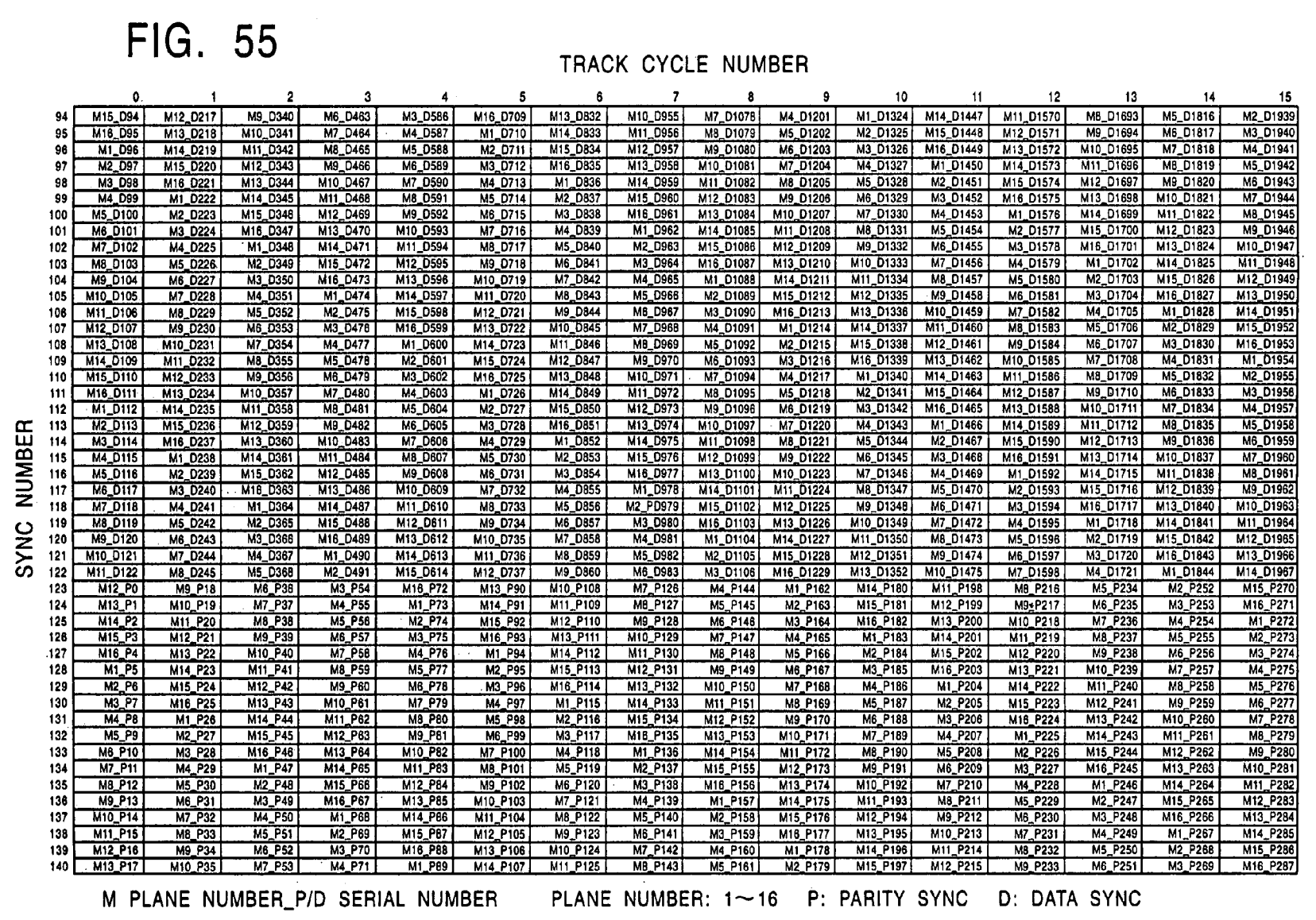

FIGS. 53 through 55 illustrate an example of the arrangement of sync blocks on the magnetic tape 21 in which error correcting codes are interleaved on 16 planes over 16 tracks according to the method shown in FIG. 33.

Figure 56:
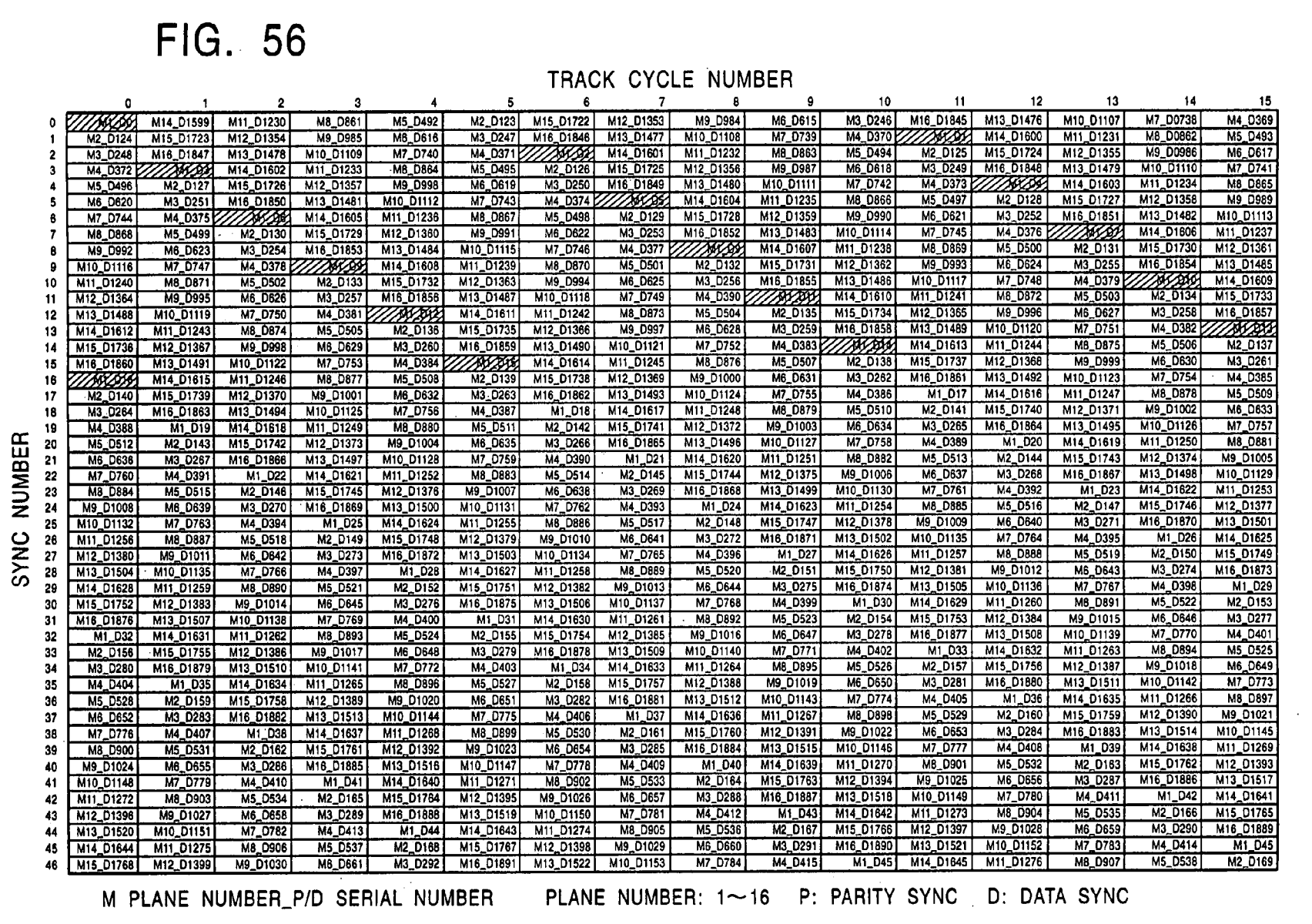
Figure 57:
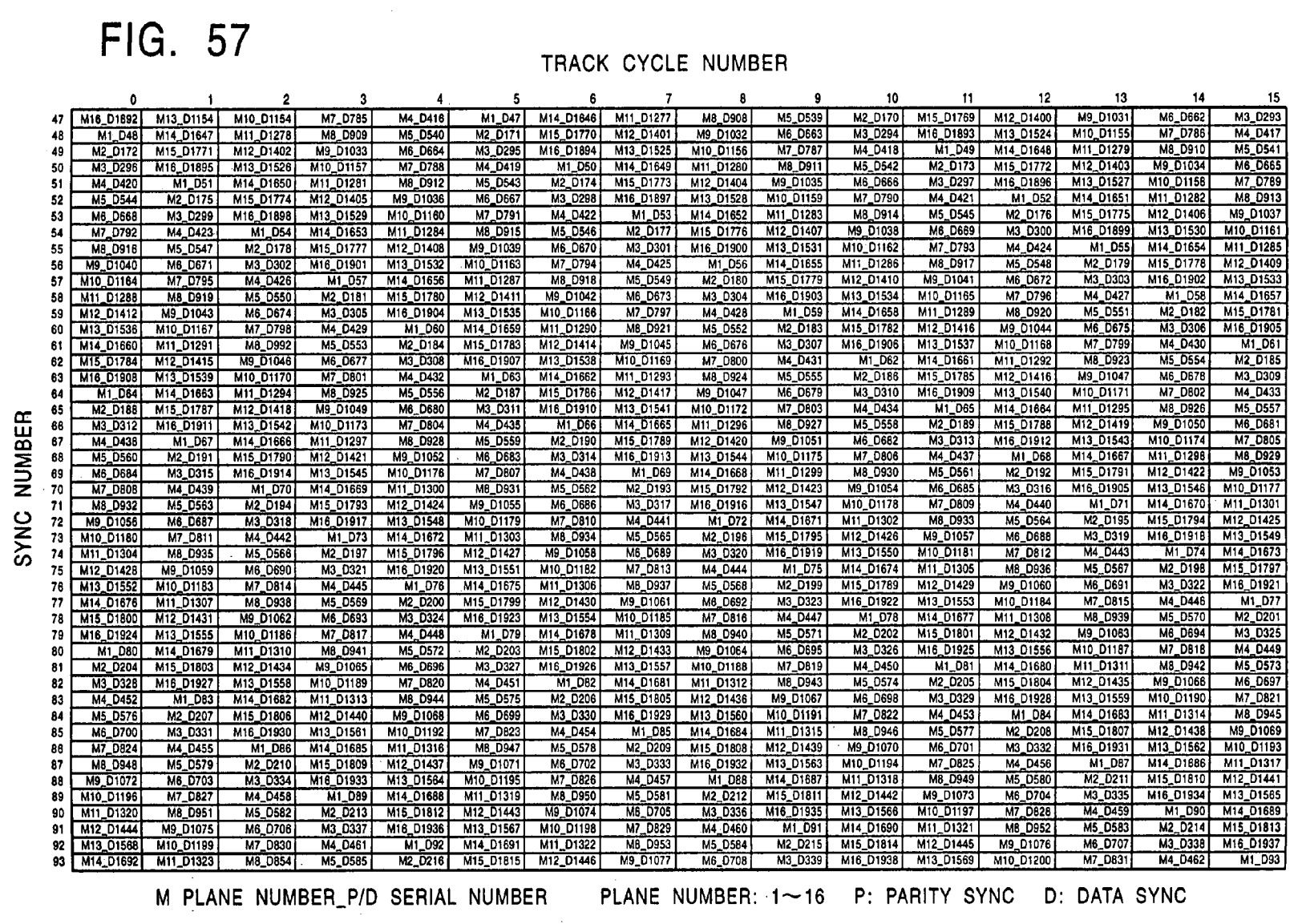
Figure 58:
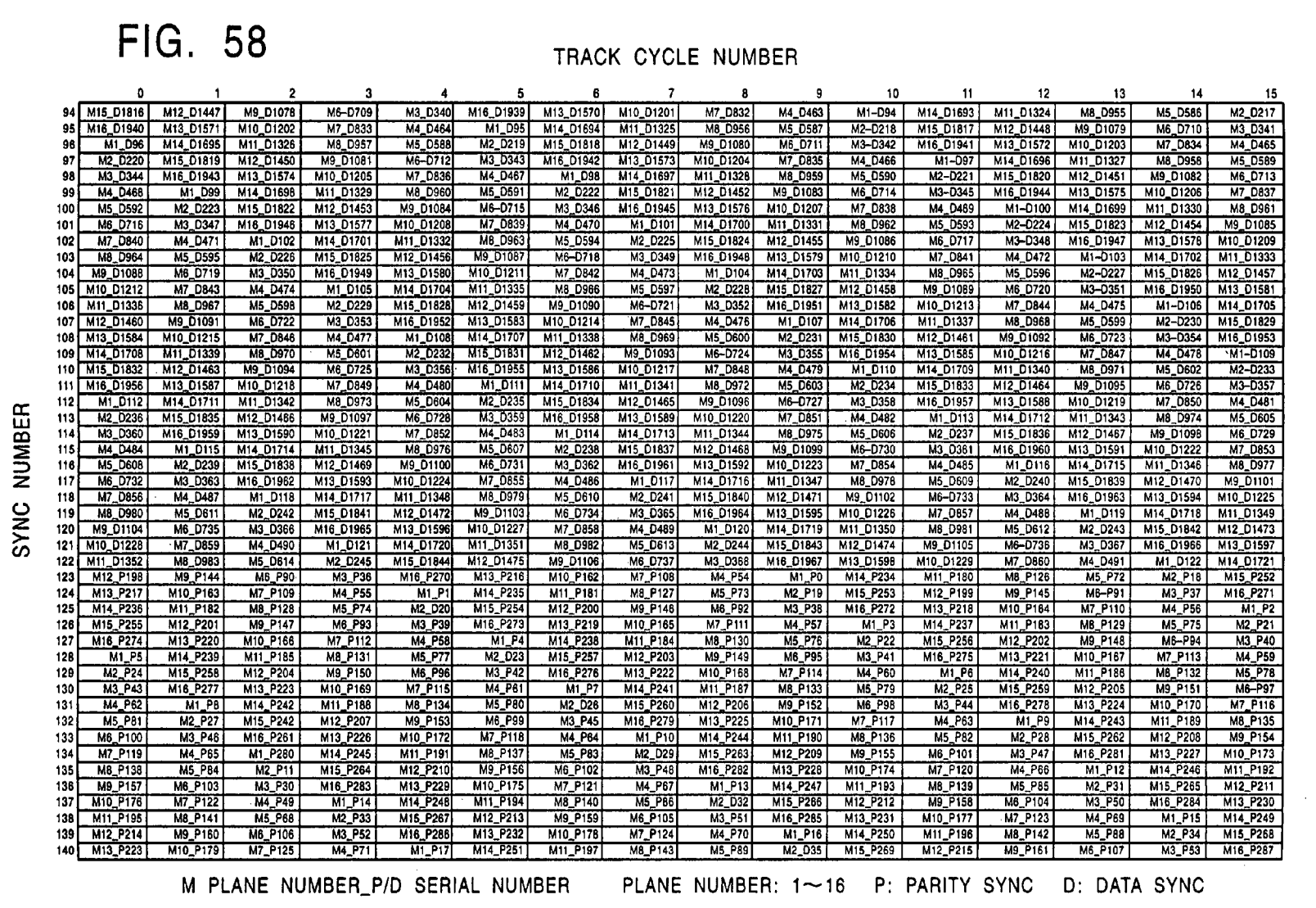

FIGS. 56 through 58 illustrate an example of the arrangement of sync blocks on the magnetic tape 21 in which error correcting codes are interleaved on 16 planes over 16 tracks according to the method shown in FIG. 34.

Parity C2 may be disposed at the end of the track, as shown in FIG. 49B, or may be divided and disposed at the head and the end of the track, as shown in FIG. 49C.

Figure 59A:
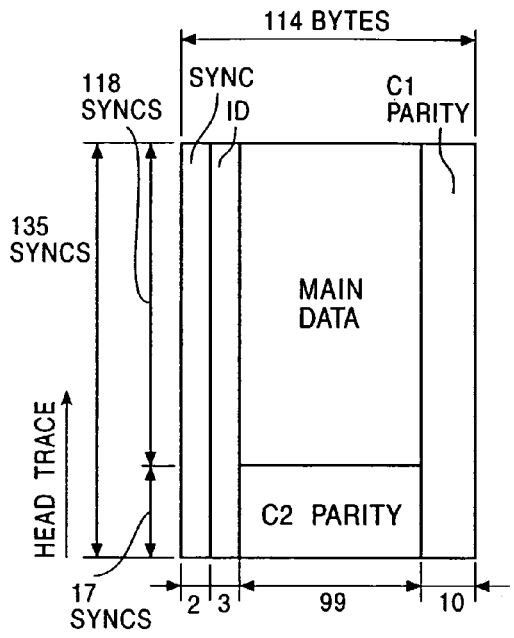
FIGS. 59A, 59B, and 59C illustrate still another example of the configuration of the main sector shown in FIG. 8.

FIG. 59A illustrates still another example of the configuration of the main sector. In this example, the length of one sync block is 114 bytes, and 135 sync blocks form the main sector. Among the 135 sync blocks, 118 sync blocks serve as the main data, and 17 sync blocks serve as parity C2.

In each sync block, the length of the sync is two bytes, and the length of the ID is three bytes. The length of the main data is 99 bytes, and the length of parity C1 is 10 bytes. As the outer error correcting code, a Galois field ($2^8$) Reed-Solomon code (135, 118, 18) is used. With this arrangement, bit errors caused by a scratch extending for a maximum of about 630 μm in the longitudinal direction of the track can be corrected. Additionally, by interleaving the outer error correcting codes over a plurality of tracks, for example, 16 tracks, on the magnetic tape 21, continuous errors over two tracks can be corrected.

The error correcting performance of the example shown in FIG. 59A is slightly lower than that of the example shown in FIG. 24A. On the other hand, the recording rate of the main data can be improved to 792 bits×118 sync blocks×10 tracks×30 Hz=28.0368 Mbps.

Figure 59B:
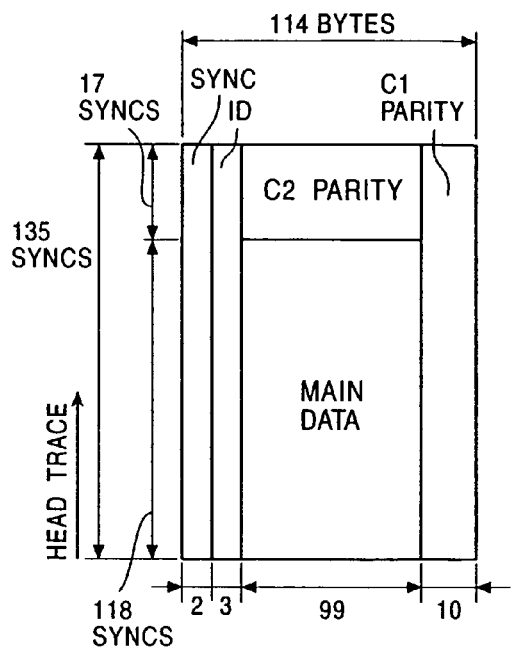
Figure 59C:
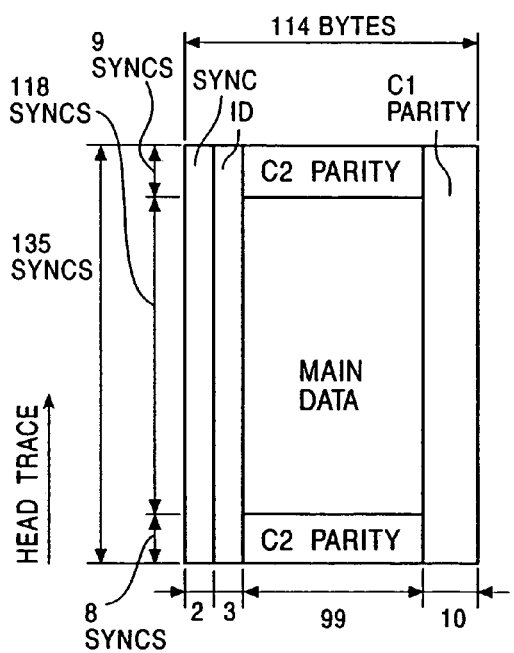

As in the example shown in FIGS. 24B and 24C, parity C2 may be located at the end of the track, as shown in FIG. 59B, or may be divided and located at the head and the end of the track, as shown in FIG. 59C.

Figure 60:
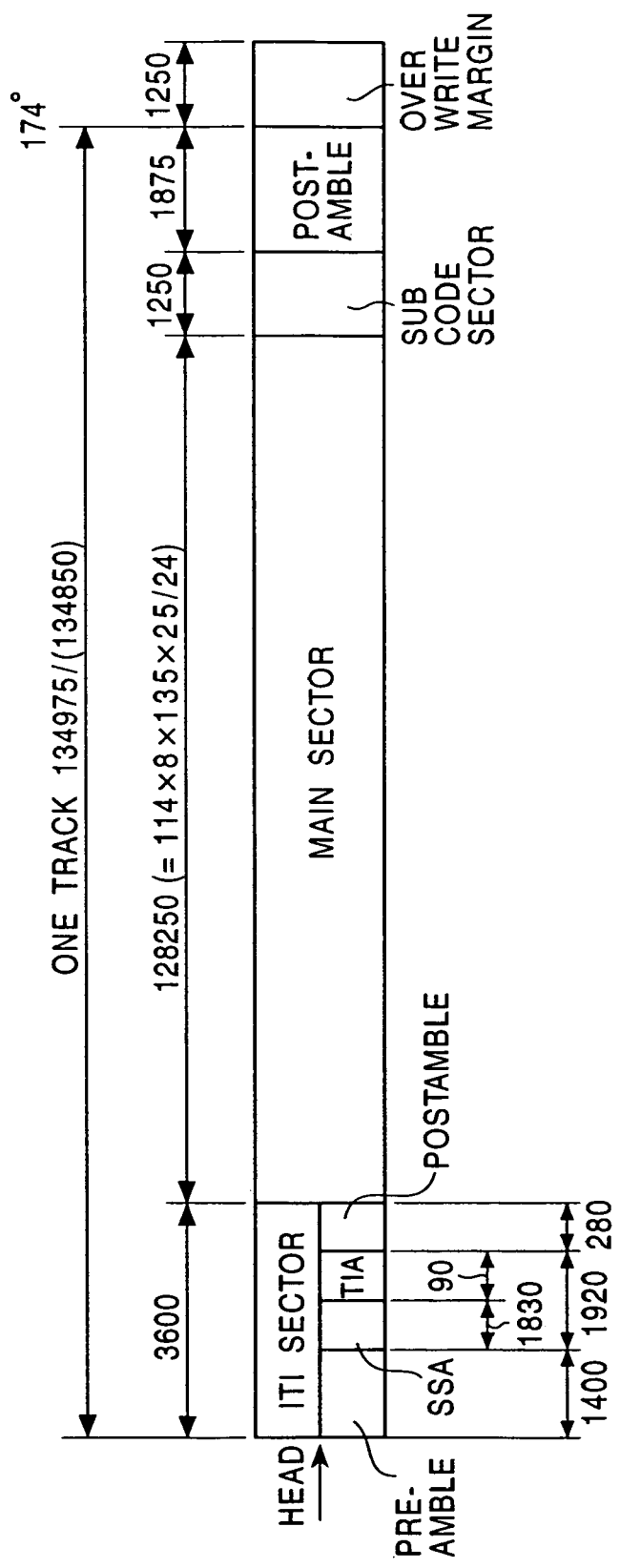
FIG. 60 illustrates an example of the sector arrangement of the track shown in FIGS. 59A, 59B, and 59C.

FIG. 60 illustrates an example of the sector arrangement in each track when the main sector is formed as shown in FIG. 59. The basic configuration of the sector arrangement is similar to that shown in FIG. 8. Accordingly, the recording and reading operation can be performed by the recording system shown in FIG. 3 and the reading system shown in FIG. 27. However, in the example shown in FIG. 60, the length of the main sector is 128250 bits (=114×8×135×25/24 bits), and the length of the postamble is 1875 bits.

Figure 61A:
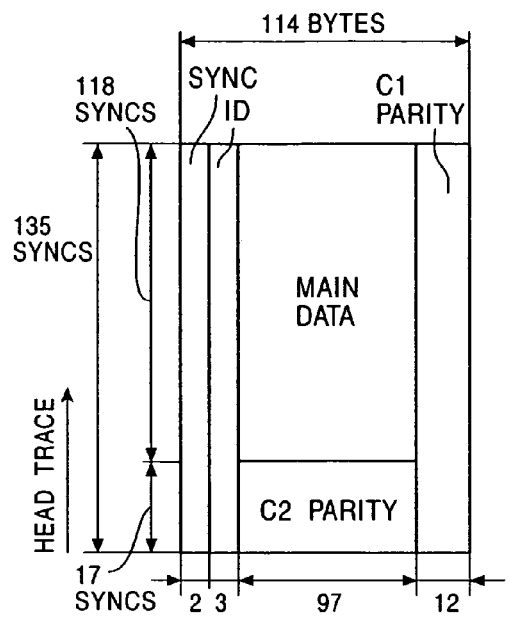
FIGS. 61A, 61B, and 61C illustrate a further example of the configuration of the main sector shown in FIG. 8.
Figure 61B:
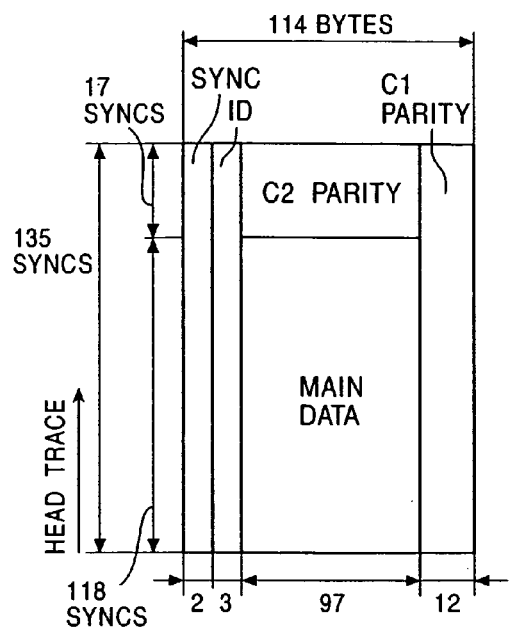
Figure 61C:
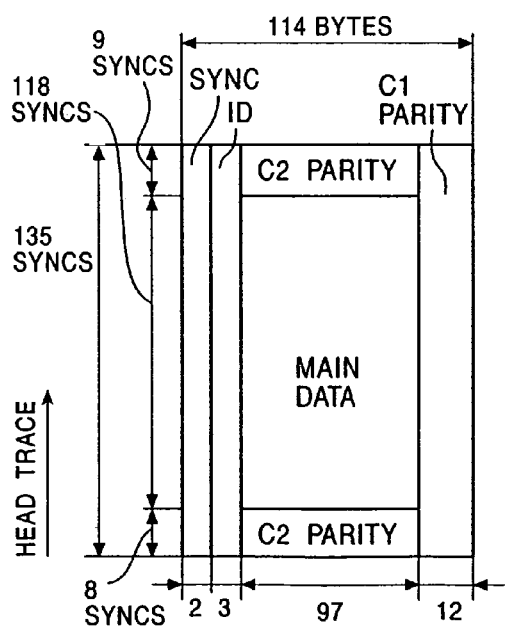

FIGS. 61A through 61C illustrate a further example of the configuration of the main sector. As in the example shown in FIGS. 59A through 59C, the length of one sync block is 114 bytes. The number of sync blocks of the main data in one track is 118, and that of the parity C2 is 17. Accordingly, as the outer error correcting code, a Galois field ($2^8$) Reed-Solomon code (135, 118, 18) is used.

Figure 62:
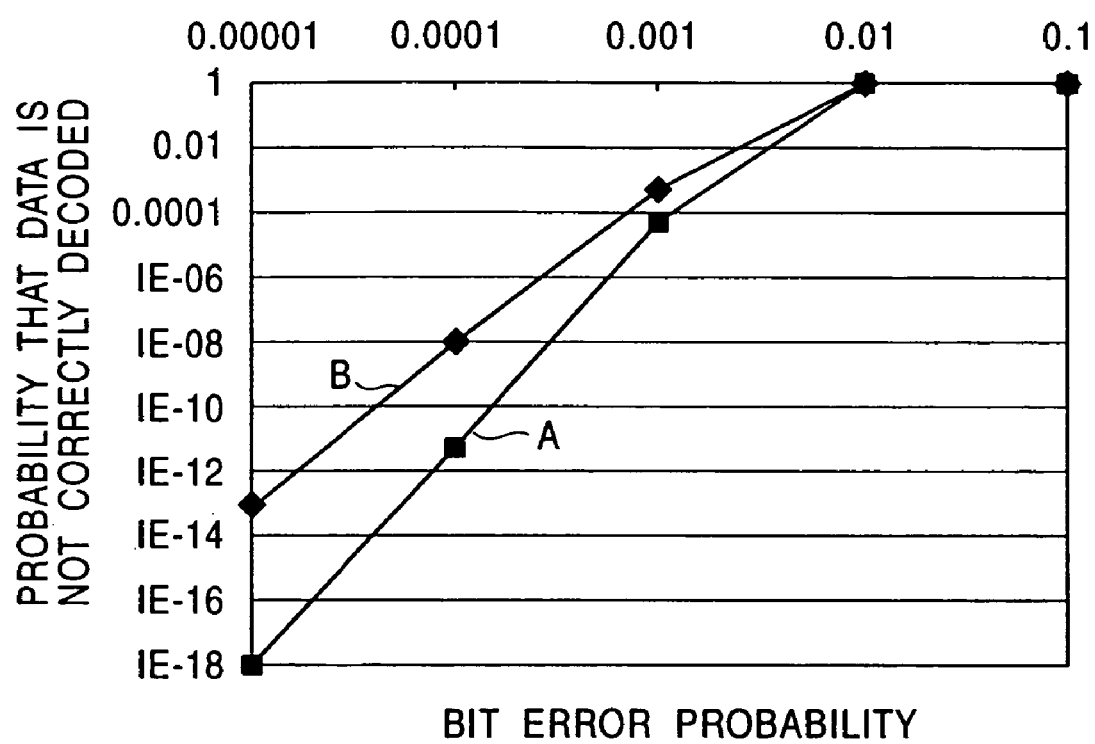
FIG. 62 illustrates the relationship between the bit error probability and the probability that data cannot be correctly decoded.

In this example, the length of the main data of one sync block is 97 bytes, and that of the parity C1 is 12 bytes. With this configuration, it is possible to correct bit errors caused by a scratch extending for a maximum of 630 µm in the longitudinal direction of the track. Additionally, by interleaving outer error correcting codes over a plurality of tracks, for example, 16 tracks, on the magnetic tape 21, continuous errors over two tracks can be corrected. The error correcting performance of the inner error correcting codes is improved over the example shown in FIGS. 24A through 24C. The probability that the data is not correctly decoded is indicated by curve A in FIG. 62. In comparison with curve A shown in FIG. 30, the probability that the data is not correctly decoded is decreased.

The number of parity bits is also increased by 16 bits compared with the example shown in FIGS. 24A through 24C. Accordingly, the probability QIN that the data is erroneously corrected is expressed by the following equation.

$$QIN=1.3E^{-29}$$

However, in comparison with the example shown in FIGS. 24A through 24C, the error correcting performance is improved with an impairment of the recording rate, which results in 776 bits×118 sync blocks×10 tracks×30 Hz=27.4704 Mbps.

As is seen from the foregoing description, when recording or reading MPEG-compressed data as discussed above, the following advantages can be offered over the DV format.

In case of the occurrence of spontaneous clogging generated during a recording operation (recording errors), about one track of such an error can be corrected when error correcting codes are interleaved on eight planes over eight tracks, and about two tracks of such an error can be corrected when error correcting codes are interleaved on 16 planes over 16 tracks. The resistance to reading errors caused by splices on the recorded tape can be enhanced. That is, if a new track is spliced too close to the previous track, the previous track becomes smaller than it should be. Such an error can be corrected. Also, the error resistance to a scratch in the longitudinal direction of tape is higher than that of the DV format by about 1.8 times or greater. The ID is included together with the main data in Reed-Solomon codes, and thus, the reliability of continuity checking of the sync block numbers and track numbers contained in the ID can be improved. Accordingly, the probability that data cannot be correctly decoded during a reading operation is much lower than that of the DV format. The length of the sync block is 111 bytes or 114 bytes, which is compatible with the length of a transport stream in the MPEG method when it is disposed in the sync blocks. Thus, the reading and recording of transport streams transferred via a digital interface, which is one of the standard formats, can be easily performed. Additionally, since 24-25 conversion used in the DV format is also applicable to the magnetic tape format of the present invention, the corresponding system can be easily constructed based on the DV system.

It can thus be understood that the present invention is effective as one format for recording and reading MPEG compressed data on and from, not only digital video cassettes, but also tape media.

The above-described series of processing may be executed by hardware or software. If software is used, it can be installed from a recording medium into a computer which contains special hardware integrating the corresponding software program or into a computer, for example, a general-purpose computer, which executes various functions by installing various programs.

Such a recording medium may be formed of a package medium, which is distributed to the user separately from the magnetic tape recording/reading apparatus, such as a magnetic disk 31 (including a floppy disc), an optical disc 32 (including compact disc read only memory (CD-ROM) and a digital versatile disk (DVD)), a magneto-optical disk 33 (including an mini disk (MD)), or a semiconductor memory 34. The recording medium may also be formed of a ROM or a hard disk on which the program is recorded, which can be provided to the user while being installed in the magnetic disc recording/reading apparatus.

It is not essential that the steps forming the program recorded on a recording medium be executed chronologically according to the order discussed in this specification. Alternatively, they may be executed concurrently or individually.

What is claimed is:

1. A magnetic tape recording apparatus for recording digital data on tracks of a magnetic tape by using a rotary head, comprising:

formatting means for adding error correcting code to each of first group data including video data, audio data, or search data, and second group data including subcode data related to said first group data, and for formatting said first group data and said second group data so that said first group data and said second group data are continuously disposed on the tracks of said magnetic tape; and supply means for supplying the data formatted by said formatting means to said rotary head so as to record the data on said magnetic tape, wherein:

said formatting means continuously disposes sync blocks on each of said tracks, each of said sync blocks having a predetermined number of bytes;

said sync blocks comprising second sync blocks each second sync block consisting of a detection pattern for detecting the sync block, identification information for identifying the sync block, main data, and inner error correcting code added to said identification information and said main data, and a remaining quantity of sync blocks each consist of the detection pattern, identification information, an outer error correcting code, and the inner error correcting code; and said outer error correcting code is provided for each group of the sync blocks obtained by dividing third sync blocks contained in a predetermined quantity of tracks by a predetermined quantity of planes; and said sync blocks are arranged on said magnetic tape so that a distance between the sync blocks belonging to the identical plane is constant among the planes.

2. A magnetic tape recording apparatus according to claim 1, wherein the video data is high definition video data compressed by an MP@HL or MP@H-14 method.

3. A magnetic tape recording method for use in a magnetic tape recording apparatus for recording digital data on tracks of a magnetic tape by using a rotary head, said magnetic tape recording method comprising:

a formatting step of adding error correcting code to each of first group data including video data, audio data, or search data, and second group data including subcode data related to said first group data, and formatting said first group data and said second group data so that said first group data and said second group data are continuously disposed on the tracks of said magnetic tape; and a supply step of supplying the data formatted in said formatting step to said rotary head so as to record the data on said magnetic tape, wherein:

said formatting step continuously disposes sync blocks on each of said tracks, each of said sync blocks having a predetermined number of bytes;

said sync blocks comprising second sync blocks each consisting of a detection pattern for detecting the sync block, identification information for identifying the sync block, main data, and inner error correcting code added to said identification information and said main data, and a remaining quantity of the sync blocks each consist of the detection pattern, the identification information, outer error correcting code, and the inner error correcting code; and said outer error correcting code is provided for each group of the sync blocks obtained by dividing third sync blocks contained in a first quantity of tracks by a first quantity of planes; and said sync blocks are arranged on said magnetic tape so that a distance between the sync blocks belonging to the identical plane is constant among the planes.

4. A computer readable medium having stored a computer readable program executed by a computer for controlling a magnetic tape recording apparatus to perform a method to record digital data on tracks of a magnetic tape by using a rotary head, the method comprising:

a formatting step of adding error correcting code to each of first group data including video data, audio data, or search data, and second group data including subcode data related to said first group data, and formatting said first group data and said second group data so that said first group data and said second group data are continuously disposed on the tracks of said magnetic tape; and a supply step of supplying the data formatted in said, formatting step to said rotary head so as to record the data on said magnetic tape, wherein:

said formatting step continuously disposes sync blocks on each of said tracks, each of said sync blocks having a predetermined number of bytes;

said sync blocks comprising second sync blocks each second sync block consisting of a detection pattern for detecting the sync block, identification information for identifying the sync block, main data, and inner error correcting code added to said identification information and said main data, and remaining quantity of sync blocks each consist of the detection pattern, the identification information, outer error correcting code, and the inner error correcting code; and said outer error correcting code is provided for each group of the sync blocks obtained by dividing third sync blocks contained in a first number of tracks by a first number of planes; and said sync blocks are arranged on said magnetic tape so that a distance between the sync blocks belonging to the identical plane is constant among the planes.

5. A magnetic tape recording apparatus for recording digital data on tracks of a magnetic tape by using a rotary head, comprising:

formatting means for adding error correcting code to each of first group data including video data, audio data, or search data, and second group data including subcode data related to said first group data, and for formatting said first group data and said second group data so that said first group data and said second group data are continuously disposed on the tracks of said magnetic tape; and supply means for supplying the data formatted by said formatting means to said rotary head so as to record the data on said magnetic tape, wherein:

said formatting means continuously disposes sync blocks on each of said tracks, each of said sync blocks having a predetermined number of bytes;

said sync blocks comprising second sync blocks each second sync block consisting of a detection pattern for detecting the sync block, identification information for identifying the sync block, main data, and inner error correcting code added to said identification information and said main data, and a quantity of remaining sync blocks each consist of the detection pattern, the identification information, outer error correcting code, and the inner error correcting code; and said outer error correcting code is provided for each group of the sync blocks obtained by dividing third sync blocks contained in a first quantity of tracks by a first quantity of planes; and said sync blocks are arranged on said magnetic tape so that a distance between the sync blocks belonging to the identical plane is constant among the planes.

6. A magnetic tape recording apparatus according to claim 5, wherein the video data is high definition video data compressed by an MP@HL or MP@H-14 method.

7. A magnetic tape recording method for use in a magnetic tape recording apparatus for recording digital data on tracks of a magnetic tape by using a rotary head, said magnetic tape recording method comprising:

a formatting step of adding error correcting code to each of first group data including video data, audio data, or search data, and second group data including subcode data related to said first group data, and formatting said first group data and said second group data so that said first group data and said second group data are continuously disposed on the tracks of said magnetic tape; and a supply step of supplying the data formatted in said formatting step to said rotary head so as to record the data on said magnetic tape, wherein:

said formatting step continuously disposes sync blocks on each of said tracks, each of said sync blocks having a predetermined number of bytes;

said sync blocks comprising second sync blocks each second sync block consisting of a detection pattern for detecting the sync block, identification information for identifying the sync block, main data, and inner error correcting code added to said identification information and said main data, and a quantity of remaining sync blocks each consist of the detection pattern, the identification information, outer error correcting code, and the inner error correcting code; and said outer error correcting code is provided for each group of the sync blocks obtained by dividing third sync blocks contained in a first quantity of tracks by a first quantity of planes; and said sync blocks are arranged on said magnetic tape so that a distance between the sync blocks belonging to the identical plane is constant among the planes.

8. A computer readable medium having stored a computer readable program executed by a computer to control a magnetic tape recording apparatus to perform a method to record digital data on tracks of a magnetic tape by using a rotary head, the method comprising:

a formatting step of adding error correcting code to each of first group data including video data, audio data, or search data, and second group data including subcode data related to said first group data, and formatting said fast group data and said second group data so that said first group data and said second group data are continuously disposed on the tracks of said magnetic tape; and a supply step of supplying the data formatted in said formatting step to said rotary head so as to record the data on said magnetic tape, wherein:

said formatting step continuously disposes sync blocks on each of said tracks, each of said sync blocks having a predetermined number of bytes;

said sync blocks comprising second sync blocks each second sync block consisting of a detection pattern for detecting the sync block, identification information for identifying the sync block, main data, and inner error correcting code added to said identification information and said main data, and a remaining quantity of sync blocks each consist of the detection pattern, the identification information, outer error correcting code, and the inner error correcting code; and said outer error correcting code is provided for each group of the sync blocks obtained by dividing third sync blocks contained in a first quantity of tracks by a first quantity of planes; and said sync blocks are arranged on said magnetic tape so that a distance between the sync blocks belonging to the identical plane is constant among the planes.

9. A magnetic tape recording apparatus for recording digital data on tracks of a magnetic tape by using a rotary head, comprising:

formatting means for adding error correcting code to each of first group data including video data, audio data, or search data, and second group data including subcode data related to said first group data, and for formatting said first group data and said second group data so that said first group data and said second group data are continuously disposed on the tracks of said magnetic tape; and supply means for supplying the data formatted by said formatting means to said rotary head so as to record the data on said magnetic tape, wherein:

said formatting means continuously disposes sync blocks on each of said tracks, each of said sync blocks having a predetermined number of bytes;

said sync blocks comprising second sync blocks each second sync block consisting of a detection pattern for detecting the sync block, identification information for identifying the sync block, main data, and inner error correcting code added to said identification information and said main data, and a quantity of remaining sync blocks each consist of the detection pattern, the identification information, outer error correcting code, and the inner error correcting code; and said outer error correcting code is provided for each group of the sync blocks obtained by dividing third sync blocks contained in a first quantity of tracks by a first quantity of planes; and said sync blocks are arranged on said magnetic tape so that a distance between the sync blocks belonging to the identical plane is constant among the planes.

10. A magnetic tape recording apparatus according to claim 9, wherein the video data is high definition video data compressed by an MP@HL or MP@H-14 method.

11. A magnetic tape recording method for use in a magnetic tape recording apparatus for recording digital data on tracks of a magnetic tape by using a rotary head, said magnetic tape recording method comprising:

a formatting step of adding error correcting code to each of first group data including video data, audio data, or search data, and second group data including subcode data related to said first group data, and formatting said first group data and said second group data so that said first group data and said second group data are continuously disposed on the tracks of said magnetic tape; and a supply step of supplying the data formatted in said formatting step to said rotary head so as to record the data on said magnetic tape, wherein:

said formatting step continuously disposes sync blocks on each of said tracks, each of said sync blocks having a predetermined number of bytes;

said sync blocks comprising second sync blocks each second sync block consisting of a detection pattern for detecting the sync block, three-byte identification information for identifying the sync block, main data, and inner error correcting code added to said identification information and said main data, and a quantity of remaining sync blocks each consist of the two-byte detection pattern, the three-byte identification information, outer error correcting code, and the inner error correcting code; and said outer error correcting code is provided for each group of the sync blocks obtained by dividing third sync blocks contained in a first quantity of tracks by a first quantity of planes; and said sync blocks are arranged on said magnetic tape so that a distance between the sync blocks belonging to the identical plane is constant among the planes.

12. A computer readable medium having stored a computer readable program executed by a computer to control a magnetic tape recording apparatus to perform a method to record digital data on tracks of a magnetic tape by using a rotary head, the method comprising:

a, formatting step of adding error correcting code to each of first group data including video data, audio data, or search data, and second group data including subcode data related to said first group data, and formatting said first group data and said second group data so that said first group data and said second group data are continuously disposed on the tracks of said magnetic tape; and a supply step of supplying the data formatted in said formatting step to said rotary head so as to record the data on said magnetic tape, wherein:

said formatting step continuously disposes sync blocks on each of said tracks, each of said sync blocks having a predetermined number of bytes; said sync blocks comprising second sync blocks each second sync block consisting of a two-byte detection pattern for detecting the sync block, three-byte identification information for identifying the sync block, main data, and inner error correcting code added to said identification information and said main data, and a quantity of remaining sync blocks each consist of the two-byte detection pattern, the three-byte identification information, outer error correcting code, and the inner error correcting code; and said outer error, correcting code is provided for each group of the sync blocks obtained by dividing third sync blocks contained in a first quantity of tracks by a first quantity of planes; and said sync blocks arranged on said magnetic tape so that a distance between the sync blocks belonging to the identical plane is constant among the planes.

13. A magnetic tape recording apparatus for recording digital data on tracks of a magnetic tape by using a rotary head, comprising:

formatting means for adding error correcting code to each of first group data including video data, audio data, or search data, and second group data including subcode data related to said first group data, and for formatting said first group data and said second group data so that said first group data and said second group data are continuously disposed on the tracks of said magnetic tape; and supply means for supplying the data formatted by said formatting means to said rotary head so as to record the data on said magnetic tape, wherein:

said formatting means continuously disposes sync blocks on each of said tracks, each of said sync blocks having a predetermined number of bytes;

said sync blocks comprising second sync blocks each second sync block consisting of a two-byte detection pattern for detecting the sync block, three-byte identification information for identifying the sync block, main data, and inner error correcting code added to said identification information and said main data, and a quantity of remaining sync blocks each consist of the two-byte detection pattern, the three-byte identification information, outer error correcting code, and the inner error correcting code; and said outer error correcting code is provided for each group of the sync blocks obtained by dividing third sync blocks contained in a first quantity of tracks by a first quantity of planes; and said sync blocks arranged on said magnetic tape so that a distance between the sync blocks belonging to the identical plane is constant among the planes.

14. A magnetic tape recording apparatus according to claim 13, wherein the video data is high definition video data compressed by an MP@HL or MP@H-14 method.

15. magnetic tape recording method for use in a magnetic tape recording apparatus for recording digital data on tacks of a magnetic tape by using a rotary head, said magnetic tape recording method comprising:

a formatting step of adding error correcting code to each of first group data including video data, audio data, or search data, and second group data including subcode data related to said first group data, and formatting said first group data and said second group data so that said first group data and said second group data are continuously disposed on the tracks of said magnetic tape; and a supply step of supplying the data formatted in said formatting step to said rotary head so as to record the data on said magnetic tape, wherein:

said formatting step continuously disposes sync blocks on each of said tracks, each of said sync blocks having a predetermined number of bytes;

said sync blocks comprising second sync blocks each second sync block consisting of a two-byte detection pattern for detecting the sync block, three-byte identification information for identifying the sync block, main data, and inner error correcting code added to said identification information and said main data, and a quantity of remaining sync blocks each consist of the two-byte detection pattern, the three-byte identification information, outer error correcting code, and the inner error correcting code; and said outer error correcting code is provided for each group of the sync blocks obtained by dividing third sync blocks contained in a first quantity of tracks by a first quantity of planes; and said sync blocks arranged on said magnetic tape so that a distance between the sync blocks belonging to the identical plane is constant among the planes.

16. A computer readable medium having stored a computer readable program executed by a computer to control a magnetic tape recording apparatus to perform a method to record digital data on tracks of a magnetic tape by using a rotary head, the method comprising:

a formatting step of adding error correcting code to each of first group data including video data, audio data, or search data, and second group data including subcode data related to said first group data, and formatting said first group data and said second group data so that said first group data and said second group data are continuously disposed on the tracks of said magnetic tape; and a supply step of supplying the data formatted in said formatting step to said rotary head so as to record the data on said magnetic tape, wherein:

said formatting step continuously disposes sync blocks on each of said tracks, each of said sync blocks having a predetermined number of bytes;

said sync blocks comprising second sync blocks each second sync block consisting of a two-byte detection pattern for detecting the sync block, three-byte identification information for identifying the sync block, main data, and inner error correcting code added to said identification information and said main data, and a quantity of remaining sync blocks each consist of the two-byte detection pattern, the three-byte identification information, outer error correcting code, and the inner error correcting code; and said outer error correcting code is provided for each group of the sync blocks obtained by dividing third sync blocks contained in a first quantity of tracks by a first quantity of planes; and said sync blocks arranged on said magnetic tape so that a distance between the sync blocks belonging to the identical plane is constant among the planes.

* * * * *